United States Patent
Brueckheimer et al.

(10) Patent No.: US 7,103,003 B2
(45) Date of Patent: Sep. 5, 2006

(54) NETWORK PLANNING TOOL

(75) Inventors: Simon Brueckheimer, London (GB); Francois Blouin, Hull (CA); Roger Britt, Kanata (CA); Mark Armstrong, Stittsville (CA)

(73) Assignee: Nortel Networks Limited, St. Laurent (CA)

( * ) Notice: Subject to any disclaimer, the term of this patent is extended or adjusted under 35 U.S.C. 154(b) by 836 days.

(21) Appl. No.: 09/751,060

(22) Filed: Dec. 29, 2000

(65) Prior Publication Data
US 2002/0087370 A1   Jul. 4, 2002

Related U.S. Application Data

(60) Provisional application No. 60/231,897, filed on Sep. 11, 2000.

(51) Int. Cl.
*G01R 31/08* (2006.01)

(52) U.S. Cl. ............. 370/252; 345/736; 709/223

(58) Field of Classification Search .......... 370/252, 370/254, 351, 389, 469, 516; 709/223, 224; 455/9–10, 67.1, 67.3, 115; 345/733–736
See application file for complete search history.

(56) References Cited

U.S. PATENT DOCUMENTS

| | | | | |
|---|---|---|---|---|
| 5,821,937 A * | 10/1998 | Tonelli et al. | ............ | 345/853 |
| 6,144,670 A * | 11/2000 | Sponaugle et al. | ......... | 370/401 |
| 6,282,192 B1 * | 8/2001 | Murphy et al. | ............ | 370/352 |
| 6,332,076 B1 * | 12/2001 | Shah et al. | ............ | 455/423 |
| 6,360,271 B1 * | 3/2002 | Schuster et al. | ............ | 709/231 |
| 6,711,137 B1 * | 3/2004 | Klassen et al. | ............ | 370/252 |

FOREIGN PATENT DOCUMENTS

EP   0 579 472 A2   7/1993

OTHER PUBLICATIONS

1) XP-002202484—Network Simulations with Opnet (Xinjie Chang).
2) Patent Abstracts of Japan. vol. 1996, No. 10.
3) XP-002202485—Proactive Network Design (Ford J C et al).
4) XP-002202488—Capacity Management and Routing Policies for Voice Over IP Traffic.
5) XP-002202486—Making Sense of Network Chaos (Bruce Boardman).
6) XP-002202487—Speech Transmission Performance Planning in Hybrid IP/SCN Networks (Perkins M E et al).

* cited by examiner

Primary Examiner—David Vincent
(74) Attorney, Agent, or Firm—Barnes & Thornburg LLP

(57) ABSTRACT

A communications packet network is planned by the use of a planning tool. The tool comprises an input for inputting requirements of the network; and an input for determining factors which effect the passage of packet based data through the network. A modelling module determines the performance of the network based on the requirements and factors. The performance of model is compared with that of an objective comparison model. A feedback mechanism iteratively adjusts the input factors to improve the performance and maintain the network requirements. When the desired performance level is achieved, a plan of the network is output from the planning tool.

23 Claims, 73 Drawing Sheets

Figure B.1/G.107 - GOB (Good or Better) and POW (Poor or Worse) as functions of rating factor R What reference calls will be the most demanding quality measure?

MRIMG - Mux Relay & Interworking MG
LIT - Lawful Intercept Tap
CLE - Customer Located Equipment
CPE - Customer Premises Equipment
PVG - Passport Voice Gateway
EO - End Office
TO - Tandem Office
MG4K - TDM to AAL-1 MG
CVX1800 - TDM to VoIP MG
15KMSS - Passport 15K ATM Sw
V15K - Versalar 15K IP router The E-model calculates a Transmission Rating Factor $R$, given by $$R = R_o - I_s - I_d - I_e + A$$

Fig. 22

E-Model Parameter Default Values

| Parameter | Units | Value |
|---|---|---|
| SLR (Send Loudness Rating) | dB | 8 |
| RLR (Receive Loudness Rating) | dB | 2 |
| STMR (Sidetone Masking Rating) | dB | 15 |
| LSTR (Listener Sidetone Rating) | dB | 18 |
| OLR (Overall Loudness Rating) | dB | 10 |
| TELR (Talker Echo Loudness Rating) | dB | 65 |
| WEPL (Weighted Echo Path Loss) | dB | 110 |
| T (Mean Intrinsic One-Way Delay) | msec | 0 |
| Ta (Absolute Delay) | msec | 0 |
| Tr (Round-Trip Delay) | msec | 0 |
| QDU (Quantization Distortion Units) | - | 1 |
| Ie (Equipment Impairment Factor) | - | 0 |
| A (Expectation Factor) | - | 0 |
| Ds (Handset Shape Factor – Send Side) | - | 3 |
| Dr (Handset Shape Factor – Receive Side) | - | 3 |
| Ps (Room Noise at the Send side) | dB(A) | 35 |
| Pr (Room Noise at the Receive side) | dB(A) | 35 |
| Nc (Circuit Noise referred to 0 dBr-point) | dBm0p | -70 |
| Nfor (Noise Floor at the Receive Side) | dBmp | -64 |

Fig. 25

| | Ie for E-Model Calculations | | | | | | | |
|---|---|---|---|---|---|---|---|---|
| | G.711 [Ref.10] [Notes 2, 3] | G.711 [Notes 1, 2, 3] | G.711 [Notes 1, 2, 3] | G.711 [Notes 1, 2, 3, 4] | G.729A [Notes 1, 3] | G.729A [Ref.10] [Note 3] | G.729A [Notes 1, 3] | G.729A [Notes 1, 3] | G.726 32kb/s note [5] |
| Frame Size (ms) | .125 | .125 | .125 | .125 | .125 | .125 | | | .125 |
| Packet Payload (ms) | 10 | 20 | 30 | 40 | 10 | 20 | 30 | 40 | 20 |
| Packet Loss (%) | | | | | | | | | |
| 0 | 0 | 0 | 0 | 0 | 11 | 11 | 11 | 11 | 7 |
| 1 | 5 | 8 | 10 | 13 | 13 | 15 | 17 | 19 | N/A |
| 2 | 7 | 13 | 16 | 19 | 16 | 19 | 21 | 24 | N/A |
| 3 | 10 | 19 | 22 | 24 | 19 | 23 | 25 | 28 | N/A |
| 4 | 12.5* | 22 | 26 | 28 | 22 | 26 | 29 | 32 | N/A |
| 5 | 15 | 25 | 30 | 32 | 25 | 29* | 32 | 35 | N/A |

Notes:

1) In the absence of any supporting documentation, these are arbitrary values
2) All G.711 vocoders are assumed to have PLC (Packet Loss Concealment) algorithms
3) Impairment factors apply for random packet loss conditions
4) This is the current capability of the i2004 (in the absence of any download instructions to achieve smaller frame size)
5) There is no PLC algorithm for G.726, therefore its deployment might be limited in lossy network
6) Interpolated values

Fig. 33

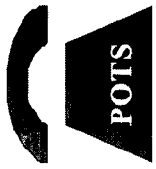

| Title | Abbreviation (Default) | | E-Model Input POTS |
|---|---|---|---|
| Electric Circuit Noise (at 0 dBr) | Nc | (-70 dBmP) | |
| Room Noise | Po | (35 dBA) | 35 |
| Send Loudness Rating | SLR | (8 dB) | 11 |
| Receive Loudness Rating | RLR | (2 dB) | 3 |
| D-factor | D | (3) | 3 |
| Noise Floor | Nfor | (-64 dBm0) | -64 |
| Sidetone Masking Rating | STMR | (15) | 15 |
| Equipment Impairment Factor | Ie | (0) | 0 |
| Expectation (Advantage) Factor | A | (0) | 0 |
| Mean Intrinsic One-Way Delay (upper) | Tu | (0 ms) | 0 |
| Mean Intrinsic One-Way Delay (lower) | Tl | (0 ms) | 0 |
| Mean Intrinsic One-Way Delay | Tul | (0 ms) | 0 |
| Electrical Loss (upper) | Lu | (dB) | 0 |
| Electrical Loss (lower) | Ll | (dB) | 0 |
| Electrical Loss (upper = lower) | Lul | (dB) | 0 |
| Quantizing Distortion Units (upper) | qduu | (1) [Note 1] | 0 |
| Quantizing Distortion Units (lower) | qdul | (1) [Note 1] | 0 |
| Echo Return Loss | ERL | (dB) | 17 |

| PSTN Wireless Access Delay, loss and Impairment Summary | Uplink | Downlink |
|---|---|---|
| Mobile Switching Center (MSC) (ms) | 1 | 2 |
| Base Station Controller (BSC) (ms) | 2.5 | 40 |
| Base Station (BTS) (ms) | 15.8 | 40.8 |
| Mobile Set (MS) (ms) | 72.1 | 14.3 |
| PSTN Wireless Access Delay (ms) | 91.40 | 97.10 |
| Impairment Factor (Ie) | 5 | 5 |

BTS: Base Station
BSC: Base Station Controller
MSC: Mobile Switching Center

Fig. 36

| TDM Core Transport | National (8000km) | International (connection Length 27500 km) | | | |
|---|---|---|---|---|---|
| | | 0 DCME | 1 DCME | 2 DCME | 3 DCME |
| National Transmission Time | 43 | 43 | 43 | 43 | 43 |
| T2DCME (G.711/G.726 Conversion+DSI) (ms) | - | 0 | 26 | 52 | 78 |
| DCME2T (G.726/G.711 Conversion) (ms) | - | 0 | 2 | 4 | 6 |
| International Transmission Time (ms) | - | 72 | 72 | 72 | 72 |
| National Transmission Time | - | 43 | 43 | 43 | 43 |
| Total one-way delay (ms) | 43 | 158 | 186 | 214 | 242 |
| Impairment Factor (Ie) | 0 | 0 | 7 | 14 | 21 |

| Wireless Access to | National | | | International 0 DCME | | | International 1 DCME | | | International 2 DCME | | |
|---|---|---|---|---|---|---|---|---|---|---|---|---|
| | T | Ie | R | T | Ie | R | T | Ie | R | T | Ie | R |
| Trunk | 141.6 | 5 | 81.7 | 253.2 | 5 | 70.6 | 282.22 | 12 | 59.8 | 310.22 | 19 | 49.4 |
| Wireless | 231.5 | 10 | 72.7 | 346.5 | 10 | 58.3 | 374.5 | 17 | 48.54 | 402.5 | 24 | 38.98 |

Which impairments are being considered in the models?

Fig. 46

| Cable CPE | Cable CPE Upstream | Cable CPE Downstream | Note |
|---|---|---|---|
| Link Speed | 510 Kbps | 3000 Kbps | |
| Voice packet size (byte) | 160 | 160 | note [1] |
| Voice packet overhead (RTP/UDP/IP) | 48 | 48 | note [2] |
| Data packet size (byte) | 512 | 512 | |
| Data packet overhead | 48 | 48 | |
| Voice packet link utilization (%) | 10.0% | 10.0% | |
| Data packet link utilization (%) | 90.0% | 90.0% | |
| Fixed Delay | | | |
| - Serialization delay for voice packet (ms) | 3.26 | 0.55 | note [3] |
| - DSP & CPU processing delay (ms) | 12.00 | 14.00 | note [4] |
| - Packetization Delay (ms) | 0.00 | N/A | note [5] |
| Variable Delay | | | |
| - Average Voice data contention (ms) | 4.57 | 0.78 | note [6] |
| - Maximum Voice data contention (ms) | 9.15 | 1.55 | note [6] |
| - De-Jitter buffer delay (ms) | N/A | 0.00 | note [5] |
| Other Impairments | | | |
| - Packet Loss (%) | 0.00 | 0.00 | |
| | | | |
| Minimum Delay (Fixed Delays) (ms) | 15.26 | 14.55 | |
| Average Delay (Fixed+Average Variable Delays) (ms) | 19.84 | 15.33 | |
| Maximum Delay (Fixed+ Max Variable Delays) (ms) | 24.41 | 16.11 | |

Cable Access - ATM Core

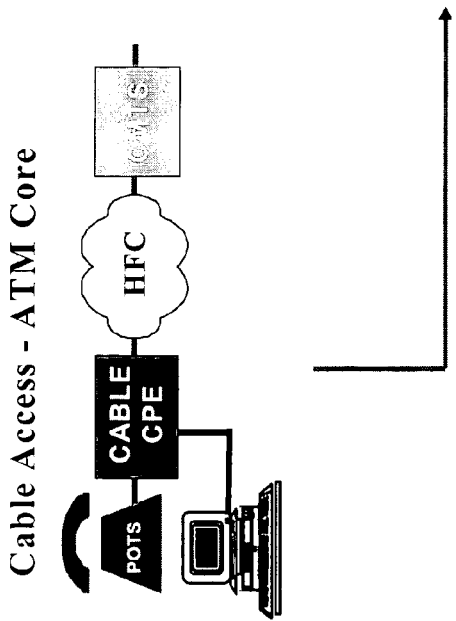

Fig. 48

| Total National Transport Distance (km) | 8000 km (IP) | 8000 km (ATM) | 8000 km (TDM) | Note |
|---|---|---|---|---|
| Terrestrial Distance (km) | 8000 | 8000 | 8000 | |
| Terrestrial propagation Delay @ 5us / km (ms) | 40 | 40 | 40 | From G.114 |
| Submarine Distance (km) | - | - | - | |
| Submarine propagation Delay @ 6us / km (ms) | - | - | - | From G.114 |
| Number of hop | 5 | 8 | 4 | From i.356, TIA IS-810 G.114 |
| Equipment processing time (ms) | 1ms x 5 | 0.03ms x 8 | 0.75ms x 4 | |
| Jitter (ms) | note [1] | 1.5 note [3] | 0 | I.356 QoS class 1 |
| Total Delay (ms) | 45 | 41.74 | 43 | Note [2] |

| International Core Transport delay | 27500 (IP) | 27500 (ATM) | 27500 (TDM) | Note |
|---|---|---|---|---|
| Terrestrial Distance (km) | 16000 | 16000 | 16000 | |
| Terrestrial Delay @ 5us / km (ms) | 80 | 80 | 80 | From I.356, TIA IS-810 |
| Number of hop | 15 | 19 | 12 | |
| Equipment processing time per hop | 1 | 0.03 | 0.75 | G.114 |
| Equipment processing time (ms) | 15 | 0.57 | 9 | G.115 |
| Submarine Distance (km) | 11500 | 11500 | 11500 | |
| Submarine Delay @ 6us / km (ms) | 69 | 69 | 69 | |
| Jitter (ms) | note [1] | 3 | 0 | I.356 QoS class 1 |
| Total Delay (ms) | 164 | 149.57 | 158 | Note [2] |

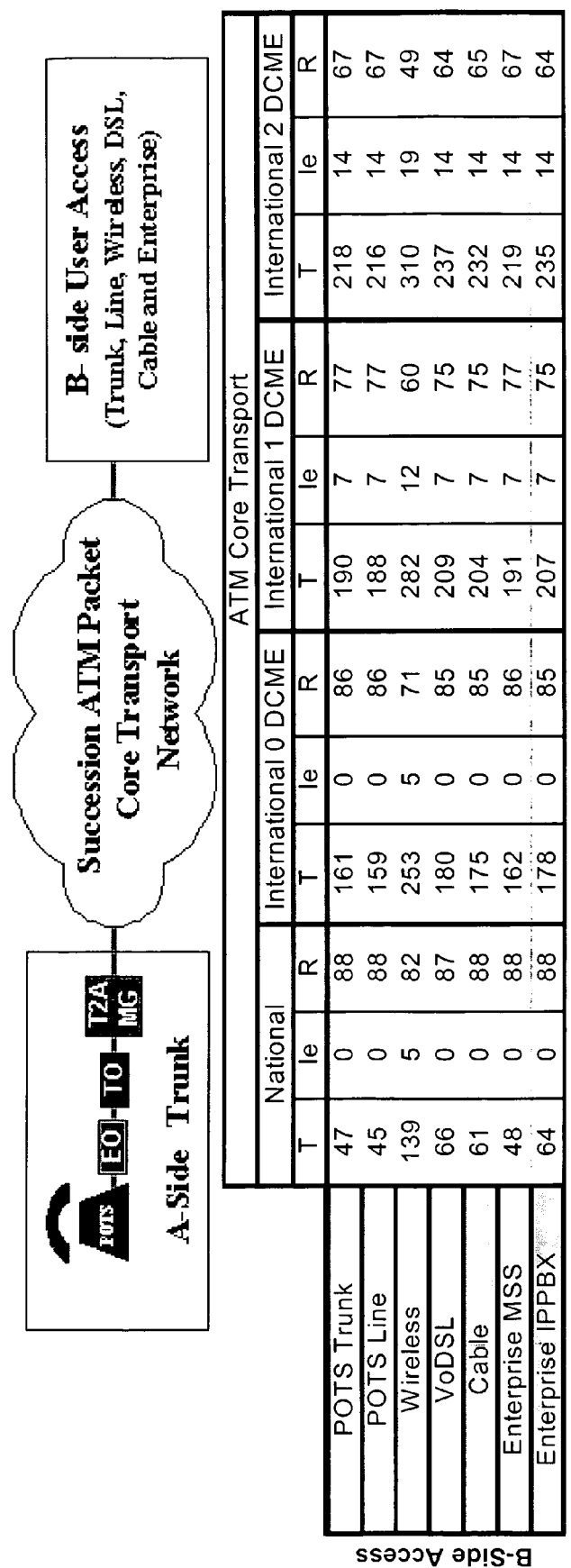

Fig. 50

Note: The four parameters: packetization delay, delay jitter, codec and packet loss have been set to zero. Those four parameters will be determined based upon the available margin. The margin is determined based on the benchmark comparison of an end-to-end Succession network with the closest benchmark representation of existing networks (PSTN only, mobile to PSTN, or mobile to mobile).

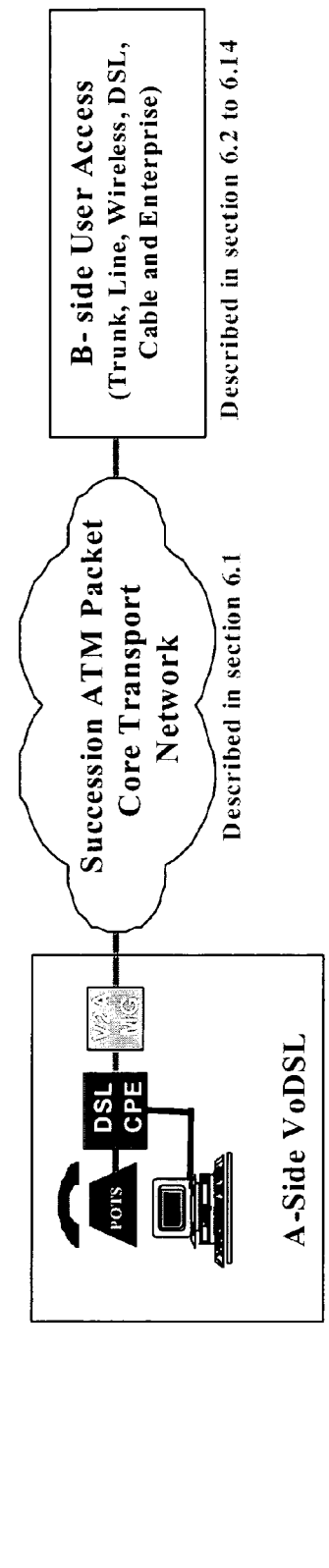

Fig. 51

Note: The four parameters: packetization delay, delay jitter, codec and packet loss have been set to zero. Those four parameters will be determined based upon the available margin. The margin is determined based on the benchmark comparison of an end-to-end Succession network with the closest benchmark representation of existing networks (PSTN only, mobile to PSTN, or mobile to mobile).

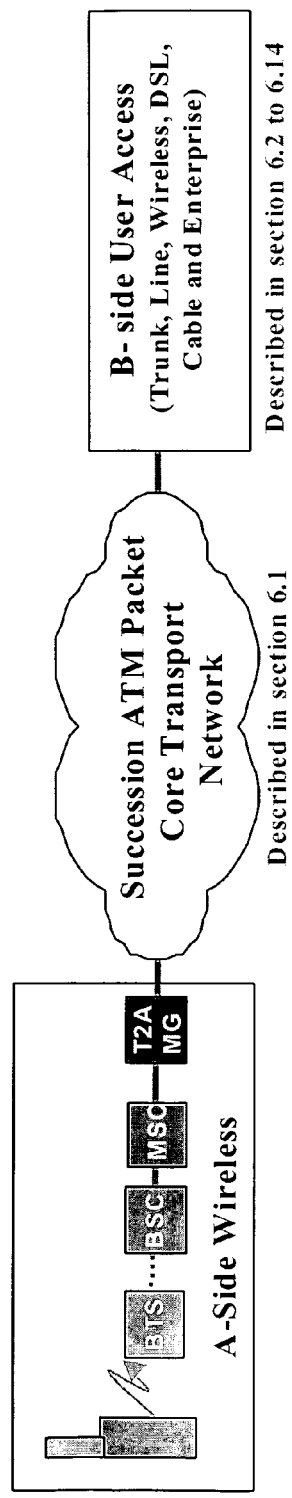

Fig. 52

| | National | | International 0 DCME | | | International 1 DCME | | | International 2 DCME | | |
|---|---|---|---|---|---|---|---|---|---|---|---|
| | T | Ie | R | T | Ie | R | T | Ie | R | T | Ie | R |
| POTS Trunk | 145 | 5 | 86 | 264 | 5 | 74 | 293 | 12 | 63 | 321 | 19 | 53 |
| POTS Line | 142 | 5 | 86 | 261 | 5 | 74 | 290 | 12 | 64 | 318 | 19 | 53 |
| Wireless | 237 | 10 | 72 | 356 | 10 | 57 | 385 | 17 | 48 | 413 | 24 | 38 |
| VoDSL | 164 | 5 | 85 | 283 | 5 | 71 | 312 | 12 | 61 | 340 | 19 | 51 |
| Cable | 158 | 5 | 85 | 277 | 5 | 72 | 306 | 12 | 62 | 334 | 19 | 52 |
| Enterprise MSS | 156 | 5 | 85 | 275 | 5 | 72 | 304 | 12 | 62 | 332 | 19 | 52 |
| Enterprise IPPBX | 172 | 5 | 84 | 291 | 5 | 70 | 320 | 12 | 60 | 348 | 19 | 50 |

Note: The four parameters: packetization delay, delay jitter, codec and packet loss. Those four parameters will be determined based upon the available margin. The margin is determined based on the benchmark comparison of an end-to-end Succession network with the closest benchmark representation of existing networks (PSTN only, mobile to PSTN, or mobile to mobile).

Fig. 59

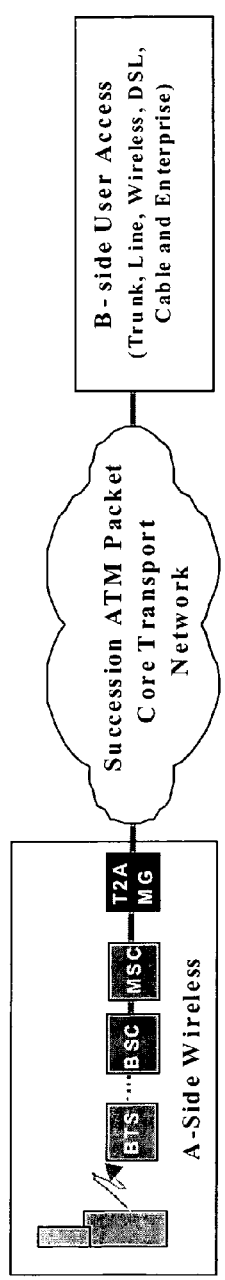

| B-Side Access | | Succ vs PSTN National | | | Succ 0 DCME vs PSTN Intl 0 DCME | | | | Succ 0 DCME vs PSTN Intl 1 DCME | | | | Succ 0 DCME vs PSTN Intl 2 DCME | | | |
|---|---|---|---|---|---|---|---|---|---|---|---|---|---|---|---|---|
| | | R Succ | R PSTN | Delay Margin (ms) | Ie Margin | R Succ | R PSTN | Delay Margin (ms) | Ie Margin | R Succ | R PSTN | Delay Margin (ms) | Ie Margin | R Succ | R PSTN | Delay Margin (ms) | Ie Margin |
| POTS Trunk | | 81.8 | 81.7 | -1.2 | 0.1 | 70.7 | 70.6 | -0.2 | 0.1 | 70.7 | 59.8 | 91.8 | 10.9 | 70.7 | 49.4 | 196.8 | 21.3 |
| POTS Line | | 81.8 | 81.7 | 1.0 | 0.1 | 71.0 | 70.6 | 2.0 | 0.4 | 71.0 | 59.8 | 94.0 | 11.2 | 71.0 | 49.4 | 199.0 | 21.6 |
| Wireless | | 72.7 | 72.7 | -0.2 | 0.0 | 58.5 | 58.3 | 0.8 | 0.2 | 58.5 | 48.5 | 17.8 | 10.0 | 58.5 | 39.0 | 192.8 | 19.5 |
| VoDSL | | 81.2 | 81.7 | -20.4 | -0.5 | 68.1 | 70.6 | -19.4 | -2.5 | 68.1 | 59.8 | 72.6 | 8.3 | 68.1 | 49.4 | 177.6 | 18.7 |
| Cable | | 81.4 | 81.7 | -14.9 | -0.3 | 68.8 | 70.6 | -13.9 | -1.8 | 68.8 | 59.8 | 78.1 | 9.0 | 68.8 | 49.4 | 183.1 | 19.4 |
| Enterprise MSS | | 81.8 | 81.7 | -1.6 | 0.1 | 70.6 | 70.6 | -0.5 | 0.0 | 70.6 | 59.8 | 91.5 | 10.8 | 70.6 | 49.4 | 196.5 | 21.2 |
| Enterprise IPPBX | | 81.2 | 81.7 | -18.4 | -0.5 | 68.4 | 70.6 | -17.3 | -2.2 | 68.4 | 59.8 | 74.7 | 8.6 | 68.4 | 49.4 | 179.7 | 19.0 |

Note: In red indicates the worst case access scenario with the smallest available budget

Fig. 64

| Rank | Codec | E-model Impairment Factor (Ie) | Estimated implementation delay (ms) | Note |
|---|---|---|---|---|
| 1 | G.711 at 64 kb/s | 0 | 0.125 | PCM |
| 2 | G.726 at 32 kb/s with Synch Coding | 7 | 0.250 | ADPCM |
| 3 | GSM-EFR | 5 | 40 | GSM |
| 4 | IS-733 | * | 40 | |
| 5 | G.728 at 16 kb/s | 7 | 1.250 | |
| 6 | G.729/G.729A at 8 kb/s | 10/11 | 25 | |
| 7 | IS-641 | 6 | 40 | TDMA |
| 8 | G.723.1 at 6.3 kb/s (not recommended) | 15 | 30 | Soft Phone |

Fig. 65

| Codec | | packetization delay (ms) | max packet loss (%) | Ie due to packet loss |
|---|---|---|---|---|
| type | Codec Ie | | | |
| G.711 | 0 | 10 | 0% | 0 |
| G.711 | 0 | 20 | 0% | 0 |
| G.726(1) | 7 | 10 | 0% | 0 |

1. This codec is only really suitable for international

| Codec | | packetization delay (ms) | max packet loss (%) | Ie due to packet loss |
|---|---|---|---|---|
| type | Codec Ie | | | |
| G.711 | 0 | 10 | 0% | 0 |
| G.711 | 0 | 20 | 0% | 0 |
| G.711 | 0 | 40 | 0% | 0 |
| G.726 | 7 | 10 | 0% | 0 |
| G.726 | 7 | 20 | 0% | 0 |
| G.726 | 7 | 40 | 0% | 0 |
| G.711 | 0 | 10 | 1% | 5 |
| G.711 | 0 | 20 | 1% | 5 |

| Codec | | packetization delay (ms) | max packet loss (%) | Ie due to packet loss |
|---|---|---|---|---|
| type | Codec Ie | | | |
| G.711 | 0 | 10 | 0% | 0 |
| G.711 | 0 | 20 | 0% | 0 |
| G.711 | 0 | 40 | 0% | 0 |
| G.726 | 7 | 10 | 0% | 0 |
| G.726 | 7 | 20 | 0% | 0 |
| G.726 | 7 | 40 | 0% | 0 |
| G.729 | 11 | 10 | 0% | 0 |
| G.729 | 11 | 20 | 0% | 0 |
| G.729 | 11 | 40 | 0% | 0 |
| G.711 | 0 | 10 | 1% | 5 |
| G.711 | 0 | 20 | 1% | 5 |
| G.711 | 0 | 40 | 1% | 5 |
| G.726 | 7 | 10 | 1% | 2 |
| G.726 | 7 | 20 | 1% | 4 |
| G.726 | 7 | 40 | 1% | 8 |
| G.729 | 11 | 10 | 1% | 2 |
| G.729 | 11 | 20 | 1% | 4 |

NETWORK PLANNING TOOL

RELATED APPLICATION

This application constitutes the regular patent application deriving priority from provisional application No. 60/231,897 filed on 11, Sep. 2000.

FIELD OF THE INVENTION

This invention relates to a Network planning tool and a method for using the same.

BACKGROUND OF THE INVENTION

Traditional communications networks are increasingly being replaced and superseded by Packet Based Networks, especially those based on Internet Protocol (IP). These packet-based networks have different capabilities and constraints, accordingly the planning of the network is based on different criteria.

The criteria on which a network is planned depends on the requirements and the specification of the network. The requirements include features such as bearer traffic (to be described in greater detail below) both in the classical ATM domain and the IP packet domain. For example, the network may carry high priority voice and real time video traffic together with various forms of high and low priority data traffic. The specification of the network depends on the equipment, the gateways and connections between the equipment and the type of calls which are to be made. The different types of call includes, national, international, mobile, data, voice, fax and any combination thereof. The network may also need to provide wireless access to deliver wireless Internet services.

A particular problem in designing a network is that of reconciling a number of conflicting requirements. For example, high bandwidth capability and extensive availability of resources are inherently desirable features, but they must be traded off against the cost of providing such features. Similarly, a network may be designed for a particular level of traffic, but it is also desirable to provide for scaling of the network should the future growth of traffic exceed expected levels. The network may be required to carry a number of different types of traffic having different transport requirements and different priority classes. The network design may be further complicated by the need to provide interworking between devices supplied by different manufacturers, a so-call eclectic collection of devices. In practice there are a large number of requirements and specifications, some of which may be conflicting, and it is thus an onerous task to determine an optimum solution for each individual case.

SUMMARY OF THE INVENTION

One object of the present invention is to provide a tool and a method which facilitates network planning in an environment where many opposing and contradictory criteria must be considered and resolved.

According to one aspect of the present invention there is provided a method of planning a Network which is capable of passing packet based data therethrough, the method of planning comprising: determining the requirement of the network; determining the factors which effect the passage of said packet based data through the network; modelling the performance of the network based on said requirements and said factors; comparing the performance with an objective comparison model; iteratively adjusting said factors to improve the performance and maintain the network requirements; and outputting a plan of the network.

According to a second aspect of the present invention there is provided a network planning tool for planning a Network which is capable of passing packet based data therethrough, the tool comprising: an input for inputting the requirement of the network; an input for determining the factors which effect the passage of said packet based data through the network; a modelling module for modelling the performance of the network based on said requirements and said factors; a comparer for comparing the performance with an objective comparison model; a feedback mechanism for iteratively adjusting said factors to improve the performance and maintain the network requirements; and an output for outputting a plan of the network.

Advantageously, the tool is provided a software in machine readable form on a storage medium.

According to another aspect of the invention, there is provided a method of planning a network which is capable of passing packet based data therethrough, the method comprising; determining a set of requirements for the network; determining the factors which affect the passage of said packet based data through the network; modelling the performance of the network based on said requirements and said factors; a comparer for comparing the performance with an objective comparison model; responsive to said comparing iteratively adjusting said factors to improve the network model performance and to maintain the network requirements; and outputting a plan of the network.

The network plan may be output in the form of software. This plan may be employed locally, or it may be transmitted as a digital signal to a remote destination.

The bearer traffic envisaged for the network encompasses the full scope of voice, voice-band information (fax, modem, embedded access signalling, tones), but does not cover service or bearer signalling for connection establishment, or media gateway control.

The immediate problem with specifying bearer traffic path capabilities are that some standards are incomplete and in places ambiguous. There are also instances of where there are contradictory and differing standards for the same purpose.

The bearer capabilities can be broken down into two broad areas, and these are specified with the respect to the packet network. Where the network is an ATM network, the standards are well defined and are well controlled. The evolving networks are however expected to be 'IP based'. There is no one definition of 'IP-based', and the scope of variation is large. However, the definition used here is a protocol stack which includes an IP layer (explicit or implicit) for network addressing purposes. It will however be understood that the invention is relevant to all types of IP based networks however defined.

The following aspects of the bearer need to be specified for ATM and IP based networks:

1. Packet length, packet format, and ancillary bearer control—Packet length generally needs to be defined for voice codec information transfer. The packet length is a direct determinant of both delay and efficiency. There are some standards where packet length is well defined, but nearly all admit flexibility, and therefore need to be controlled for interworking purposes. There is usually a concomitant choice in packet format such as the optional exclusion of pointers in ATM network profile AAL-1 SDT and check sums in UDP, and the precise format(s) needs to be specified. Ancillary bearer control needs to be determined, such as the profile in ATM network profile AAL-2 that permits changing the codec algorithm, packet length, bit rate and sequence number behaviour, or the range of implemented features of the RTCP control channel.

2. Packet loss concealment and packet loss-rate tolerance—wireline codecs in particular have been developed for low-loss environments, and usually have little tolerance to this type of error. As packet length increases the effects of loss are much more deleterious to voice and especially voice-band data. Even in low-loss environments such as ATM, there is a finite chance of packet loss, and a receiver-only based PLC algorithm (usually interpolation) suffices. When loss rates increase to the order of 1 packet in 100, more sophisticated transmitter and receiver-based PLC is required when high quality targets must be met. However, transmitter-based PLC invariably increases delay and/or reduces bearer efficiency significantly. Note that some codecs have PLC mechanisms in-built. A receiver must also have a minimum tolerance to packet loss, which will require processing resources, and therefore must be specified.

3. Coding algorithm—coding algorithm must come from one of the standardised set of wireline or wireless codecs for interworking. The ITU-T mostly specifies wireline codecs in the G. series. Wireless codecs are often tied to wider wireless specifications, but often can be transported in wireline packet applications. Some of codec standards specify Voice Activity Detection (VAD) mechanisms and packet formats (packet based rather than sample based codecs) and provide mechanisms for Comfort Noise Generation (CNG) during non-speech intervals, such that the connection does not sound dead. In all interworking scenarios the coding algorithms acceptable during the connection lifetime must be specified, along with any modifying features, such as bit-rate, A/μ-law, VAD and CNG, and CNG update frequency.

4. Echo cancellation—required in nearly all instances of packet based communication when interworking with the PSTN/ISDN. Since the PSTN/ISDN has been engineered against a particular delay apportioned and loss-plan, the introduction of packetisation invariably will violate the delay apportionment. The inclusion of echo cancellation in network is therefore mandatory when interworking with the PSTN, when it is not reliably performed elsewhere (depending on network positioning, the PSTN may already have echo cancellation, at an exchange or in an end terminal, or it may be such that there is little or no echo signal). Echo cancellation may or may not be required when interworking between packet networks, and this will depend on the position in the network. Any echo cancellation must be specified in terms of echo return signal performance (which will generally have to outstrip standards to be acceptable), tail length (which will depend on network positioning), and will generally have to be transparent to voice-band data and tones.

5. Access signalling—depending on network positioning, embedded access signalling (which can compromise CAS and tone family, CCS etc.) will either be interpreted within the gateway or passed through transparently. This will depend on the distribution and architecture of call processing. Specification is only made where CS and tone information needs to be passed through transparently over packet-based networks.

6. Voice-band tones—full transparency to tones in any packet network connection is required for the purposes of tone-activated services such as credit card, pass codes, and network access. Where the codec is not PCM (G.711), not all compressed codecs can transport these tones recognisably without degradation. A workable solution is to detect the tones prior to coding, and forward them as messages associated with the connection (for emulation applications) or to call processing (access signalling, re-origination, add-on party etc.). For emulation applications the voice may need to be squelched, 7. Progress tone generation—a voice-band service towards the subscriber, where progress tones may be usually carried as voice packets. Depending on network positioning and implementation, progress tones may be being generated in the packet domain, and therefore need to be specified for interworking purposes.

8. Voice announcements—a voice-band service towards the subscriber, which in all instances when generated in the packet domain should be carried in an equivalent manner to normal voice packets.

9. Continuity checking, and connection performance measurement and fault isolation—connection orientated packet networks (e.g. ATM, RSVP, MPLS) in particular require the ability to determine the continued viability of bearer traffic transmission and receipt, and inside nodes the validity of connection tables and connection state reservation. ATM specifies OAM flows at the VP level, VC level, and the not yet fully standardised AAL-2 multiplex level, which permits continuity checking, performance quality, loop-back testing and general fault isolation. RSVP can measure continuity and performance, and standardisation work is underway to add OAM flow capability to MPLS. Where these features are associated on a per voice connection basis, and provide significant indication to the network call server and management system, the capabilities need to be specified.

10. Fax transparency and/or demodulation—full transparency to facsimile data in any packet network connection is required. Where the codec is not PCM (G.711), not all compressed codecs can transport facsimile recognisably without degradation. One preferred solution is to detect the fax modem tones prior to voice-band coding, and forward them as messages associated with the connection using T.30 demodulation (AAL-2) or T.38 (FoIP). Other methods are to allow a bit-rate dilation of the bearer path the G.711(AAL-2 principally). The mechanism for facsimile transparency needs to be specified.

11. Modem transparency and/or demodulation—has a similar requirement to facsimile, although where compressed codecs are used the messages transferred can simply be the base band data with the V.series modulation removed (i.e. full modem termination). This is not fully specified in AAL-2, although frame mode data could be used for this purpose. IP based networks in particular may or may not terminate the higher layer protocols coincident with the demodulation, but this will depend on gateway positioning and network security considerations. In all cases modem treatment needs to be specified.

12. Circuit mode data—ISDN BRA and PRA permit the use of 64 kb/s timeslots for clear channel data (H.series terminals, Frame Relay services etc.). Where the network provides a dialled wide-band service (not a leased service), then the means in the bearer of supporting a P×64 kb/s service needs to be specified.

13. Loudness rating—existing PSTN network equipment is part of a signal loss plan that makes adjustments to the loudness rating of voice-band signals to ensure even amplitude and control echo path signals. A gateway may have to make loudness rating adjustments according to its network positioning in a Succession HRX, and the equipment it may replace, and the degree of loudness control needs to be specified.

14. Dejitter capability—packet networks introduce a degree of packet arrival jitter at a receiver that delays packets by a varying amount following periodic generation at a transmitter. Jitter is caused by queuing mechanisms in network switches and routers, and possibly by multi-path routing in connectionless networks. Jitter may increase with increasing packet size and network loading. A receiver must specify jitter buffer size in units of time and the allocation per connection and across all connections if shared.

15. Low transfer delay—each network element introduces a transfer delay between input and output. This delay comprises internal process delays when transforming the traffic and in internal switch stages. The aim is to minimise this delay wherever possible, but in any event the delay must be limited to a budget apportionment derived from the invention. The input to output transfer delay must be specified for ingress to and egress from the packet based network, over and above the packetisation delay.

The media gateway is defined to be those collective functions that transform bearer traffic. The transformations are non-trivial changes, e.g. to adaptation layer, coding algorithm, and inband signalling. A media gateway can assume any position in an access or core network. The media gateway may interface between TDM and packet networks, and/or packet networks alone when a specific transformation is required to the protocol stack and/or the bearer contents. Packet to packet transformation admits packet-based access networks and campus networks into the Network architecture.

The present invention seeks to ensure that an eclectic collection of Network elements will inter-work at the bearer level in a Packet based Network. The key settings for the bearer profile are a choice dependent on desired voice quality. By measuring voice quality using the E-model either in an absolute or relative sense a requirement to satisfy a small number of determined voice qualities benchmarks commensurate with known user experience is achieved. The benchmark voice qualities for comparison purposes are identified below.

The invention further seeks to provide development of a Network Hypothetical Reference Connection (HRX) and its application strategy. This includes identification of the intrinsic and the immutable ingredients; the four degrees of freedom of the network and the network budget allocation strategy. In addition various Network access scenarios are presented along with the results of modeling the HRX. Thus providing budget allocation and accredited codecs rules and other rules for planning a Network.

BRIEF DESCRIPTION OF THE DRAWINGS

Embodiments of the invention will now be described with reference to the accompanying drawings in which:

FIG. 22 is a table showing E-model input parameters;
FIG. 25 is a table showing E-model codec impairments;
FIG. 33 is a table showing PSTN reference connection in a POTS access scenario model.

FIG. 36 is a table showing PSTN reference connections of TDM core transport summary;

FIG. 46 is a table showing HRX access scenario models for cable;

FIG. 48 is a table showing the core transport HRX access scenario;

FIG. 50 is a diagram showing the results of an HRX E-model results for trunk access;

FIG. 51 is a diagram showing the results of an HRX E-model results for ADSL access;

FIG. 52 is a diagram showing the results of an HRX E-model results for wireless access;

FIG. 59 is a table showing HRX delay and le budget for wireless access;

FIG. 64 is a table showing rank order of codecs based on voice quality performance;

FIG. 65 is a table showing the accredited codecs for clarity;

FIG. 66 is a table showing the accredited codecs for carrot;

FIG. 67 is a table showing the accredited codecs for cut;

DESCRIPTION OF PREFERRED EMBODIMENTS

Figure 1:
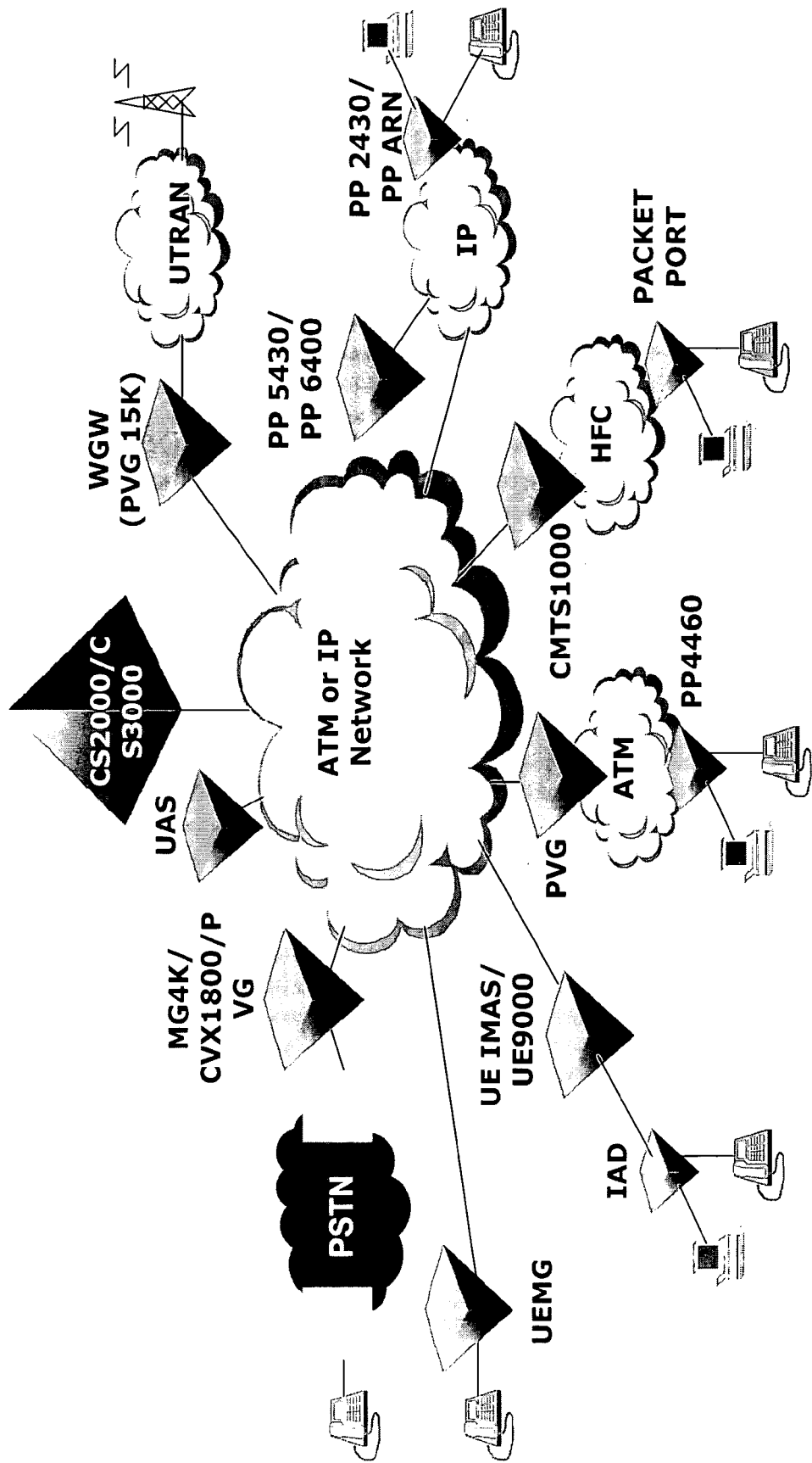
FIG. 1 is a schematic diagram of a packet-based network.

An exemplary packet based network is shown schematically in FIG. 1. The network of FIG. 1 comprises an eclectic collection of telecommunication products, all serving one or more roles of a Network Media Gateway (NMG (SMG in the drawings)). The Network encompasses a variety of access scenarios that will continue to broaden in the future, as will the scope and roles of the NMG. In all future Networks, it will be important to ensure the interoperability between all Telco products when designing Network, and compliance with all relevant Standards.

The Network may be Voice over Internet Protocol (IP) (VOIP), or Voice over ATM (VOA), where the IP layer may be supported by any further transmission, data link and network layers.

In order to model the network of FIG. 1, a clear definition of what the bearer protocol stack and in-band and out-of-band capabilities are is necessary to ensure interworking. Since some standards are incomplete or open to interpretation and have optional parts not always implemented in a product, a clear and comprehensive list of features of a particular bearer protocol are required. In addition actual bearer capabilities will vary according to the role an NMG plays in the network. This will need a determination of some of the following issues:

is access signalling to be terminated;
is the termination downstream or upstream;
are there any fax, modem, CPT, voice announcement to be considered.

A list of acceptable network bearer profiles are specified. The bearer capabilities of a given product are accredited both by being a valid subset of a bearer profile (some features call-negotiable), and by the NMG role the product is to fulfil in the network.

In specifying the bearer profile, the earlier listed components need to be specified in the widest sense of the role of the NMG and the planning of the network, these are detailed below. The Packet protocol stack information such as the transport, data-link and networking layers (there could be several nested levels), the use of optional trunk group multiplexing and address/header compression must be determined or specified. The range of possible codecs, the acceptable bit rates, the use of and algorithm for Voice Activity (VAD) and Comfort Noise (CNG), and any encoding variants (A/u) must be determined or specified. Packet length and format, the number of codec frames per packet and specification of optional features such as sequence numbers and other controls are also required. Ancillary bearer control including support for controlling quality such as bit rate changes, packet loss, and end-to-end jitter must be determined or specified. Packet loss tolerances, packet loss concealment algorithms, receiver tolerance, any use of special encoding at the transmitter are also required. Facsimile and modem treatments including clear channel or demodulation method and particular encoding are needed. Access signaling treatment such as CAS encoding mechanism and the method for tone transparency in voice-band or messaging must be specified. This is dependent on the role of the NMG. Voice-band tone treatment (DTMF & call progress) including messages in-band and out-band, voice squelching strategy must be detailed. Echo cancellation including availability thereof and echo signal return loss quality, adjustments to loudness rating must also be determined. The tail length of the echo is dependent on the NMG role. Connection continuity, performance measurements and fault isolation detection method are also required. Details of the circuit mode data and support therefor must be specified. Receiver de-jitter tolerance, which is partially dependent on the role of the NMG, must also be determined.

Since the Network needs to be accredited as appropriate, it is necessary to ensure that the Network complies with appropriate standards wherever possible. It is also necessary to specify a list of codecs, packet sizes, loss rate and jitter targets that will ensure "Network voice quality" meets a defined level of acceptability, these being the four degrees of relative freedom in parameter selection under control of any Telco.

There are basically two broadly distinct packet protocol stacks IP and ATM. The provision of the voice-over-ATM protocol stack is straightforward. Firstly select the adaptation layer, secondly select the codec that will give acceptable performance or service compatibility and thirdly fix the packet sizes that give acceptable performance, where ATM transport provides a well-defined packet-loss rate and a bounded jitter.

Voice-over-IP however can only be defined as having IP in the stack. The format of voice above is as much driven by RFCs as it may be by proprietary applications (codec and packet size). (User versus Network). The supporting layers are manifold as are the mechanisms for congestion control (affecting jitter and packet loss rates). Supporting layer and congestion control accreditation is fully SMG role dependent. These factors can be fixed to tolerable amounts as per ATM.

Figure 2:
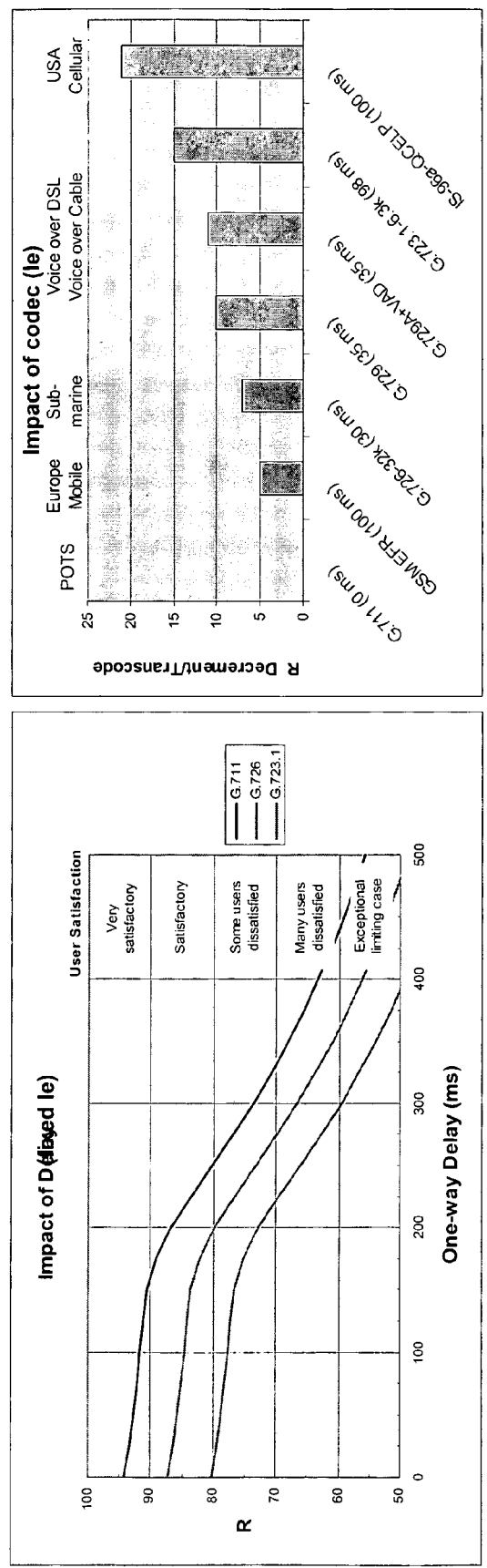
FIG. 2 is two graphs showing the E-model voice quality metric - "R value" and its impact on the codec.

FIG. 2 is a graph illustrating the E-model voice quality metric. The R-value describes the perceived quality of speech and forms a calculated objective measure calibrated by subjective tests. Delay begins to impact R value significantly above 200 ms. Independent of codec used, delay is introduced by packetization, codec look-ahead, jitter in source and network. Quality of the codec impacts the R-value directly, as does packet loss depending on the codec. Direct transcoding to or from certain codecs can improve on the 'via G.111 ' value.

Figure 3:
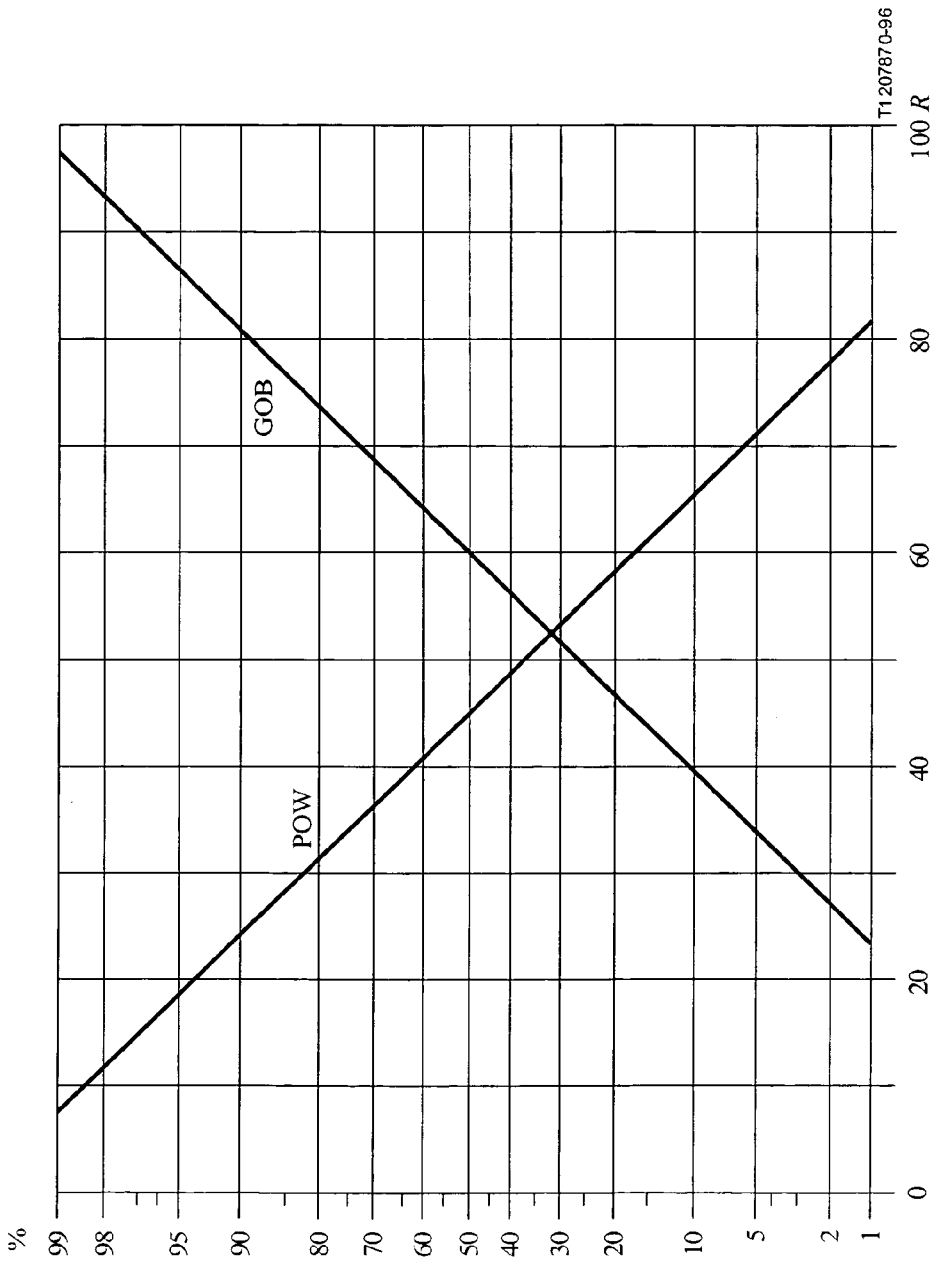
FIG. 3 is a graph showing R value and PoW/GoB values of rating factor R.
Figure 4:
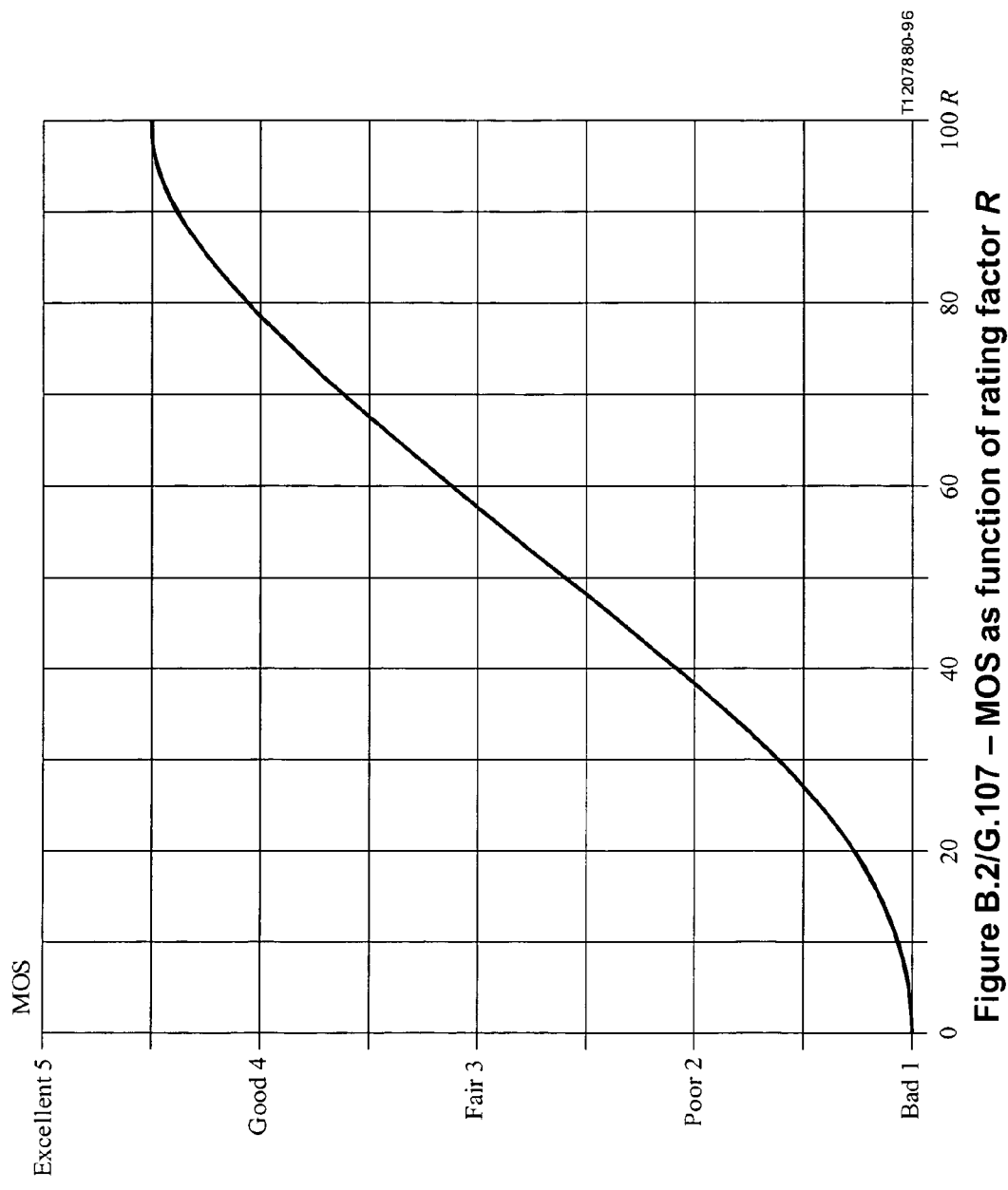
FIG. 4 is a graph showing MOS as a function of rating factor R.

FIG. 3 is a graph of R-value versus poor or worse than poor (POW) and good or better than good (GOB). FIG. 4 is a graph of R-value versus measure of service (MOS).

Figure 5:
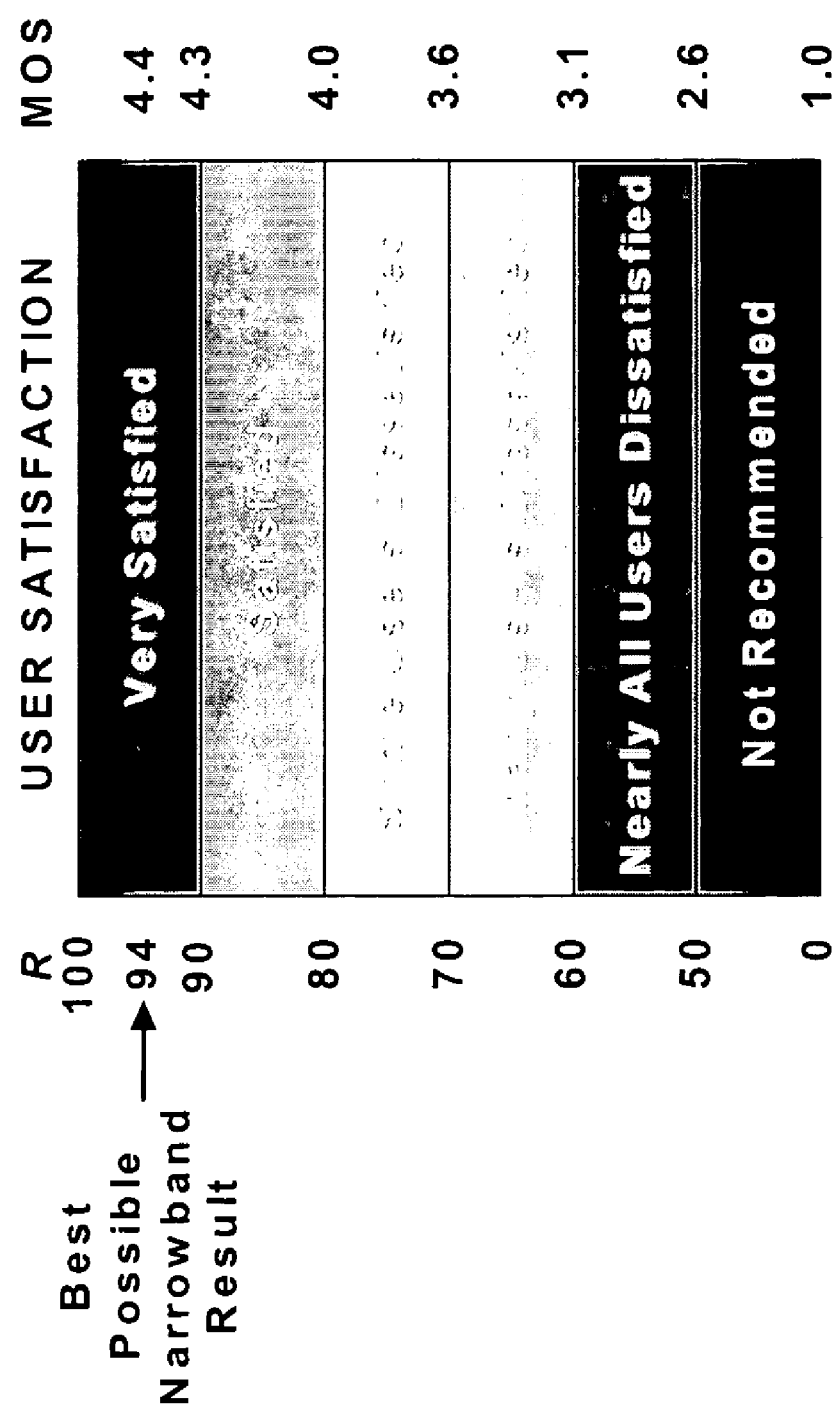
FIG. 5 is a scale showing network of voice quality.

FIG. 5 is a metric showing how user satisfaction is measured with respect to R-value and MOS. ITU-T G.109 draws decile thresholds for user satisfaction, but the R-value can and should not be used in absolute terms. R is a continuum and there is no discernable difference between R=$69$ & R=$71$. As the E-model is developed and its accuracy enhanced there may be changes, which should be factored into the Network model. The relationship to other subjective measures is highly non-linear and the most significant is the percentage of the population, which is satisfied or dissatisfied. The ongoing debate regarding the representative talker model & hence R will continue and should continue to be a relevant factor to the Network. At present relative comparisons between R can be drawn, as can the significance of any difference, whether due to distortion or delay. The target voice quality of the Network is the next consideration, which depends on the Network customer. The present invention proposes a new hypothesis in which a small number of voice quality benchmarks are used. These have been identified as Clarity, Carrot and Cut Price, and are discussed below.

Clarity is Quality first, with other advantages such as low cost second, which is comparable and equivalent to existing networks. Carriers wishing to extend or replace their PSTN and mobile networks with core and access technologies would want this. User expectation is firmly established in PSTN and mobile use there is not necessarily any user incentive to alter that perception. The Carrier has full control over the network technologies and their deployment.

Carrot or incentive combines quality and low cost or some other advantage traded. This delivers lower quality than existing networks by a controlled degree for some user incentive. A conventional or alternative operator that provides distinct advantages to the user to lower expectation where the operator gains from a wider technology selection. Control of terminal equipment may or may not be under the operator control.

Cut Price is a low cost, variety first and quality second scheme with a just serviceable quality at a rock-bottom competitive price. Control of terminal equipment may reside mostly with the user.

Clarity may be inescapable for traditional carriers. In this scheme packet networks will initially extend and/or replace core TDM networks, where the user is mostly unaware of the desire for technology change. Packet networks will evolve to supplement/usurp the access infrastructure too, where POTS telephony is still a user service (UEMG lines, VoDSL, packet cable, Enterprise, and a planned integration with 3G wireless access). Since the Packet Network is a replacement technology, the voice quality stakes are the highest where user expectation is unchanged, especially where access is a packet-based substitute for the PSTN. The national and the international scenarios are the two most demanding applications. Long distance voice in the US due to the competitive IEC market and international voice due to distance and submarine bandwidth constraints, the multi-operator equipment budget, and a growing business and residential demand for voice cultivated by the Internet global marketplace and competitive tariff needs. It is important to remember that for international calls there is a requirement to use expensive submarine fiber, which has considerable bandwidth limitations, which at present are not surpassable. Thus the user perception of fixed and mobile telephony voice quality must remain for the most part unaltered from their current performance, if not improved, for both national and international connections. This continues to but this places rigorous constraints on packet networks.

Using either the Carrot or Cut schemes, voice quality is joint second or wholly third as a priority. There is undoubtedly a market for voice quality below the PSTN benchmark. At present, customers use mobile phones that suffer poor voice quality inherently, and increasingly as coverage wanes, the advantage of being mobile outweighs the reduction in quality. Currently customers use Internet telephony, which, at present, is of very poor quality, but it is almost free. Users have experienced other voice qualities that they are prepared to accept for myriad advantages, such as convenience, compatibility, price, and the E-model has even accounted for an 'A' additive advantage factor. In the extreme, users may trade quality for price themselves, e.g. use high compression codecs to get more voice channels in a given bandwidth. Allowing other voice quality targets for the Network eases the constraints and permits a wider range of codecs, packetisation delay, packet loss and jitter tolerance. Just as for the PSTN, quality below that can only be appreciated against some previous known experience, such as a typical mobile call, or a long international call. This avoids the pitfalls in using the E-model as an absolute predictor.

Figure 6:
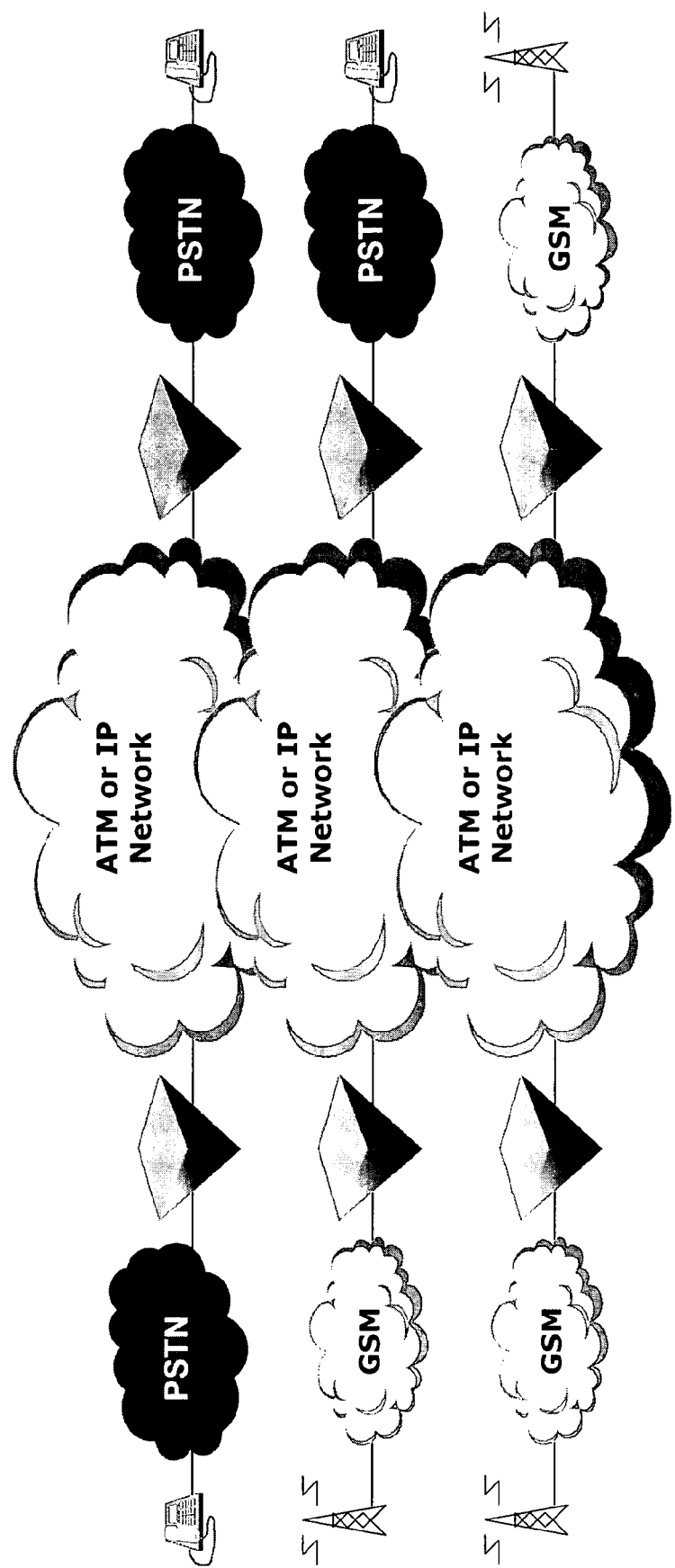
FIG. 6 is a schematic diagram showing different types of network.

Against what benchmarks should the Network quality be measured? For Clarity it is sensible to measure Network voice quality against a benchmark in accord with the most appropriate access scenario: PSTN analogue phone to PSTN analogue phone; mobile phone to PSTN analogue phone; and mobile phone to mobile phone. This is illustrated in FIG. 6.

Newer wired access technologies (cable, VODSL) can and should be measured against the PSTN access they replace. For the Carrot & Cut lower quality benchmarks than the PSTN, we have chosen benchmarks that provide 'significant' (~100 ms) and 'very significant' (~150 ms) delay margin respectively, when compared with Clarity. Delay can be traded for impairment. To ensure the greatest freedom in and most relevance of the accreditation exercise, it is sensible to reflect typical technology in all cases where the GSM EFR codec is a state-of-the-art measure of good quality mobile and where there is not much difference between analogue and digital PSTN.

The actual benchmark a customer wishes to meet may differ from the above principles, however the above benchmarks are for the purposes of accreditation and product design. For Clarity, a Clarity rated bearer profile must be selected, for Carrot, either Clarity or Carrot bearer profiles should suffice, and so on. Only real network modelling can confirm the suitability of any given accredited profile to a customer network.

Figure 7:
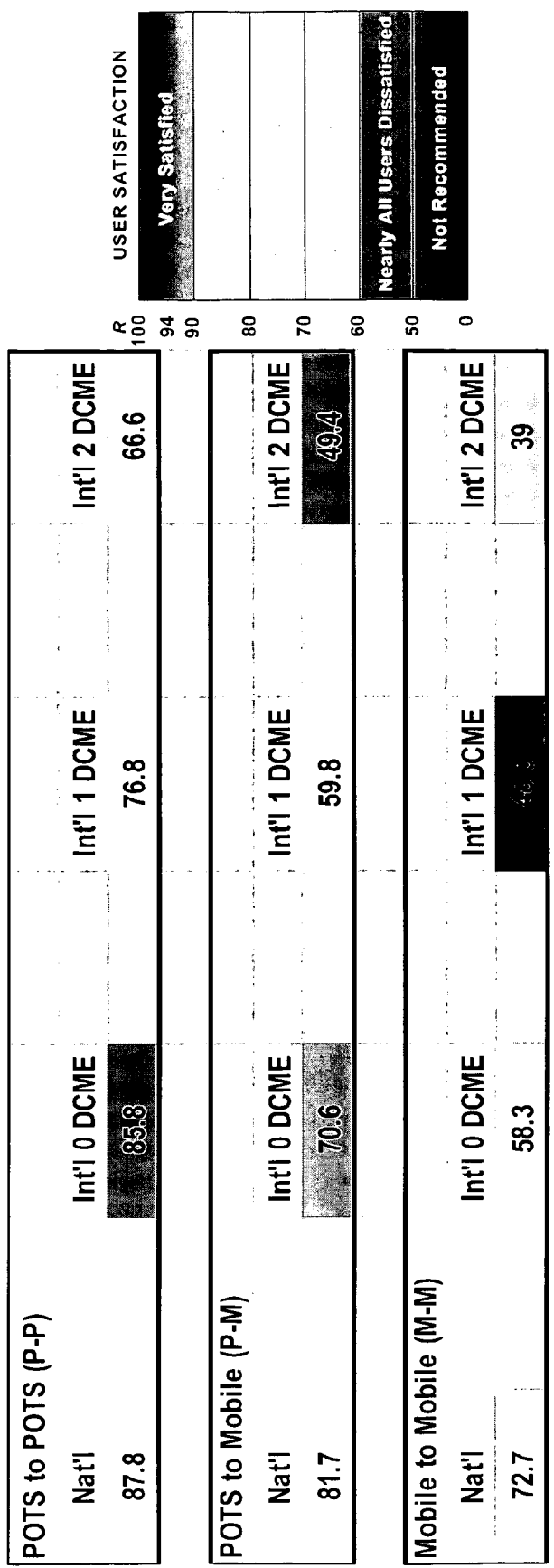
FIG. 7 is a chart showing some typic benchmark measures.

FIG. 7 shows an exemplary benchmark. Most of the PSTN voice will be deemed acceptable, but the international mobile is below a level of acceptability. The use of DCME (digital circuit multiplexing equipment) is typical. DCME tandem-avoidance and mobile Transcoder Free Operation (TrFO) are only just beginning to be introduced, which will raise quality levels and concomitantly user expectations.

It has been common practice for carriers to work to budget allocation standards for nodal roles within their networks, such as transmission, switching and access delays, loudness ratings, echo signal path performance and quantisation distortion. The budget and allocation is derived from a hypothetical reference connection (HRX) model usually based on the most demanding connection (international 27,500 km), but also likely scenarios of well recognized connection reference points. The connection is hypothetical in the sense that it takes a sensible stab at the distances and number and type of equipment involved, usually lumping together common parts, rather than being a model of a real network connection.

Equipment built to the appropriate allocation, invariably from more than one vendor, ensures that a reasonable amount of planning in real network scenarios can yield workable results. The HRX does not circumvent the need to perform the real planning cycle. For the purposes bearer profile accreditation the Network needs a bearer HRX (among others) to determine a budget allocation for achieving various grades of voice quality. The Network HRX must encompass both legacy and new access technologies, to determine the accredited range of codecs, packet sizes, loss rates and jitter.

Figure 8:
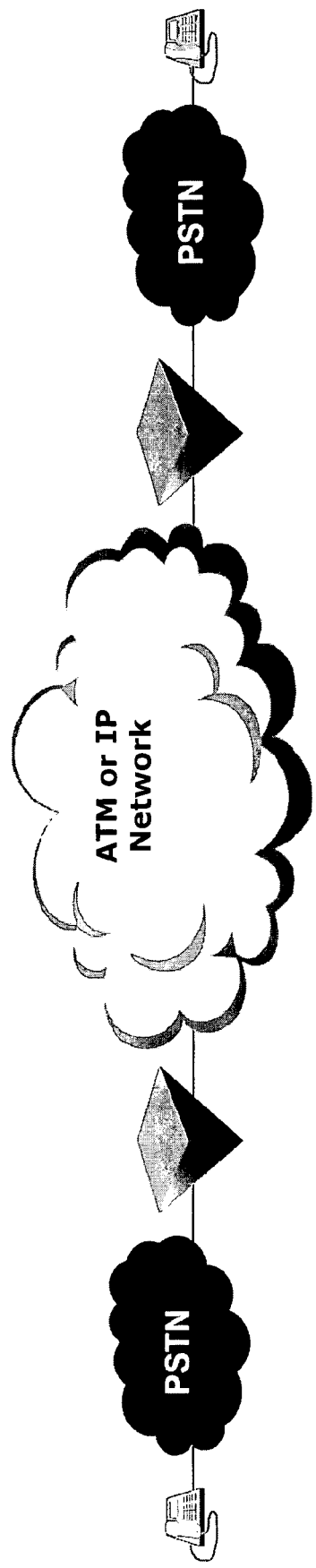
FIG. 8 is a schematic drawing showing reference calls, national and international.

FIG. 8 considers what reference calls are the most demanding from the following:

2,000 km local call;

8,000 km longest national call;

16,000 km international adjacent country call; or 27,500 km longest international call.

The answer will depend on a number of factors. Over short distances, since many networks use passive loss to control echo, and packet networks introduce sufficient delay to demand echo cancellation, there is in fact an overall improvement in quality which can be misleading. There are two stress-tests; national voice (→8,000 km) in a network in which echo cancellation is already present; and the longest international connection (27,000), in which any semblance of quality has to contend with extremes of delay and typical use of compression on submarine links.

Arguing that compression is no longer necessary is moot. Submarine links do not share the same fibre technological criteria as terrestrial links, and bandwidth is not necessarily cheap as the facilities are often leased from consortia that install them. However an argument that claims DCME is no longer necessary simply raises the bar for the Network international benchmarks. In any event, use of compression for Network international is optional according to customer.

Figure 9:
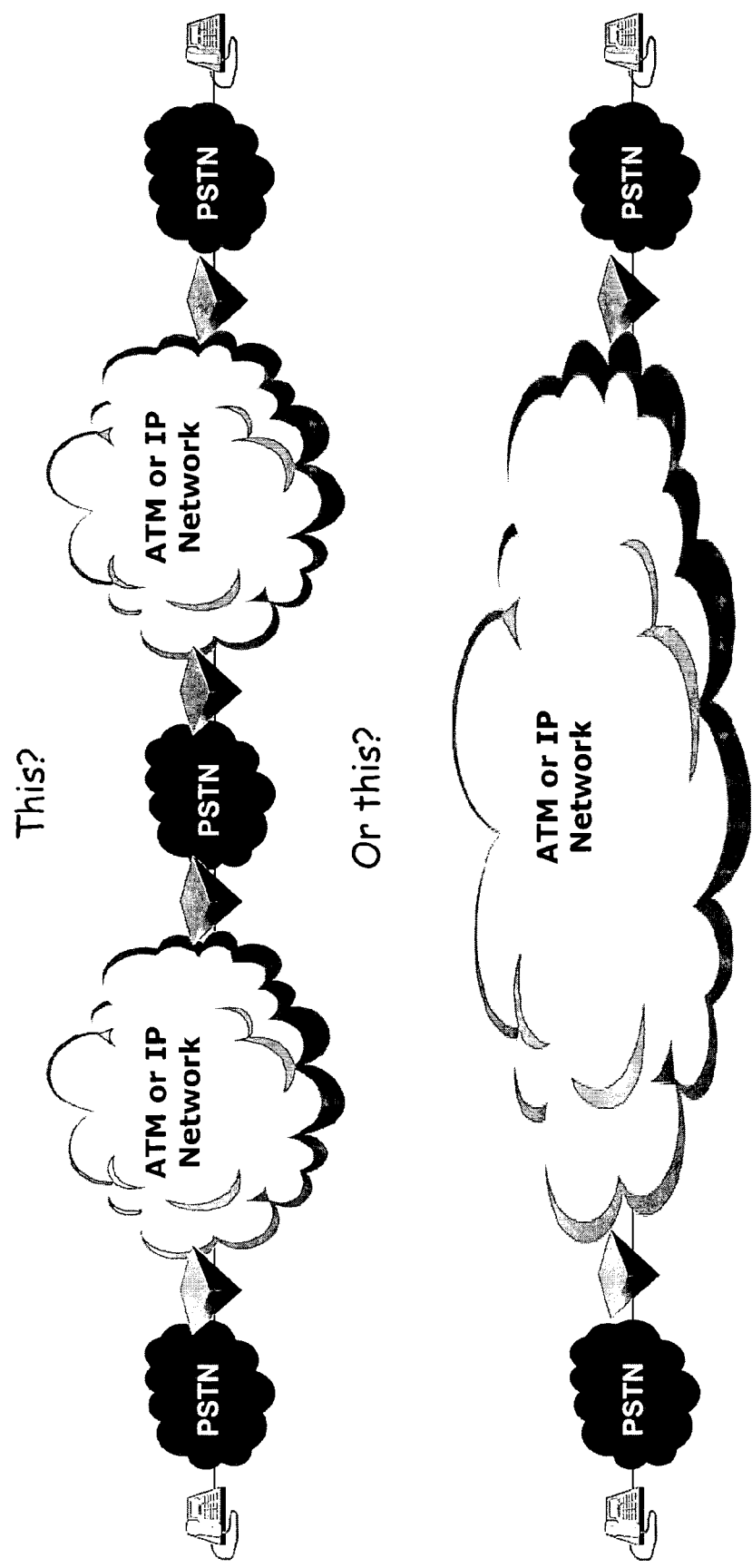
FIG. 9 is a schematic diagram showing bench network type marks for accreditation purposes.

FIG. 9 considers what the best representation of the end-to-end network would be. Packet core networks introduce artifacts, for example extra delay due to packetisation, and packet loss and statistical jitter from uncontrolled congestion, so prima facie, matters cannot improve. This is as much true for national as for longest international calls. Matters worsen where voice is carried in concatenated packet networks with TDM hand-off (replicating packetisation, jitter—mostly caused by the first couple of switching nodes, packet loss mitigation). Concatenated packet network artifacts would be acute in the longest international connections where it is more likely a multi-operator scenario is forcing budgets to be assigned more sparingly. A TDM hand-off would continue use of DCME in the submarine links, unnecessarily tandeming codecs.

For bearer profile accreditation purposes we have assumed the Network will be at most one continuous packet network for all quality levels. This simplifies the process of accreditation and can be arranged in practice, amortizing packet network artifacts end-to-end, avoiding the need for tandemed compression—recouping significant delay margin in international calls. In addition it still permits TDM hand-off where Clarity does not need to be achieved.

The Network HRX strategy will now be considered. Seven Network access scenarios are considered to be representative of what has or will be bid in a typical Network. The interoperation between the access scenarios must be fully considered. In any given access scenario there are a number of immutable parameters, which comprise pre-assigned HRX budgets to legacy equipment (PSTN, mobile), and the typical use of compression (mobile, enterprise).

Four parameters are usually within the control of any Network design: packetisation delay, delay jitter bound, codec and packet loss bound. The following four steps show how the HRX strategy may be carried out.

Step 1: The Network access scenarios have all been modeled end-to-end in combination with these parameters set to zero or a standardized default.

Step 2: They are then compared with a benchmark that most closely resembles the access scenario and is representative of the desired quality (Clarity, Carrot, Cut) in an existing network. This determines the available margin.

Step 3: The margin is available for distribution between the four parameters, divided suitably between the SMG roles, and non-Network nodes. Since there are two dimensions (impairment and delay) a margin contour system is implemented.

Step 4: The budget allocation strategy determines what combinations are valid, and how closely the Network can rival today's quality.

Figure 10:
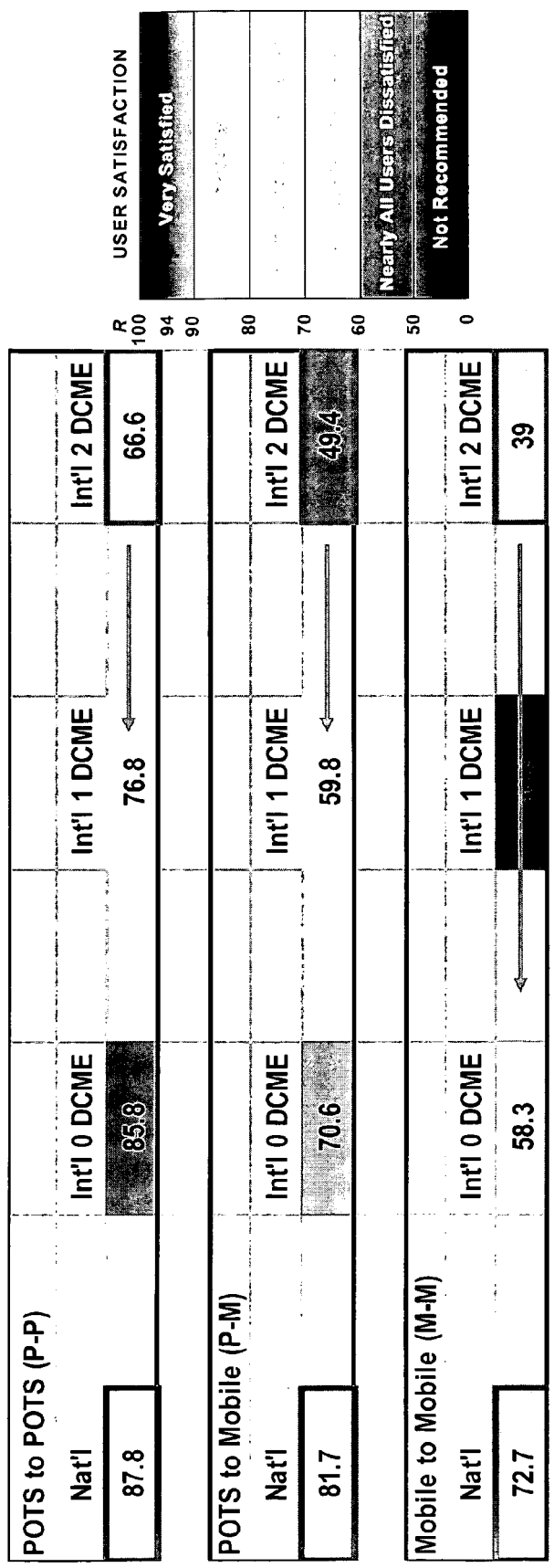
FIG. 10 is a graph showing succession benchmarks for clarity.

FIG. 10 shows some benchmarks for Clarity. The access scenario is matched exactly with the POTS/Mobile as appropriate. The national benchmark (blue) aims to meet the national PSTN. A small difference in R* should not be discernible, and buys medium delay (~40 ms) but limited impairment. The international benchmarks (red) aims to improve over the POTS/Mobile (2 DCME typical) but still allow for medium delay and limited impairment for submarine links.

International M-M should improve more, as the inherent compression can be used.

Figure 11:
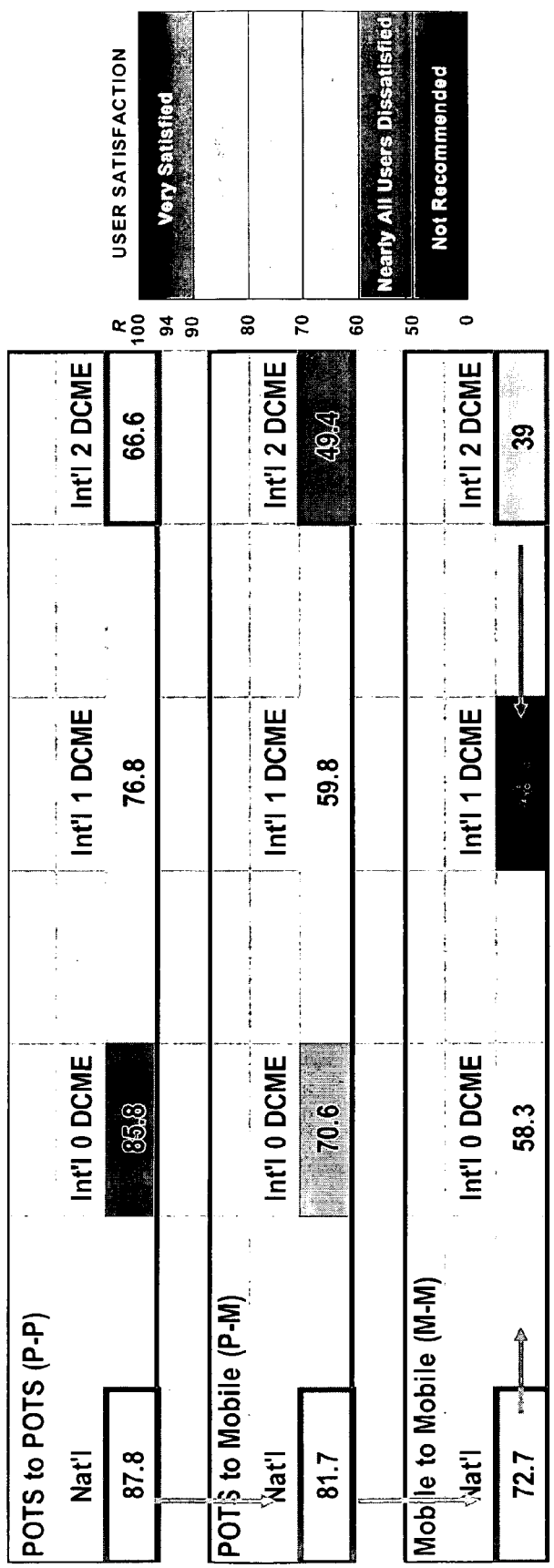
FIG. 11 is a graph showing succession benchmarks, for carrot.

FIG. 11 shows some benchmarks for Carrot. The national benchmark (blue) aims to be R (10 over Clarity), allowing significant additional delay (~100 ms) and the impairment of a good quality codec (low compression M—M, high compression P—P/P-M). The international benchmarks (red) aims to meet the equivalent POTS/Mobile (2 DCME) scenario for R (10 over Clarity), but allow significant delay and the impairment of a good quality codec for submarine links (low compression for M—M with no TrFO, high compression P—P/P-M).

Figure 12:
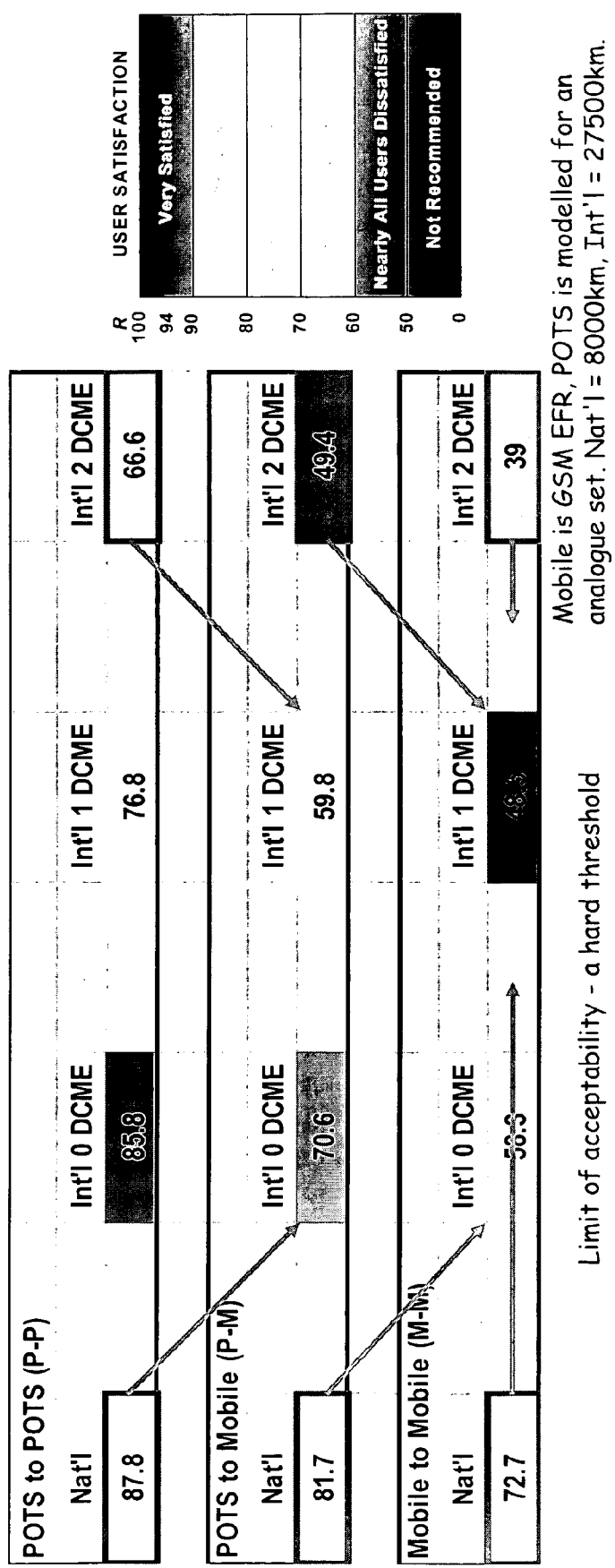
FIG. 12 is a graph showing succession benchmarks, for cut.

FIG. 12 shows some benchmarks for Cut. The national benchmark (blue) aims to be R (20 over Clarity), by allowing very significant additional delay (~150 ms) and the impairment of a good quality access and a network codec (low compression M—M, high compression P—P/P-M). The international benchmarks (red) aim to be R (10+ over Clarity), by allowing very significant delay and the impairment of a good quality access and network codec for submarine links (one low compression for M—M with no TrFO, but no additional distortion, high compression P—P/P-M).

The next consideration concerns how the margin between Network and the PSTN benchmark should be allocated. When modelling the Network access scenario combinations, for each quality level, only the intrinsic delays have been taken. This results in an R margin for allocation between delay and impairment. Since packetisation, jitter (to a certain extent) and packet loss, are dependent on the codec, this becomes the primary allocation parameter. Thereafter the sequence goes as follows.

Packetisation delay (including look-ahead delay for the particular codec)—there being a range of possibilities;

Jitter in the source—some source networks are low-speed, taking into account relative voice and data b/w utilisation, link speed, and packetisation;

Jitter in the core network—takes into account a congestion model of 90% voice b/w utilisation which is concomitant with negligible packet loss; and Packet loss—spare margin can be traded off for extra core network jitter at a receiving SMG, and an increasing percentage packet loss which increases the impairment.

Since it is assumed there is a packet network end-to end between SMGs or users, the individual parameters may be easily assigned to any given SMG role.

The following access scenarios must be supported in Network:

Trunk access in which initial deployment, the TDM core network is supplemented and ultimately replaced by packet technology. The interface to the PSTN is principally at the Tandem Office, although the End Office may be a consideration too.

Line access in which evolved Network deployment will include POTS line access by supplementing and ultimately replacing the End Office (ILEC).

VODSL access in which evolved Network deployment will include packet voice access to deliver full packet based end user service (ILEC & CLEC), with CLE and CPE equipment varieties.

Enterprise in which evolved Network deployment will encompass two forms of Enterprise: the CLEC interspan using packet based CLE/CPE for voice and data backhaul to a traditional End Office; and the routed LAN access via a gateway.

Cable access in which evolved Network deployment will include packet voice access over the cable network, which is backhauled to a point equivalent to a Tandem Office.

Wireless access initially incorporating the GSM/CDMA type architecture of circuit switched voice interfacing at the MSC Tandem Office equivalent. This will evolve to a fuller integration of 3G wireless, the wireless gateway is a component of the core network. Ultimately mobility type services are available to all terminal types.

Figure 13:
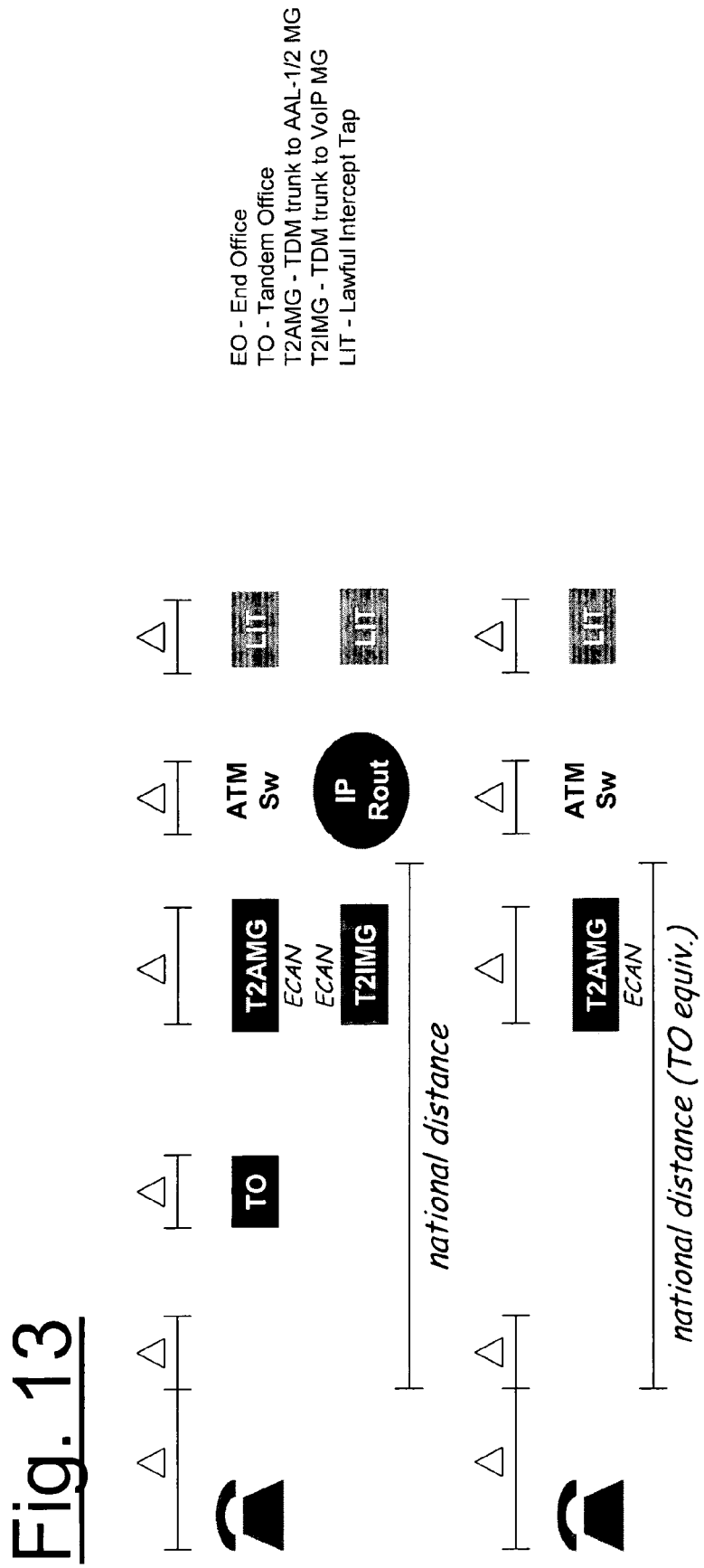
FIG. 13 is a schematic diagram showing network trunk access.

FIG. 13 shows various aspects of trunk access in the network. There is a need to determine existing budget apportionment to PSTN in terms of switching delay, access delay, control of loudness, and typical distances. Initially theoretically minimum figures are used for the ATM and IP SMGs disregarding codec, packetisation and jitter buffering. Typical figures for ATM switches & IP routers are used. The remaining budget for HRX can then be apportioned to the LIT packet replication and SMGs.

Figure 14:
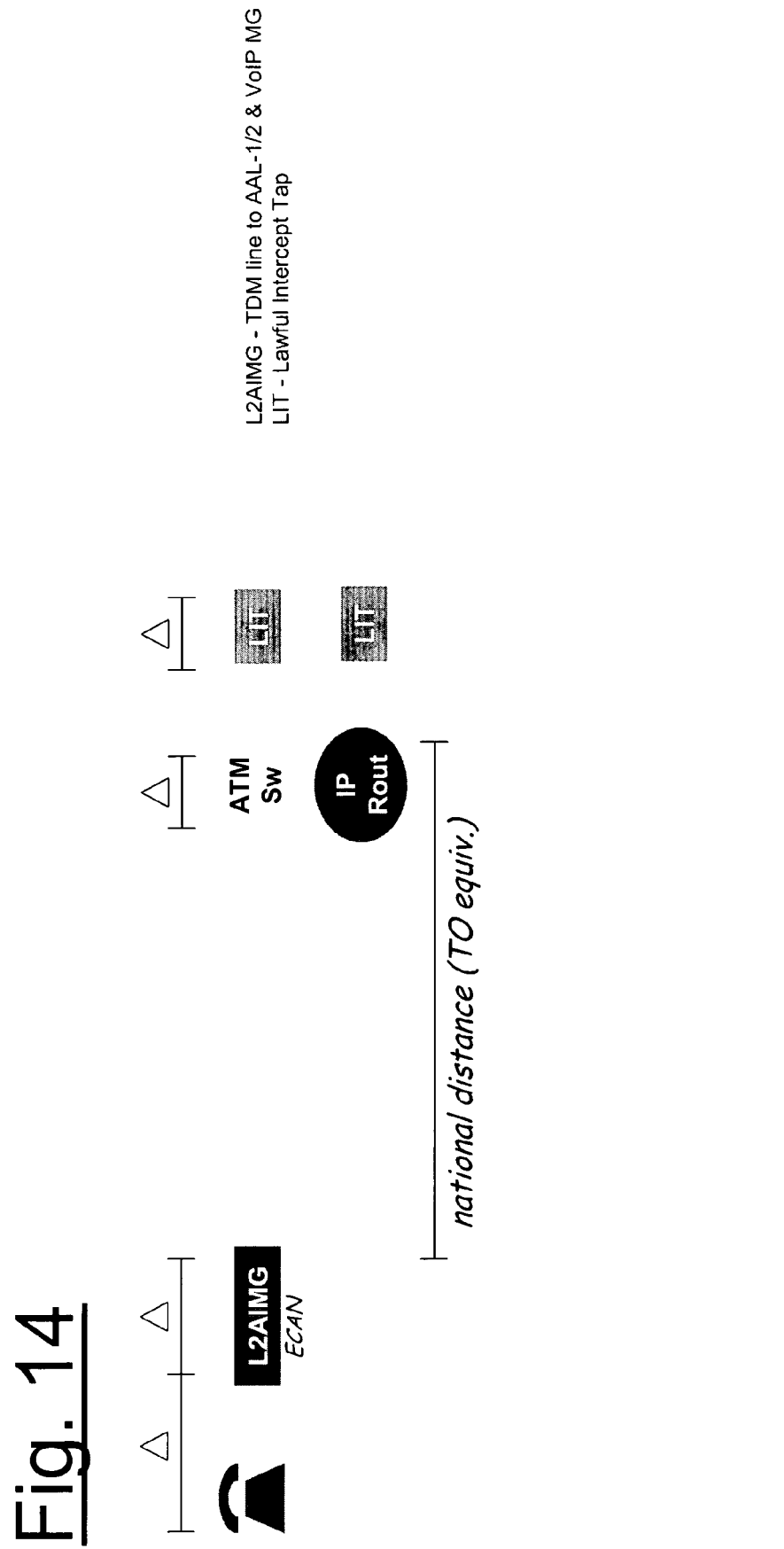
FIG. 14 is a schematic diagram showing network line access.

FIG. 14 shows various aspects of the Network Line access. There is a need to determine budget apportionment for lines access including switching delay (ATM & IP router typical figures), access delay, and typical distances. Initially theoretically minimum figures for the SMG disregarding packetisation of G.711, and potential use of compressed codecs. All switching/routing stages are distance related. The remaining budget for HRX can then be apportioned to the LIT packet replication and SMG.

Figure 15:
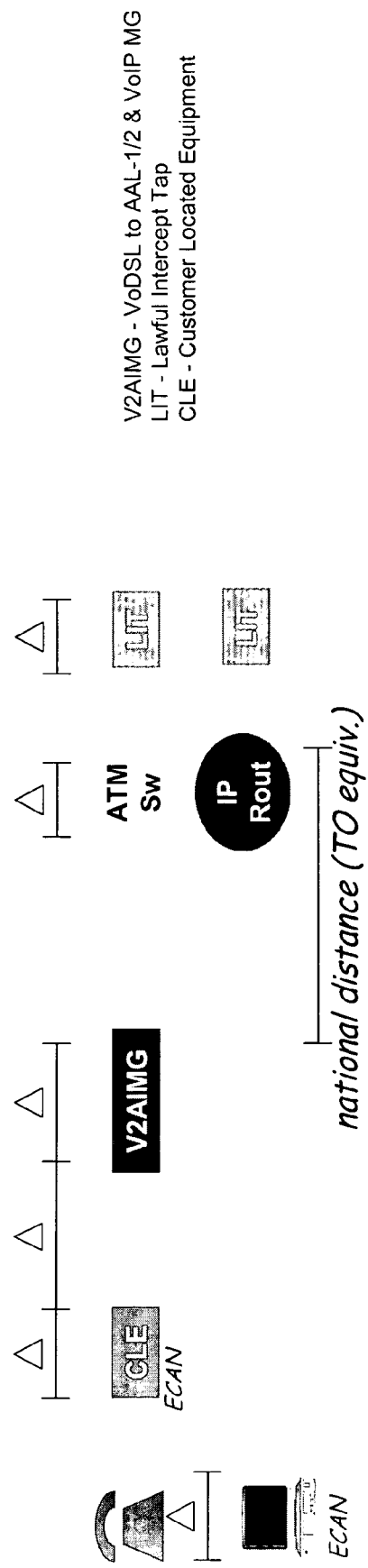
FIG. 15 is a schematic diagram showing a network VoDSL access.

FIG. 15 shows various aspects of Network VoDSL Access. There is a need to determine budget apportionment for VoDSL access including switching delay (ATM & IP router typical figures), access delay, and typical distances. Initially theoretically minimum figures for CLE & SMG disregard packetisation of G.711 and use of compressed codecs, any transcoding in an SMG to AAL-1 (may be typical in early penetration). All switching/routing stages are be distance related. The remaining budget for HRX can then be apportioned to the LIT packet replication and SMG/CLE, also allowing for possible transcoding in the SMG.

Figure 16:
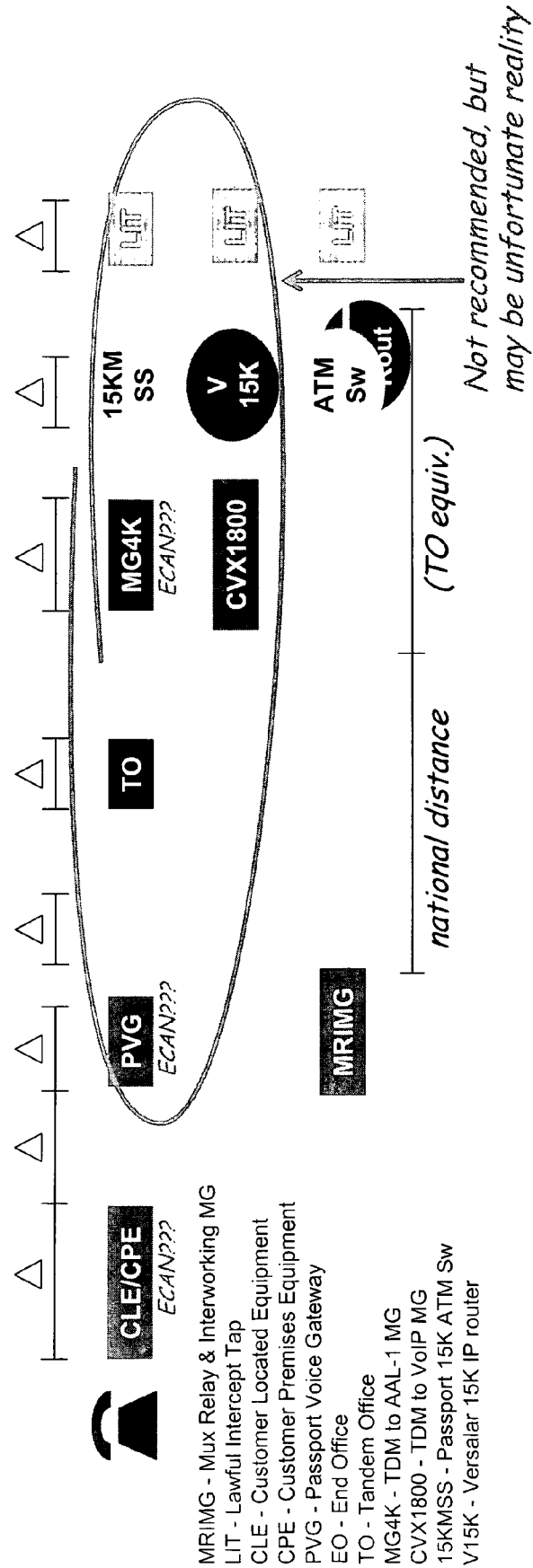
FIG. 16 is a schematic diagram showing a network enterprise access.

FIG. 16 shows various aspects of Network Enterprise Access. There is a need to determine budget apportionment for Enterprise access including T1 access delay, switching delay (typical ATM Sw & IP router delays), and typical distances (TO, campus size). Initially theoretically minimum figures for CLE/CPE & SMGs (4K, 1800, PVG, MRIMG (PVG 15K)) disregarding packetisation of compressed codecs and transcoding in the MRIMG to AAL-1 (early penetration), and general transcoding in MRIMG (accounted as part of core). All switching/routing stages are distance related. The remaining budget for HRX can then be apportioned to the LIT packet replication and SMGs', CLE's, CPE's, and transcoding in MRIMG (early penetration).

Figure 17:
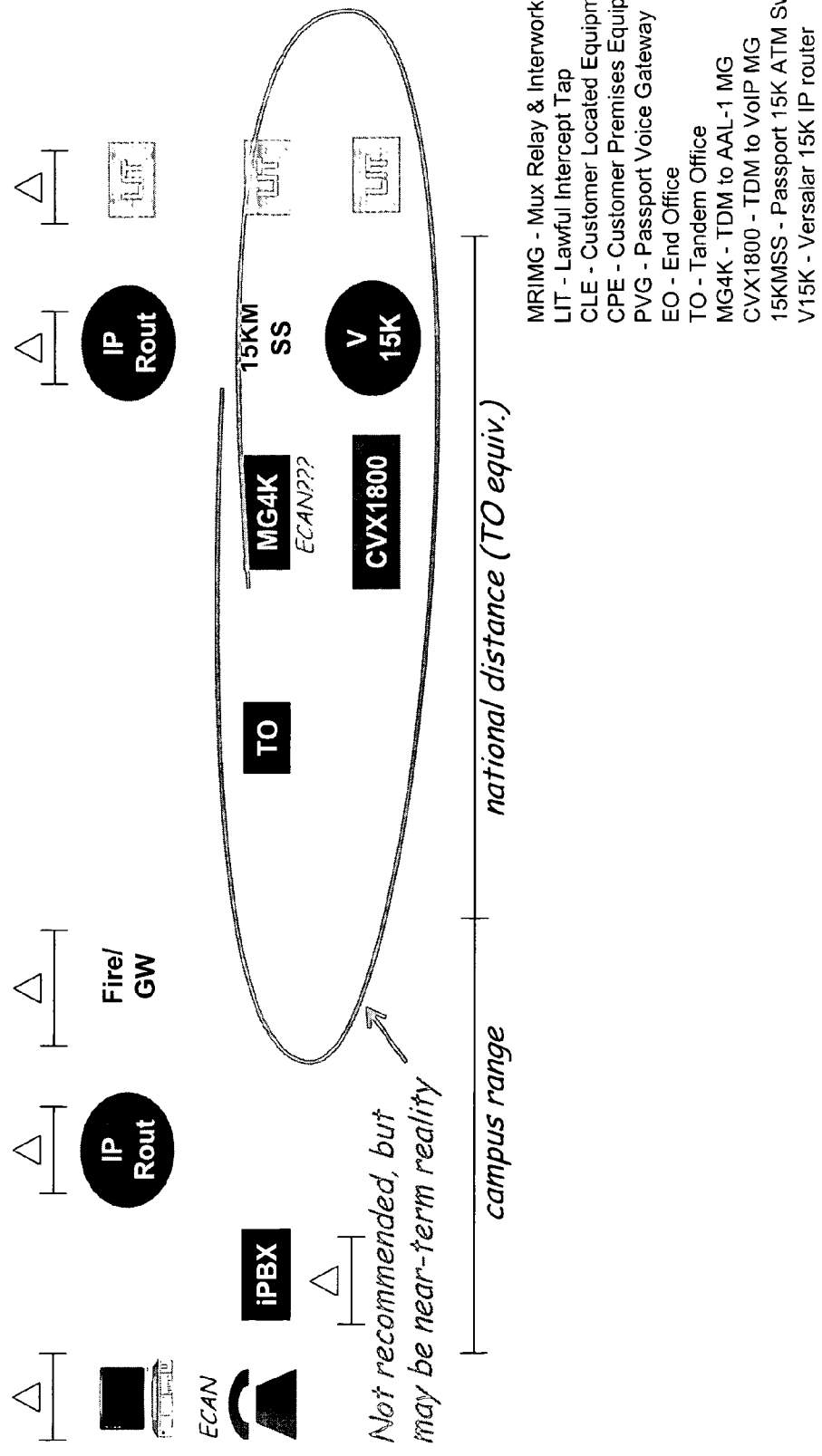
FIG. 17 is schematic diagram showing a further network enterprise access.

FIG. 17 shows further aspects of Network Enterprise Access. Here the remaining budget for HRX can then be apportioned to the LIT packet replication and PC's, PBX packetisation.

Figure 18:
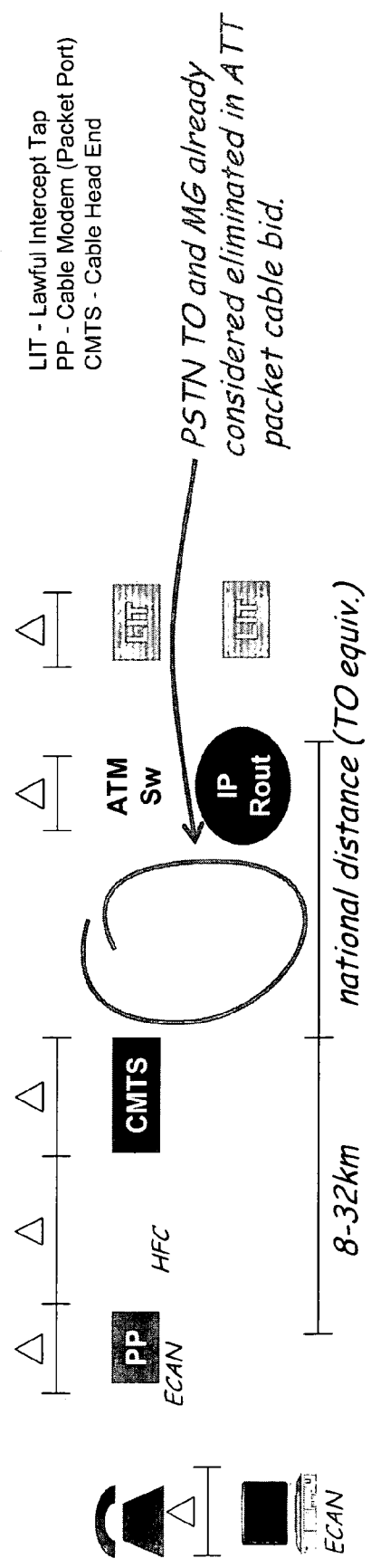
FIG. 18 is a schematic diagram showing a network cable access.

FIG. 18 shows various aspects of Network Cable Access. There is a need to determine budget apportionment for Cable access including co-ax access delay, switching delay (typical ATM Sw & IP router delays), typical distances (CLE to CHE, CHE to TO equiv point), and protocol delays (MAC at CLE and Head-end). Initially theoretically minimum figures for CLE & CHE are used disregarding packetisation of possibly compressed codecs. All switching/routing stages are distance related. The remaining budget for HRX can then be apportioned to the LIT packet replication and CLE's/PC's packetisation and jitter.

Figure 19:
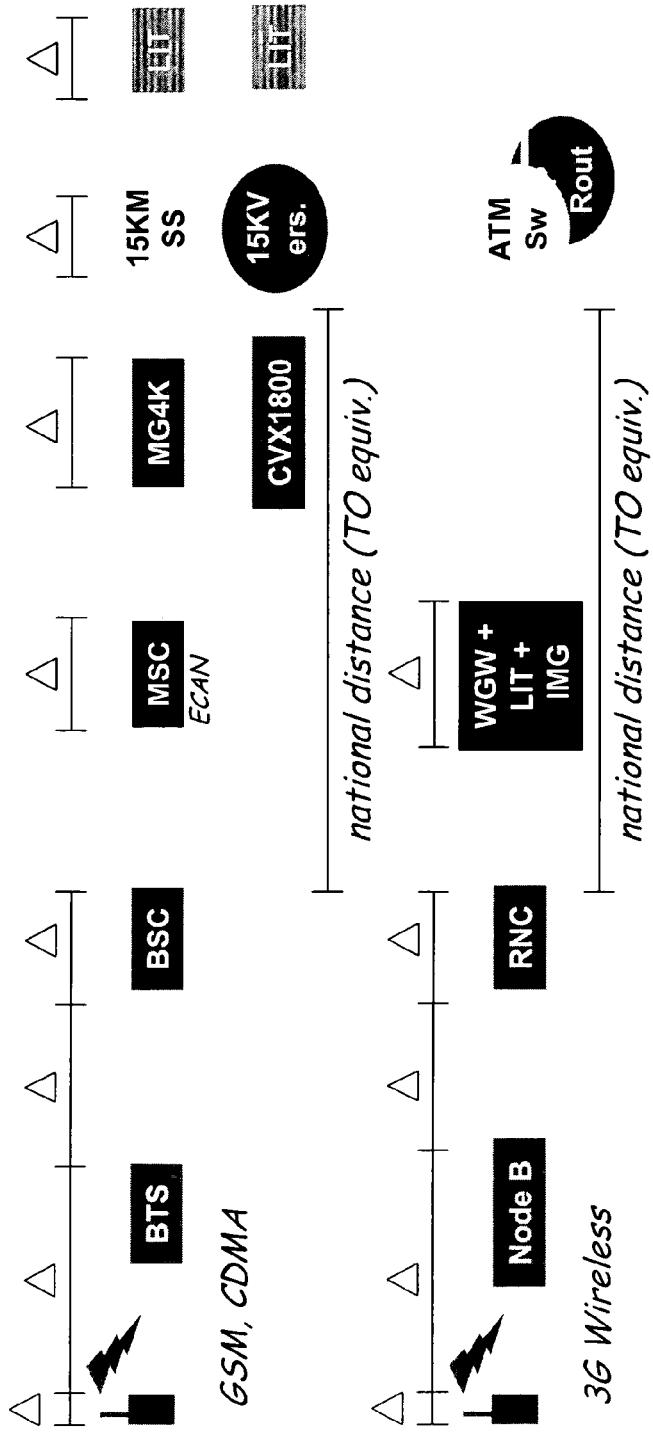
FIG. 19 is a schematic diagram showing a network wireless access.

FIG. 19 shows various aspects of Network Wireless Access. There is a need to determine budget apportionment for Wireless access including switching delays (typical ATM Sw & IP router delays), access delays (GSM 90 ms, CDMA 100 ms, UMTS 130 ms), and typical distances (noting location of MSC and WGW). The GSM and CDMA access delays are immutable, although a breakdown of UMTS delay may ensure against double accounting—especially where the WGW is transcoding rather than simply a relaying anchor point. Initially disregard transcoding and packetisation of compressed codecs in the WGW. The remaining budget for HRX can then be apportioned to the LIT packet replication and SMG's packetisation and jitter, WGW's transcoding, packetisation and jitter. Switching/routing stages may also need to be distance related.

Figure 20:
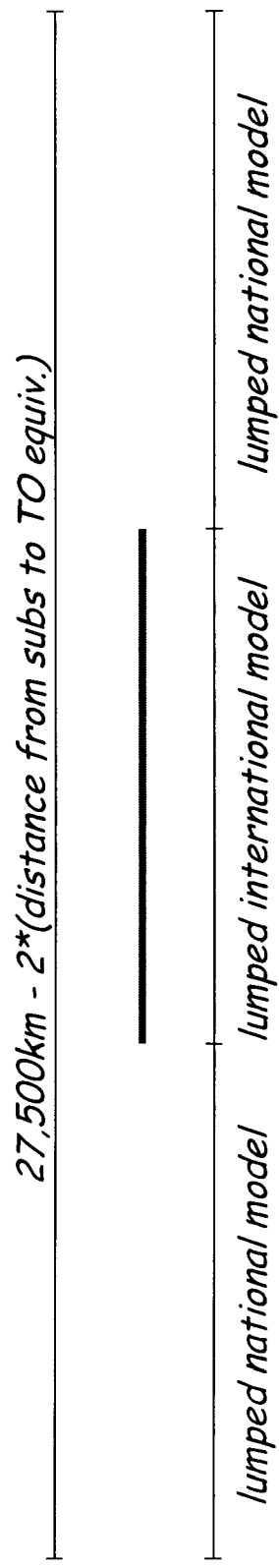
FIG. 20 is a diagram showing succession core considerations.

FIG. 20 shows various aspects of the network core. Here lumped models include switching delays for distance related number of switches, allowing for loading related jitter, transmission distance and equipment delays. There is potential for one or two transcoding Interworking Media Gateways; one may be required to control endpoint compatibility; and two may be required where the endpoints are G.711 and the route requires compression.

Figure 21:
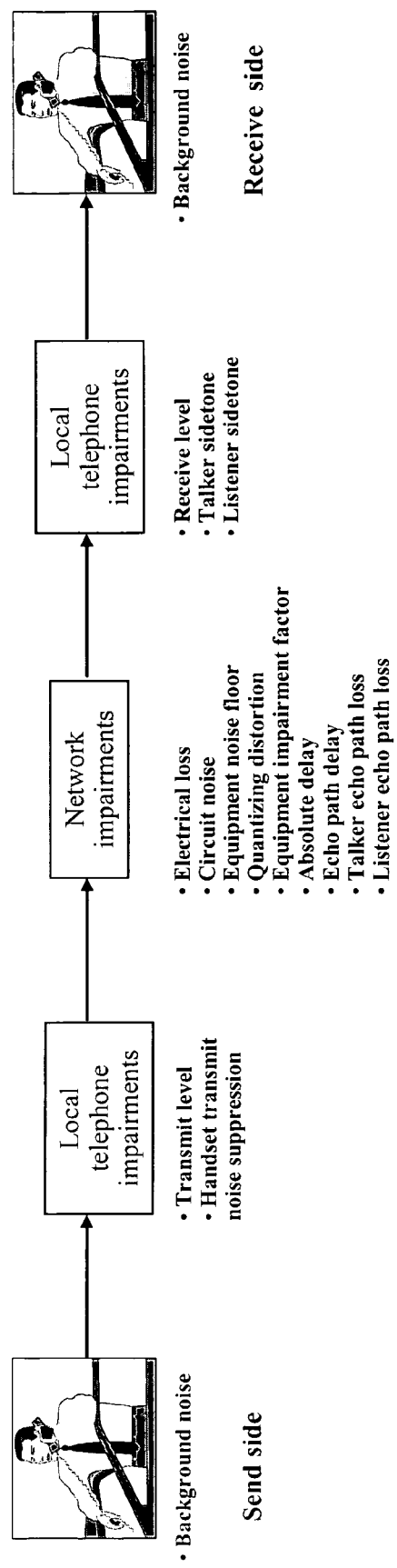
FIG. 21 is a block diagram showing an E-model transmission-rating factor R.

FIG. 21 shows the E-model factors that may effect a Network, The E model calculates a transmission-rating factor R, given by the formula in FIG. 21. In this formula, the symbols have the following meaning:

$R_o$ is the basic signal to noise ratio based on send, receive loudness, electrical and background noise $I_s$ represents the sum of real-time voice transmission impairments, e.g., loudness, sidetone and PCM quantising distortion $I_d$ represents the sum of delayed impairments relative to the voice signal, e.g., talker echo, listener echo and absolute delay (queuing, transmission, de-jitter . . .)

$I_e$ represents the Equipment Impairment factor for special equipment, e.g., low bit-rate coding (determined subjectively for each codec, for each % packet loss)

Figure 23:
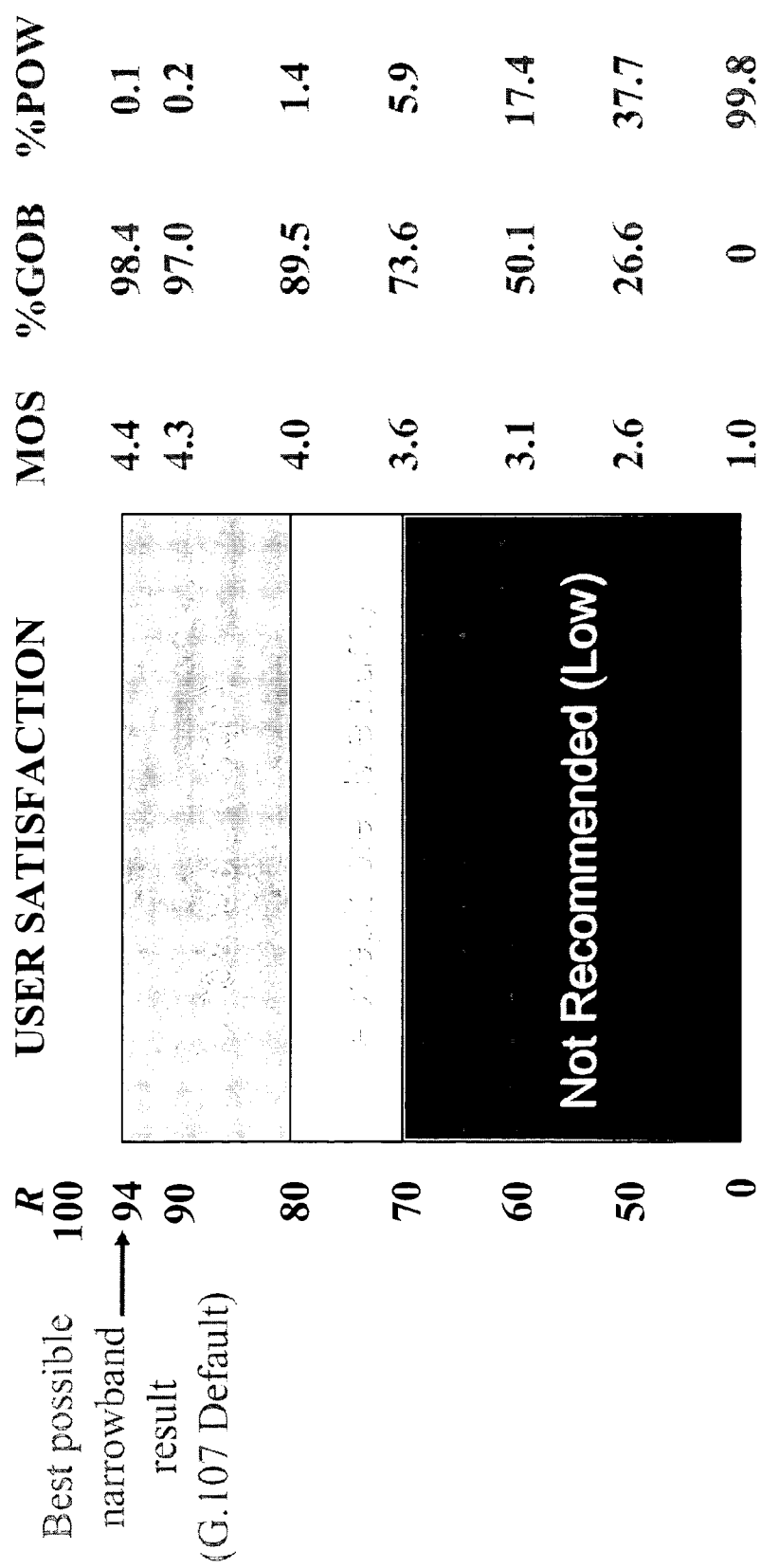
FIG. 23 is a table showing an E-model voice quality metric for "R" value.
Figure 24:
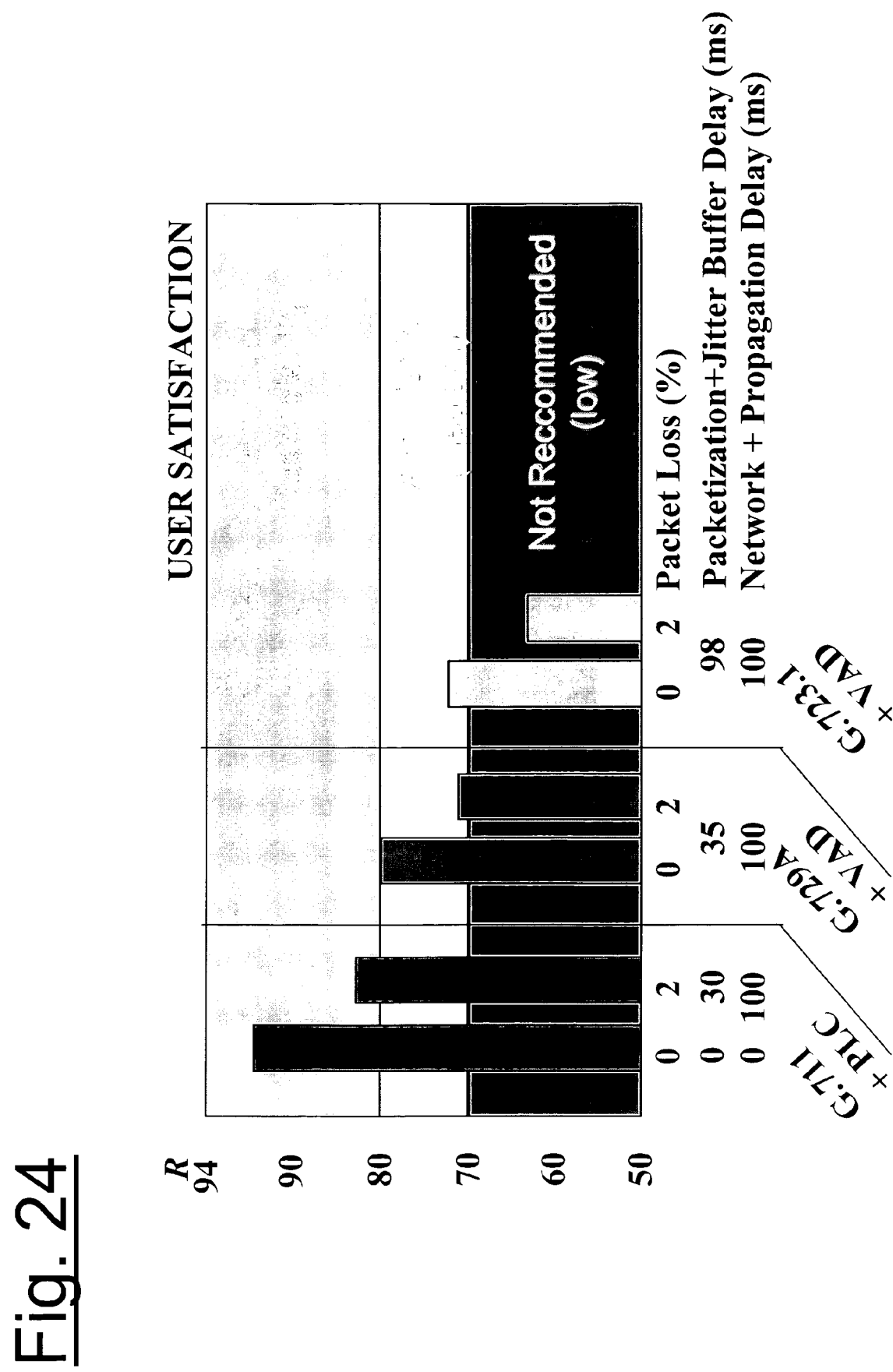
FIG. 24 is graph showing an example of packet loss and delay for some codecs for an E-model.
Figure 26:
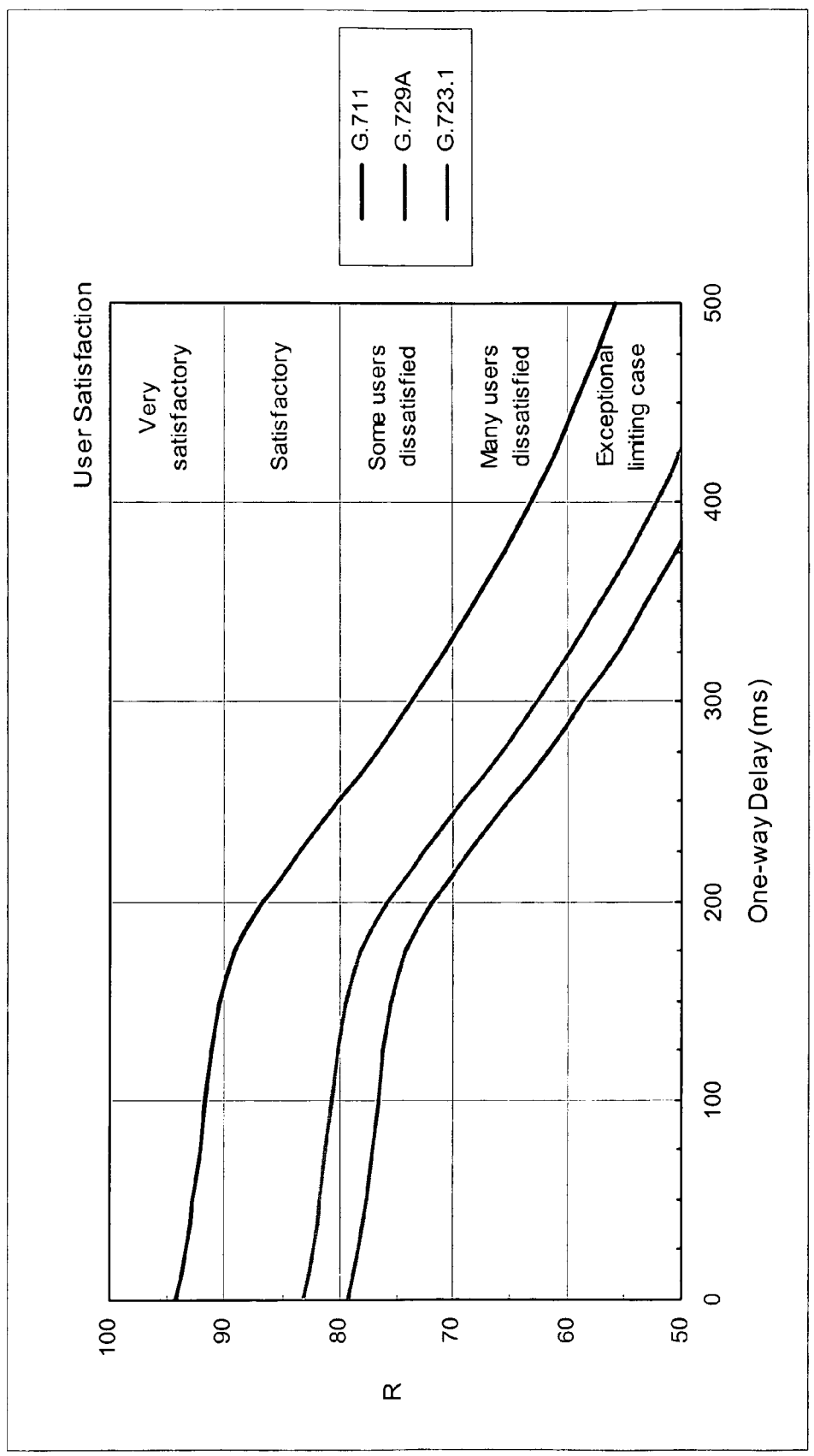
FIG. 26 is a graph showing speech compression impairment in an E-model.
Figure 27:
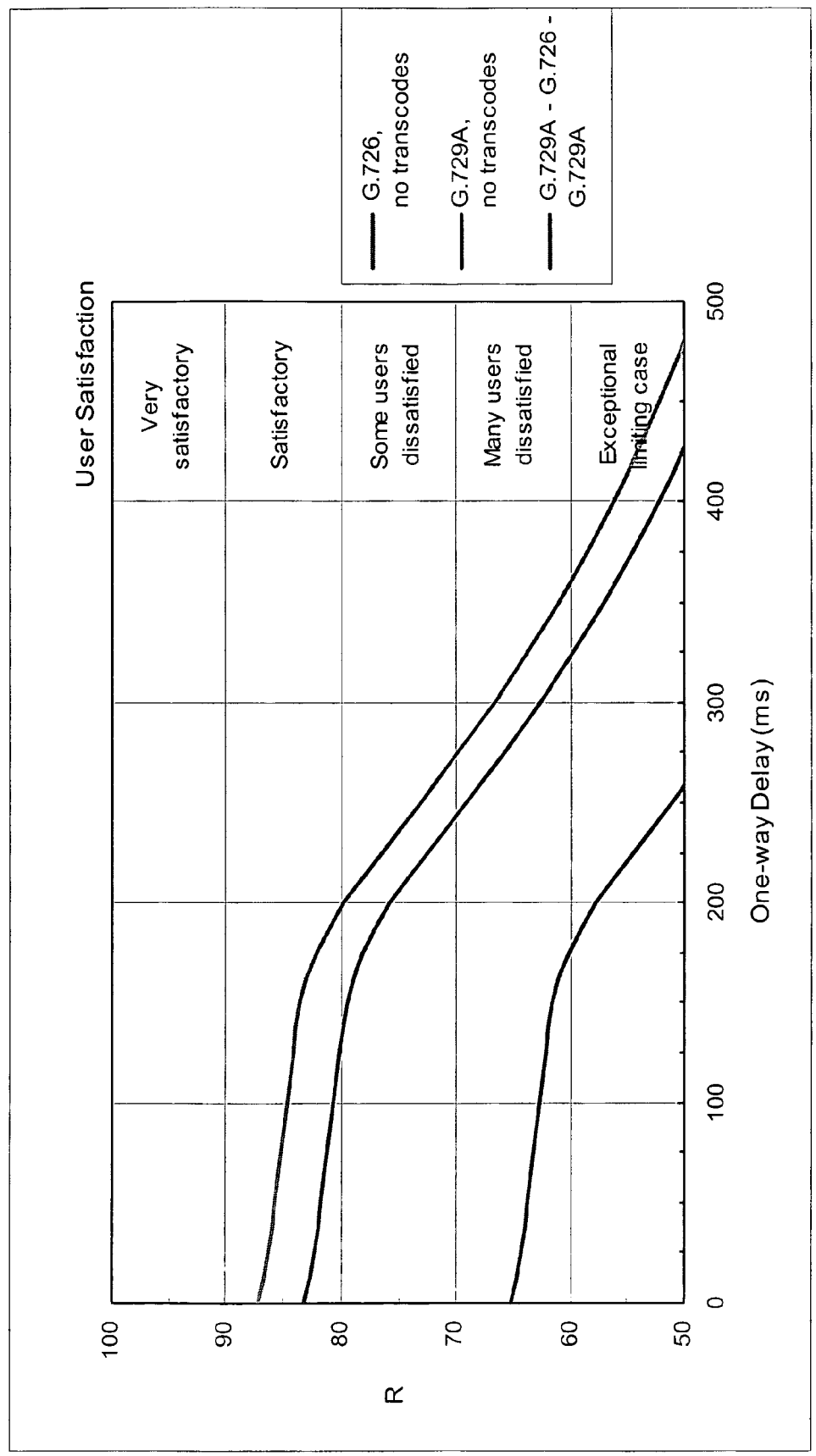
FIG. 27 is a graph showing transcoding impairment in an E-model.
Figure 28:
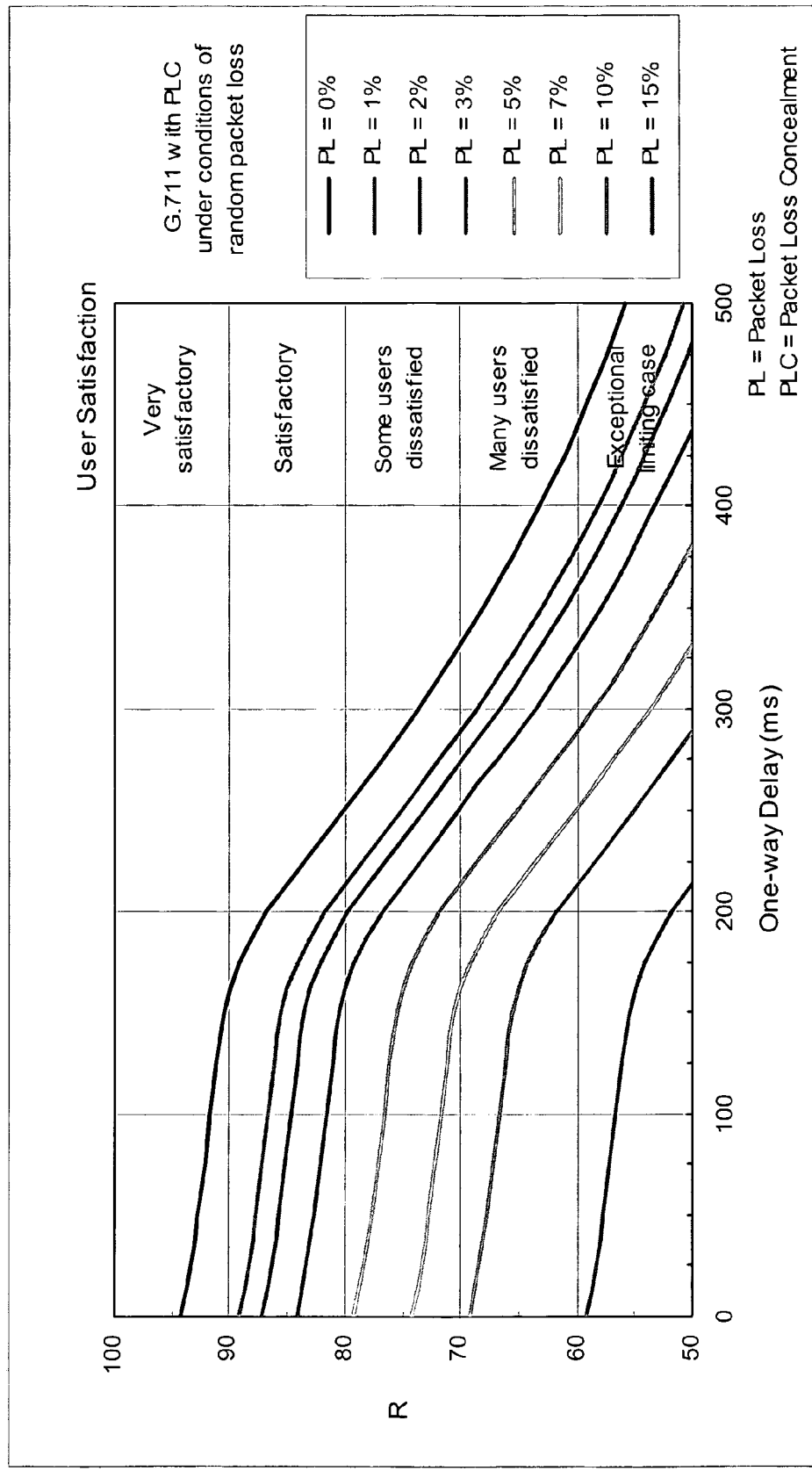
FIG. 28 is a graph showing an E-model G.711 codec impairment as a function of delay and packet loss.
Figure 29:
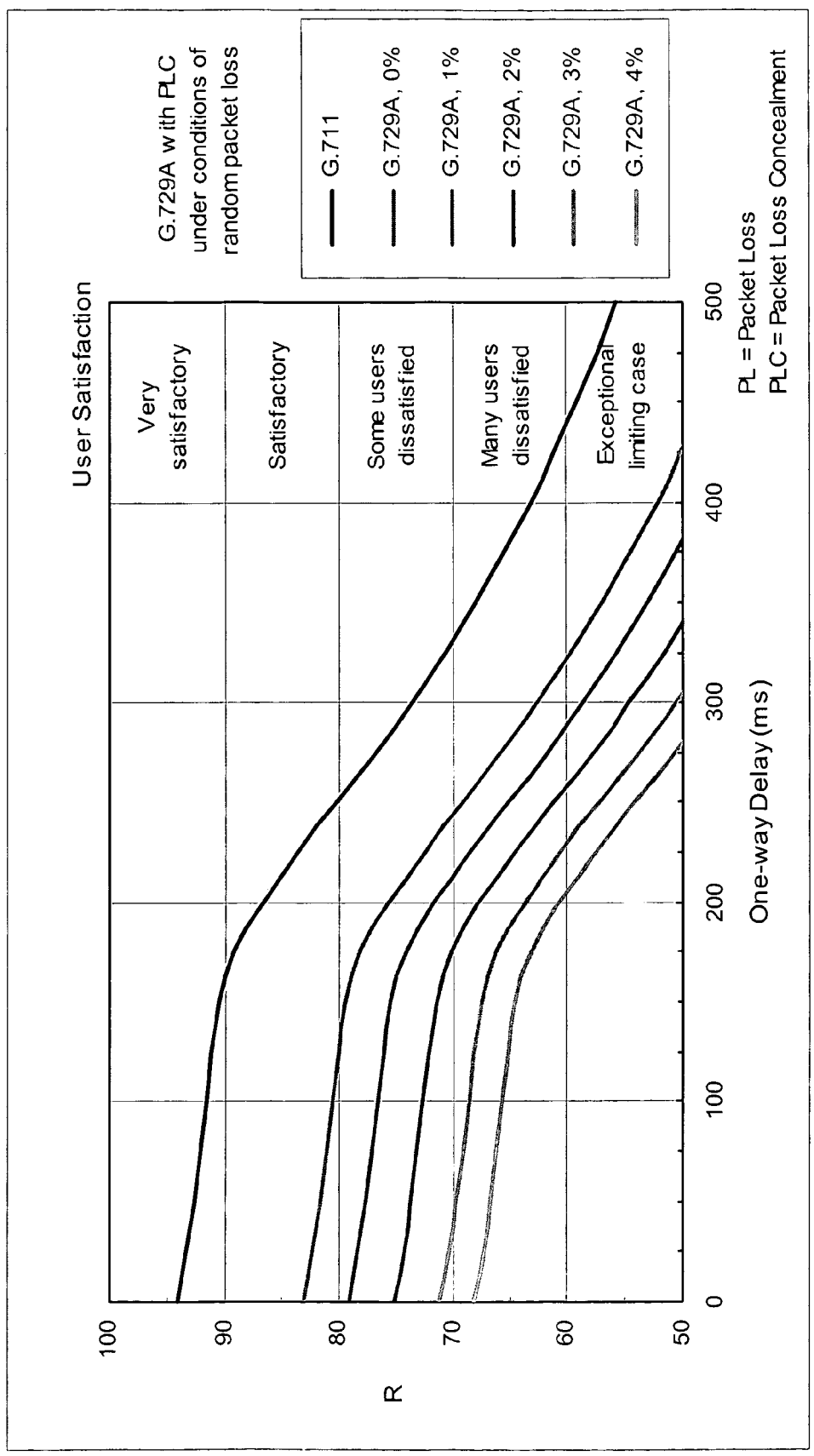
FIG. 29 is a graph showing an E-model G.729 A codec impairment as a function of delay and packet loss.
Figure 30:
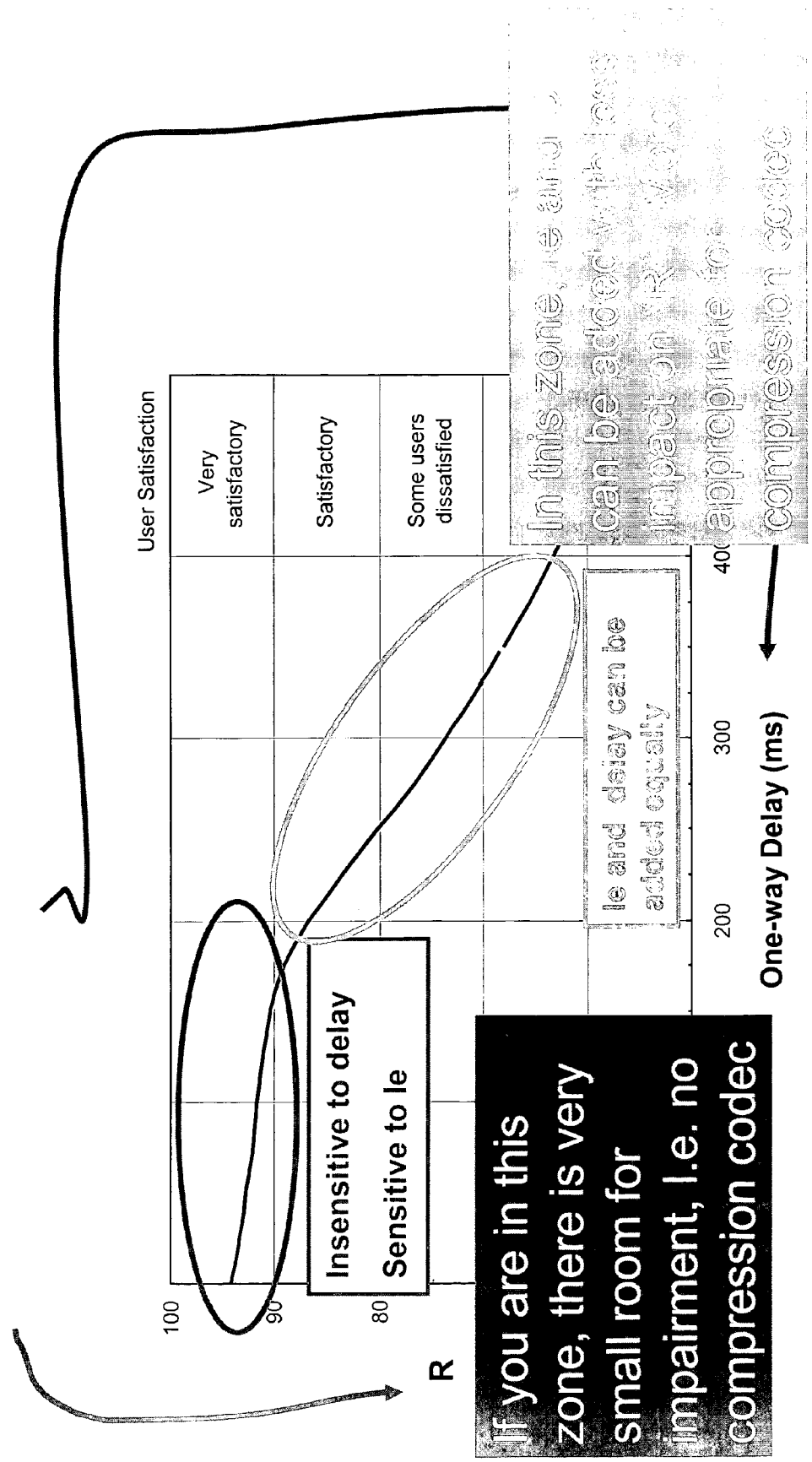
FIG. 30 is a schematic drawing showing an E-model result of R versus delay, with Constant le.

A is the Advantage Factor (compensates for advantage of access, i.e., sat phone)FIG. 22 shows some E-model default input parameters. FIG. 23 show an E-model voice quality metric for "R" value including MOS, GOB and POW. FIG. 24 shows an example of packet loss and delay for some codecs for an E-model. FIG. 25 shows E-model codec impairments (Ie calculations). FIG. 26 is a graph showing speech compression impairment in an E-model. FIG. 27 is a graph showing transcoding impairment in an E-model. FIG. 28 is a graph showing an E-model (G.711 codec) impairment as a function of delay and packet loss. FIG. 29 is a graph showing an E-model (G.729 A codec) impairment as a function of delay and packet loss. FIG. 30 is a schematic drawing showing an E-model result of R versus delay, with Constant Ie. It is interesting to note that in area A there is very little room for impairment (I.e. no compression codec). In zone B Ie and D can be added with less resultant impact on R. This is more appropriate for compression codecs. Recognition of this fact is one of many factors, which gives the tool and method of the present invention one of its many advantages.

Figure 31:
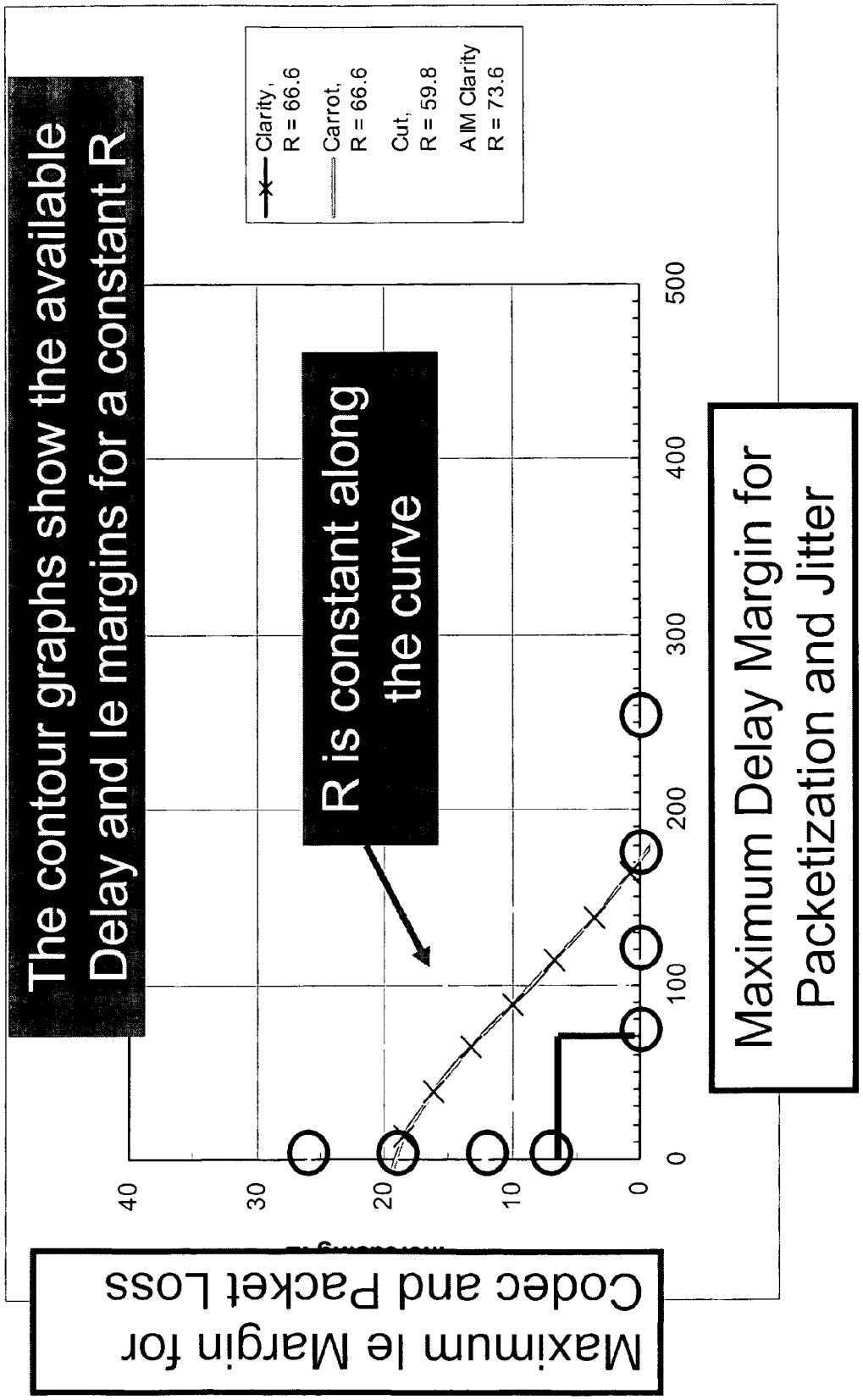
FIG. 31 is a graph showing an E-model result of 1 e versus delay, with constant "R"

The various results above can be used to produce the contour graphs of FIG. 31. In these graphs it is important to note that R is constant along the curve. By being able to manipulate information relating to the result it has been possible to vary factors, which previously would not have been intuitively possible. The combination of R, Ie and Delay can now be exploited more fully to work out budget allocation.

Figure 32:
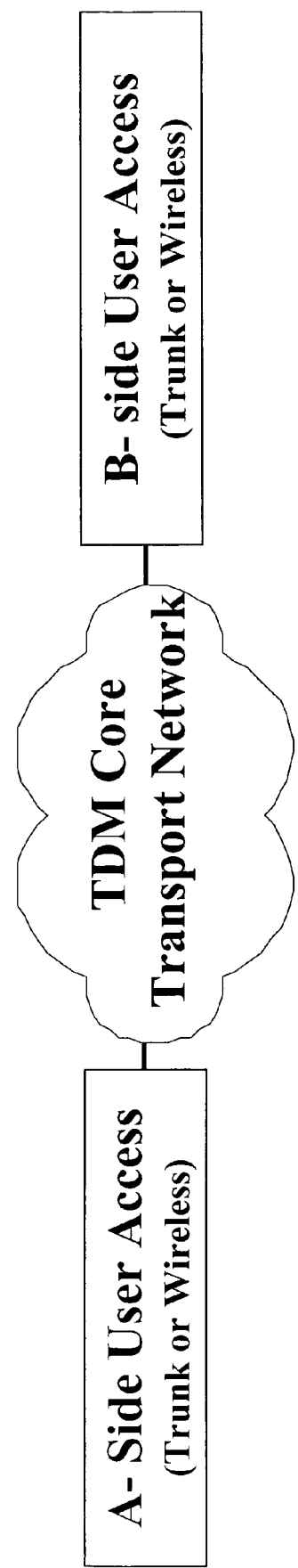
FIG. 32 is a schematic diagram showing PSTN reference connections.
Figure 34:
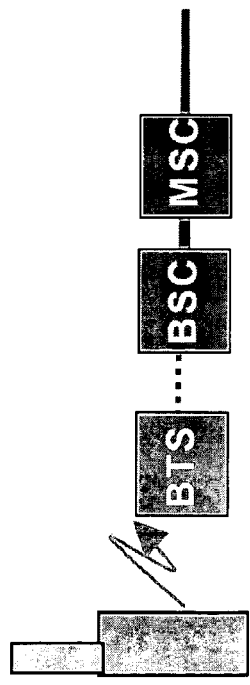
FIG. 34 is a table showing PSTN reference connections in a wireless access scenario model.
Figure 35:
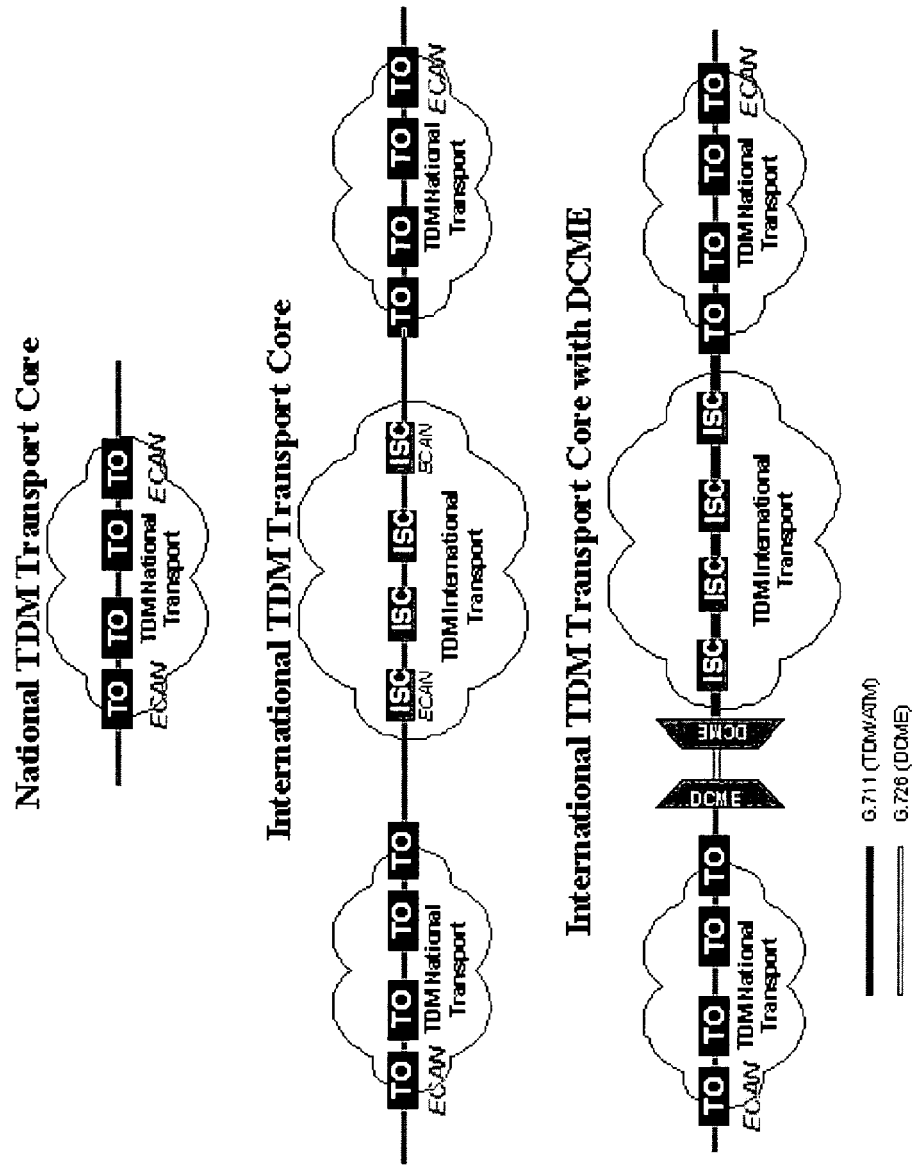
FIG. 35 is a schematic diagram showing PSTN reference connection for a TDM core transport.

FIG. 32 is a schematic diagram showing PSTN reference connections. FIG. 33 is a table showing PSTN reference connection in a POTS access scenario model. FIG. 34 is a table showing PSTN reference connections in a wireless access scenario model. FIG. 35 is a schematic diagram showing PSTN reference connection for a TDM core transport. FIG. 36 is a table showing PSTN reference connections of TDM core transport summary. The transmission time used in the models is distanced based and includes propagation delay and equipment processing per hop.

Figure 37:
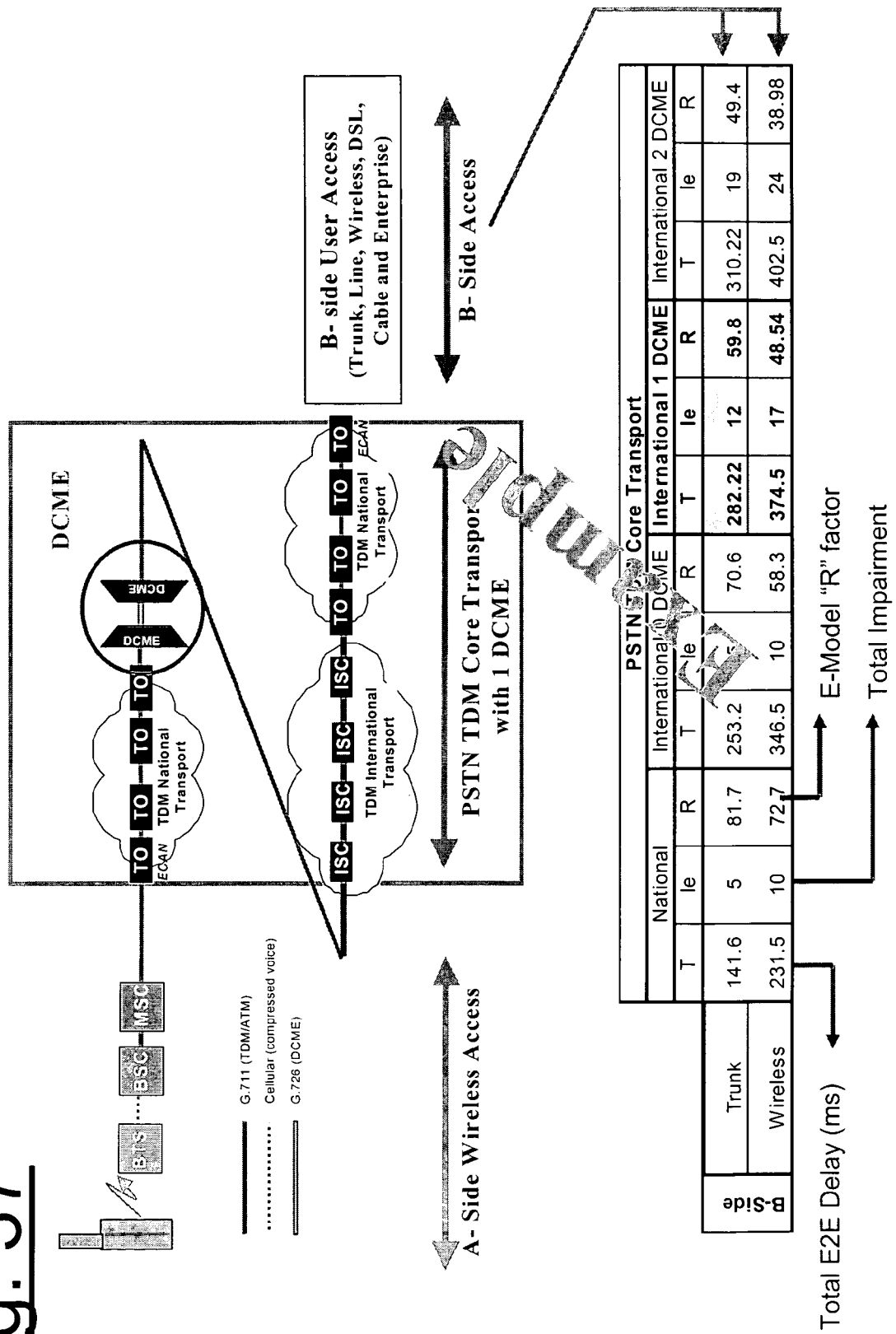
FIG. 37 is a schematic diagram showing PSTN reference connections for E-model analysis results.
Figure 38:
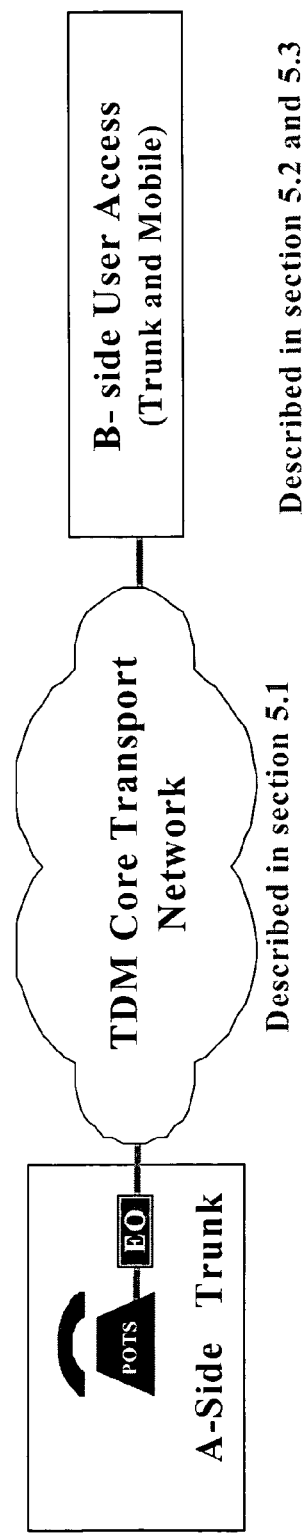
FIG. 38 is a further schematic diagram showing PSTN reference connections for E-model analysis results.
Figure 39:
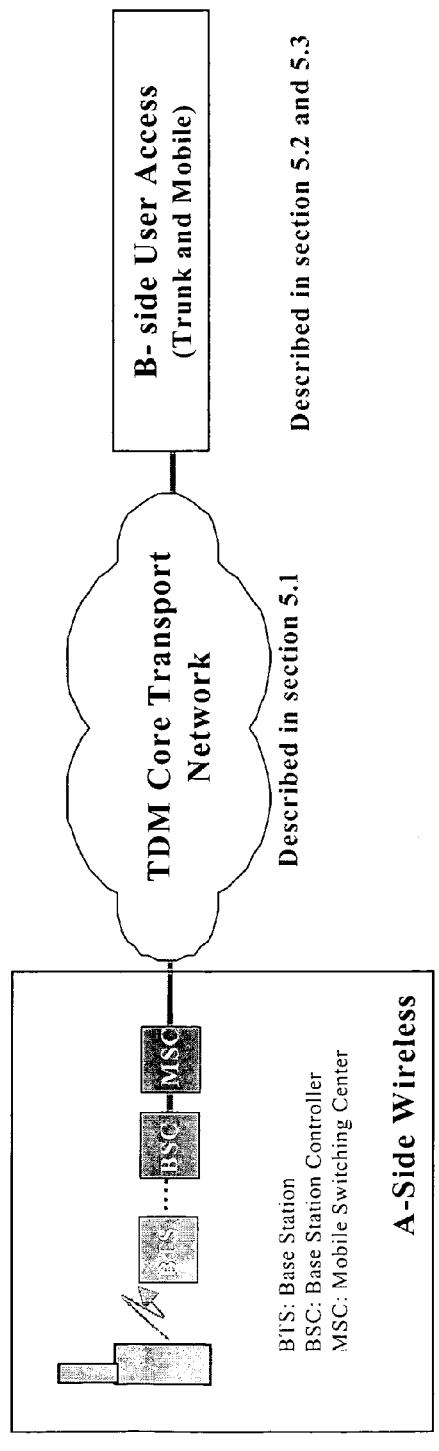
FIG. 39 is a still further schematic diagram showing PSTN reference connections of E-model analysis results.
Figure 40:
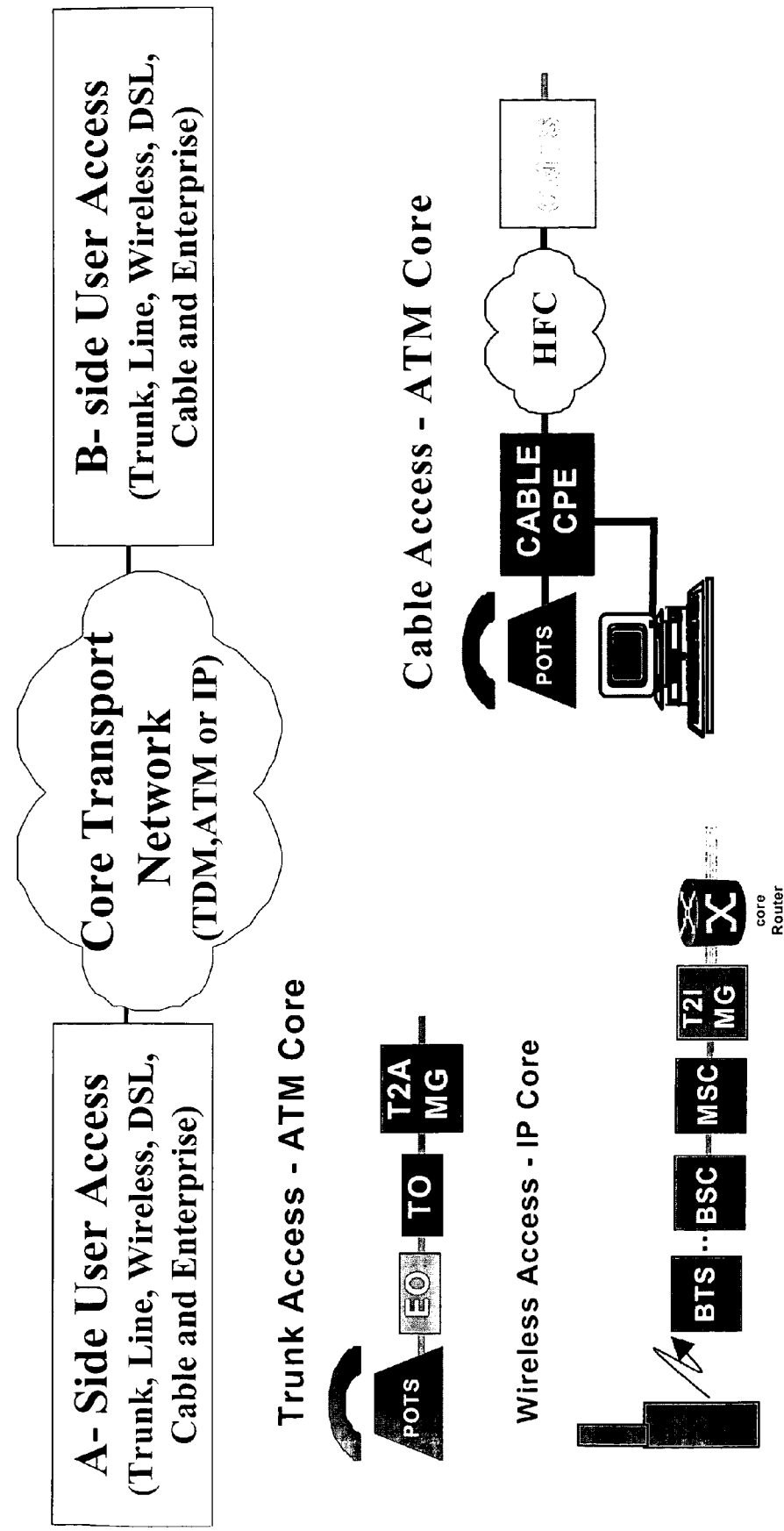
FIG. 40 is a schematic diagram showing the network HRX scenarios.
Figure 41:
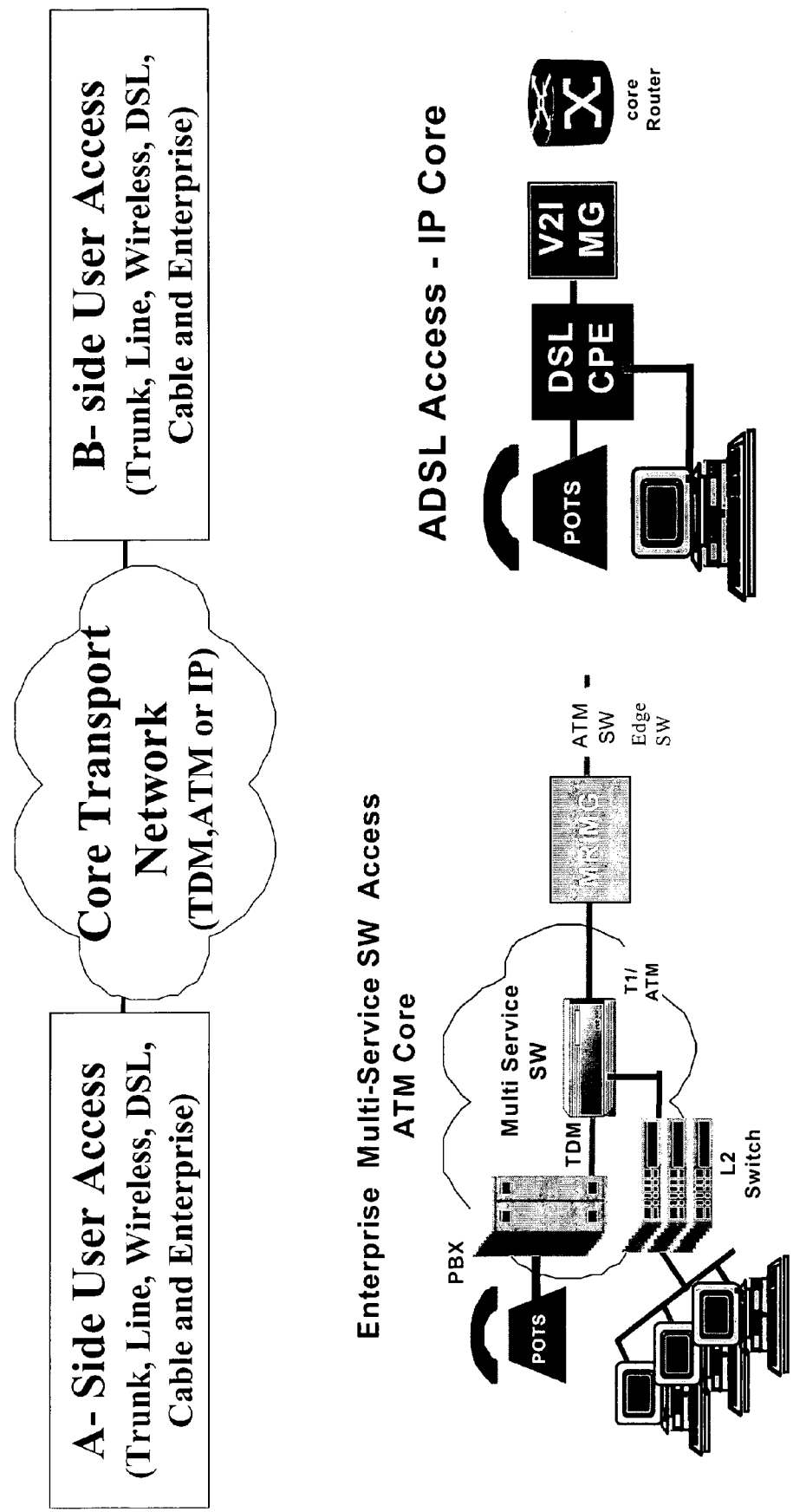
FIG. 41 is a schematic diagram showing further network HRX scenarios.
Figure 42:
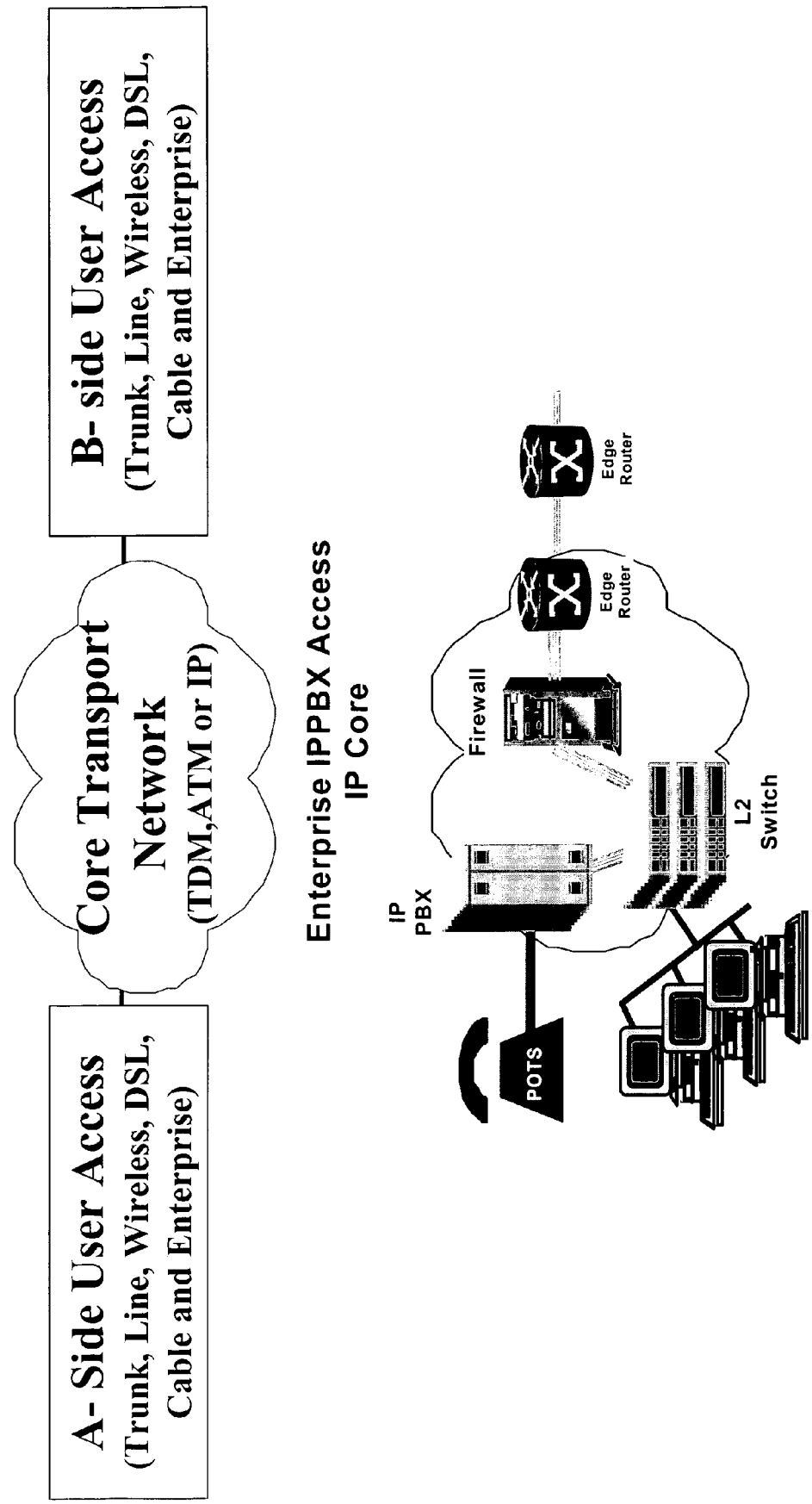
FIG. 42 is a schematic diagram showing further network HRX scenarios.
Figure 43:
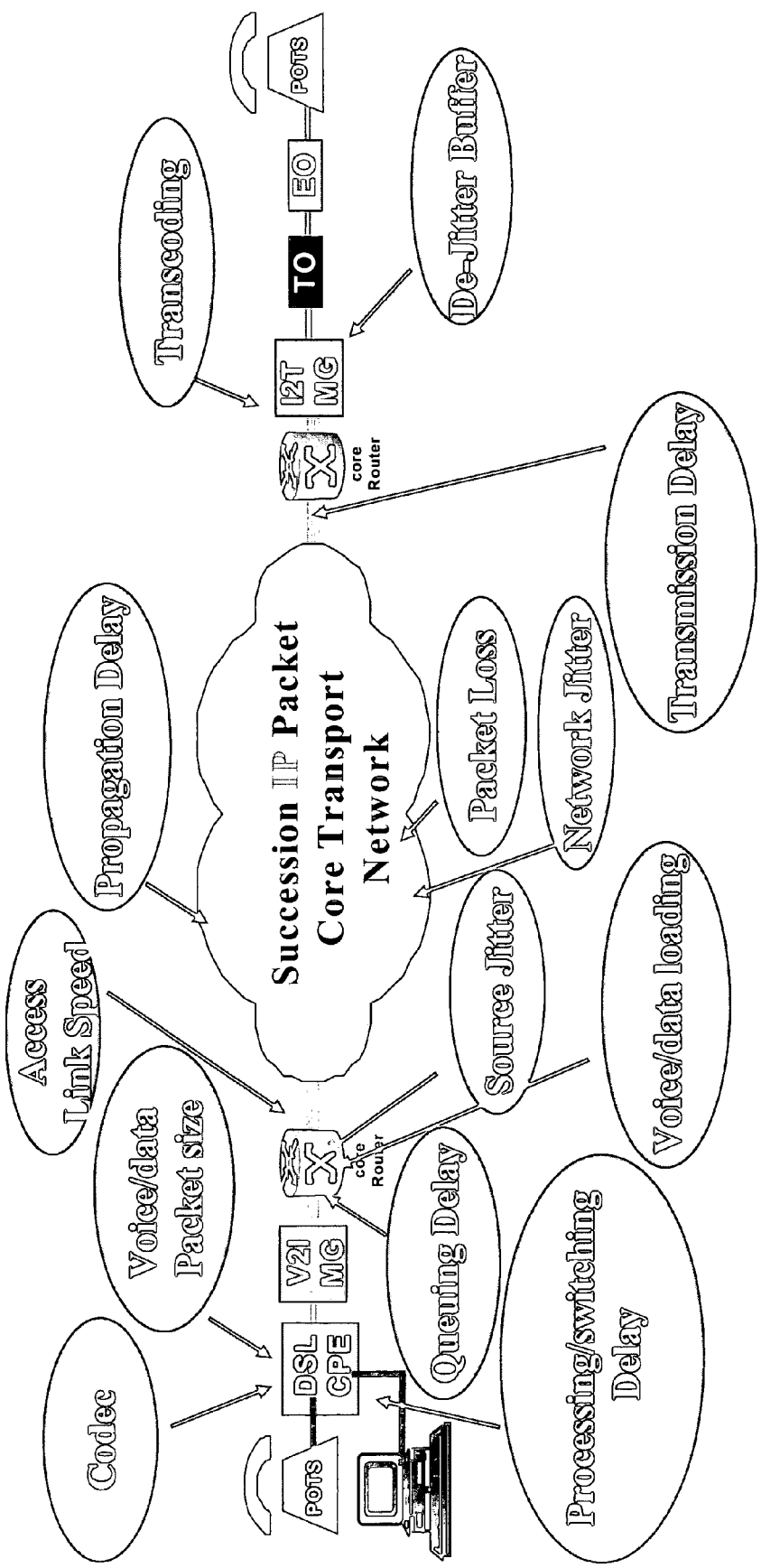
FIG. 43 is a schematic diagram showing the impairments relevant to the HRX models.

FIGS. 37, 38 and 39 show PSTN reference connections for E-model analysis results. FIGS. 40, 41 and 42 show the new features of network HRX scenarios. FIG. 43 is a schematic diagram showing the impairments relevant to the HRX models. From this figure it can be clearly seen which components the different impairments are most likely to effect. The tool capable of dealing with all these factors has not previously be feasible.

Figure 44:
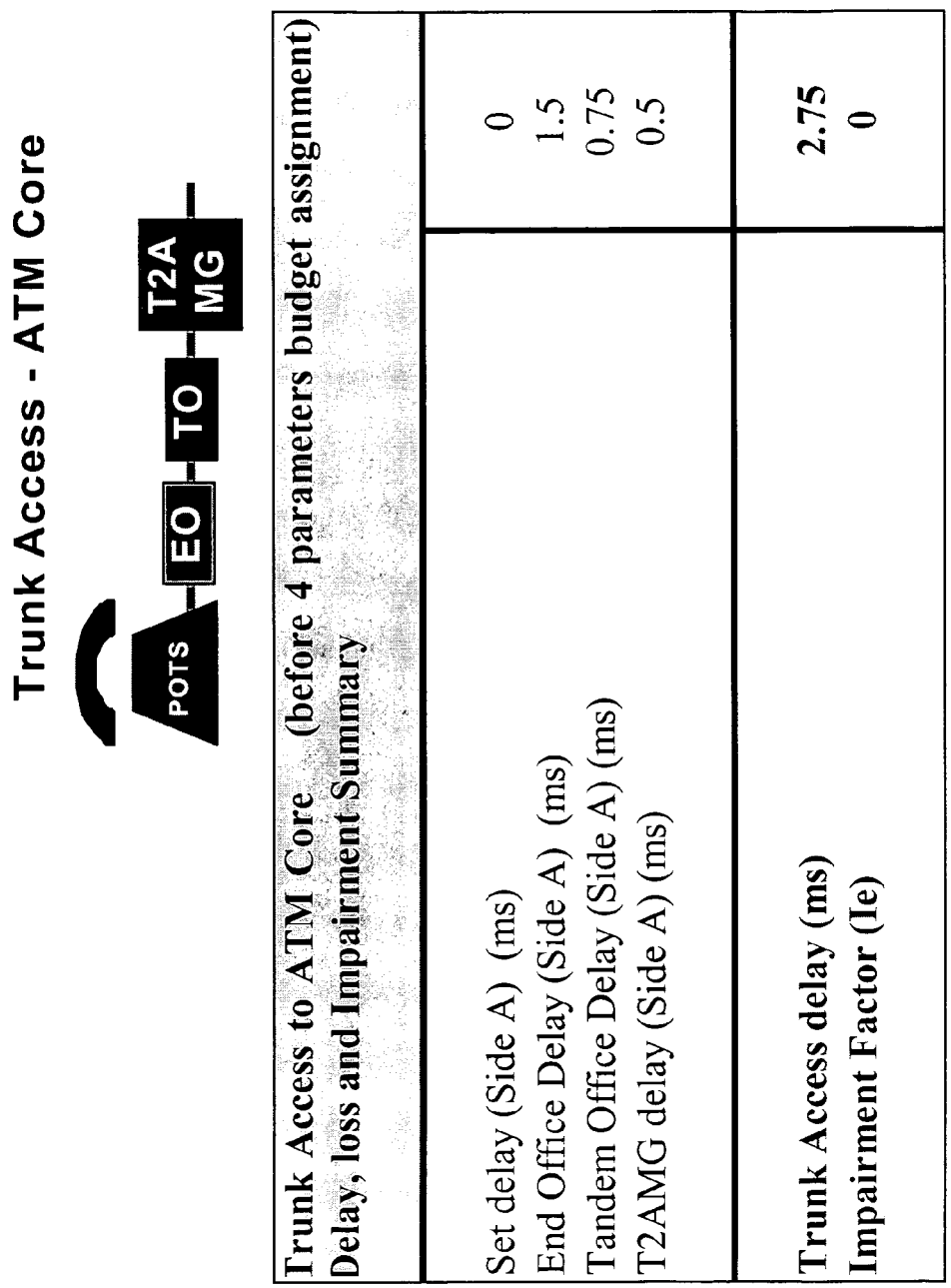
FIG. 44 is a schematic diagram showing HRX access scenario model for trunk access.
Figure 45:
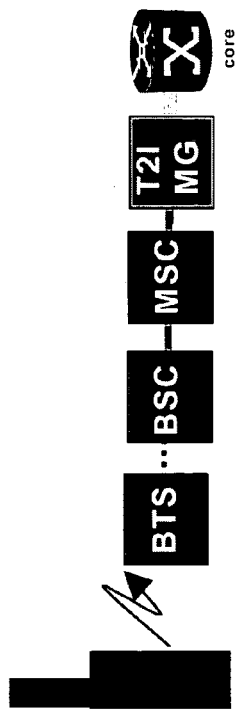
FIG. 45 is a schematic diagram showing HRX access scenario models for wireless access.
Figure 47:
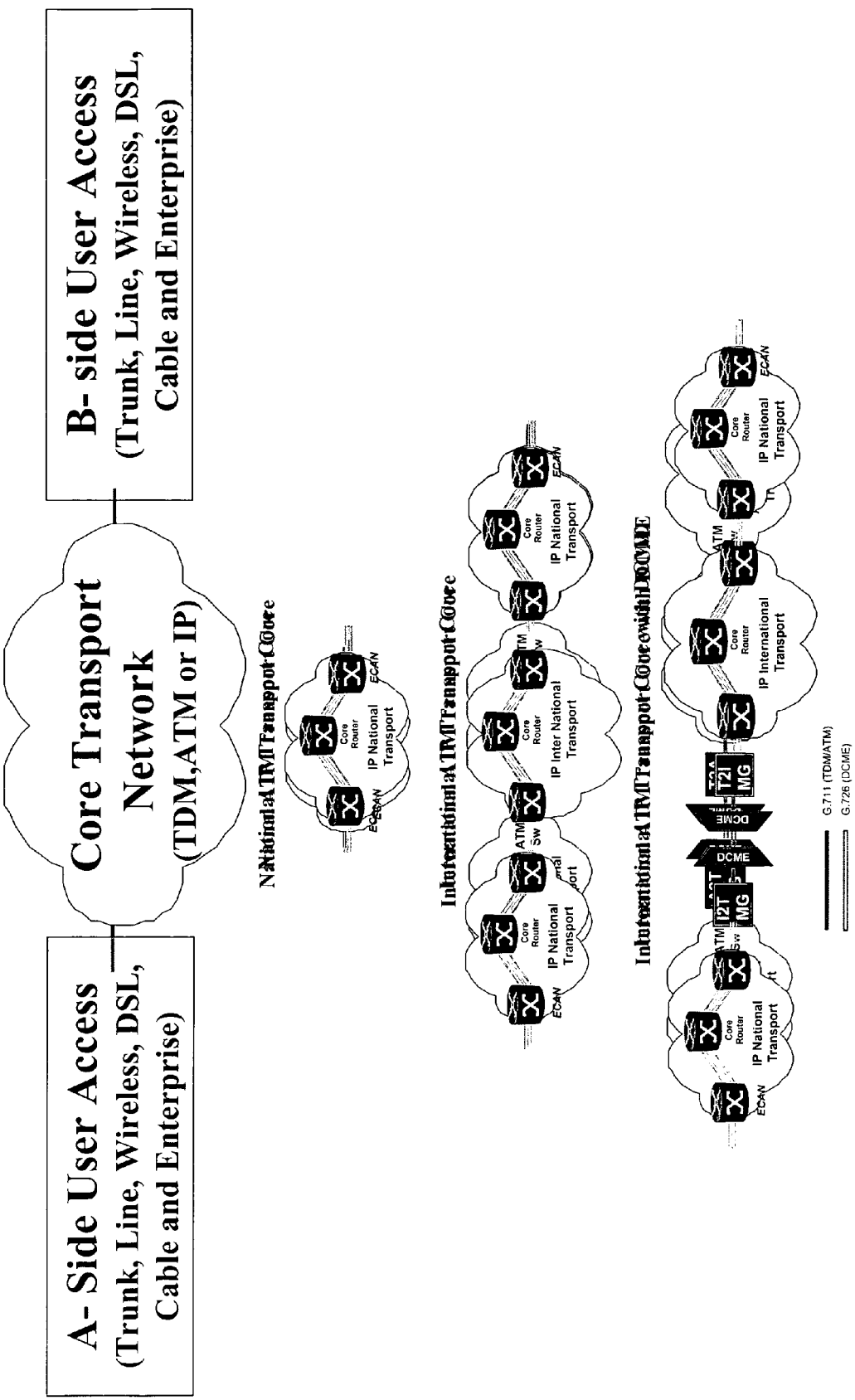
FIG. 47 is a schematic diagram showing the succession HRX scenario for core transport.
Figure 49:
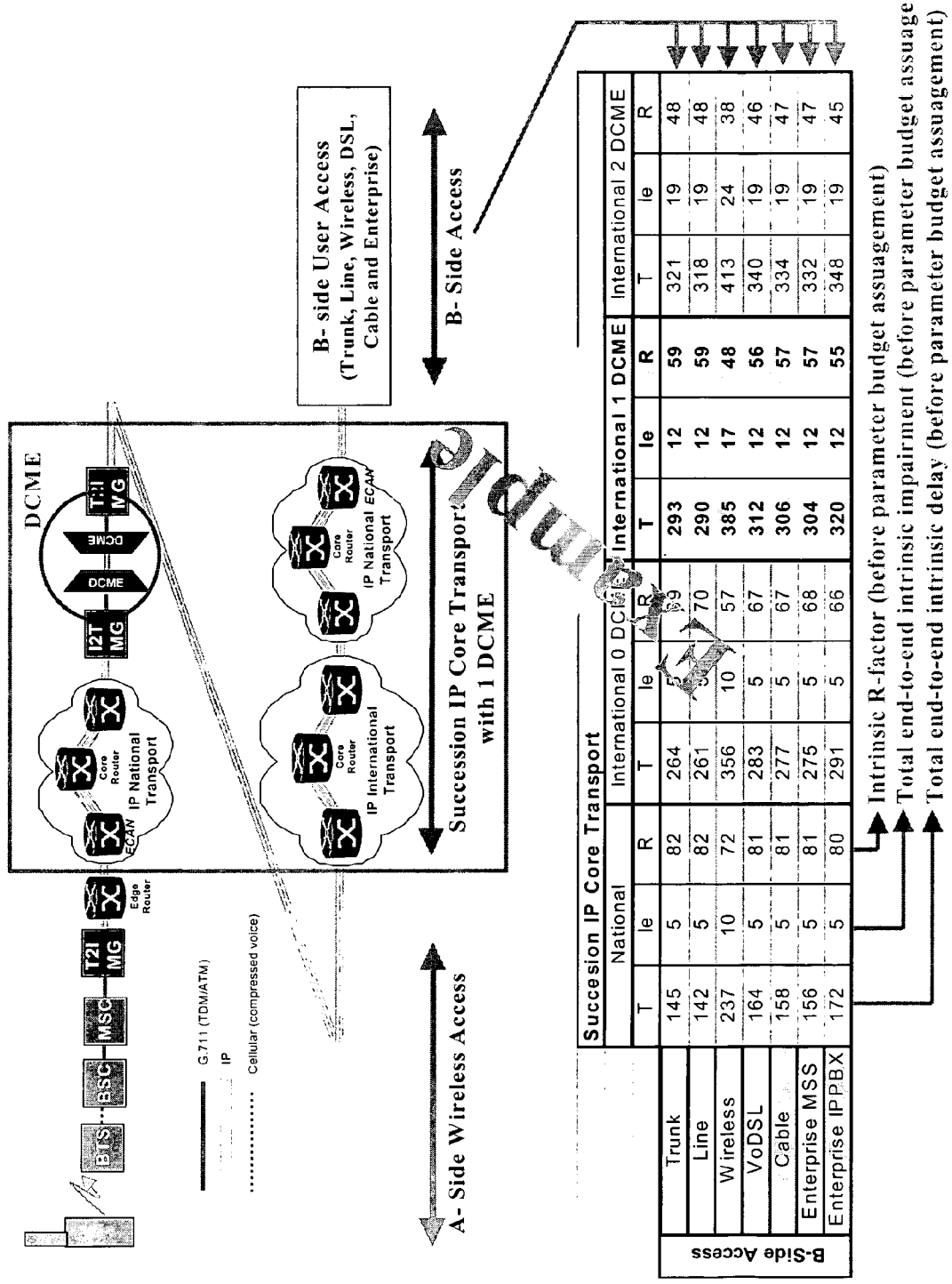
FIG. 49 is a schematic diagram showing an example of an HRX E-model analysis results.
Figure 53:
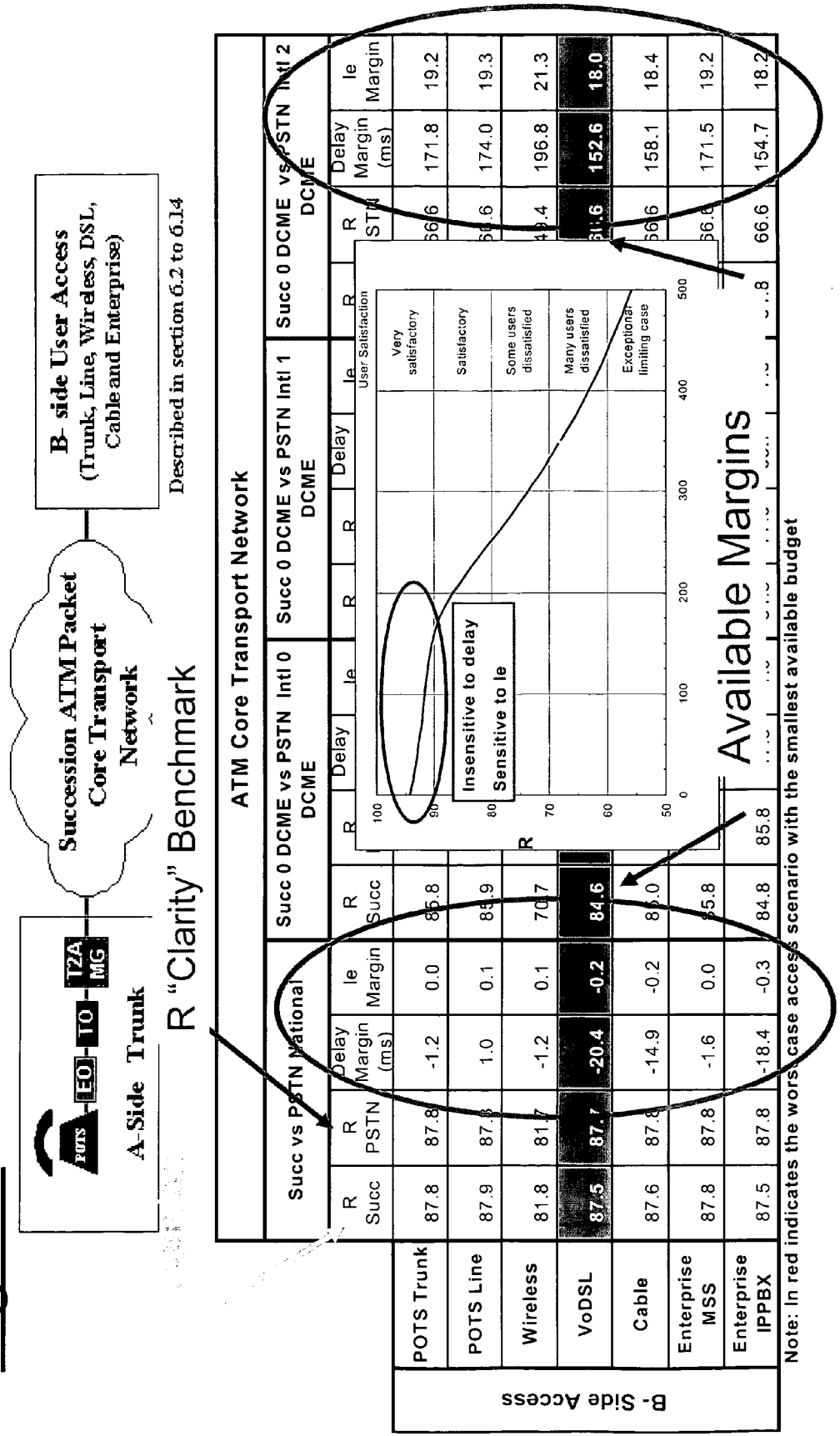
FIG. 53 is a diagram showing HRX delay and le budget for trunk access
Figure 54:
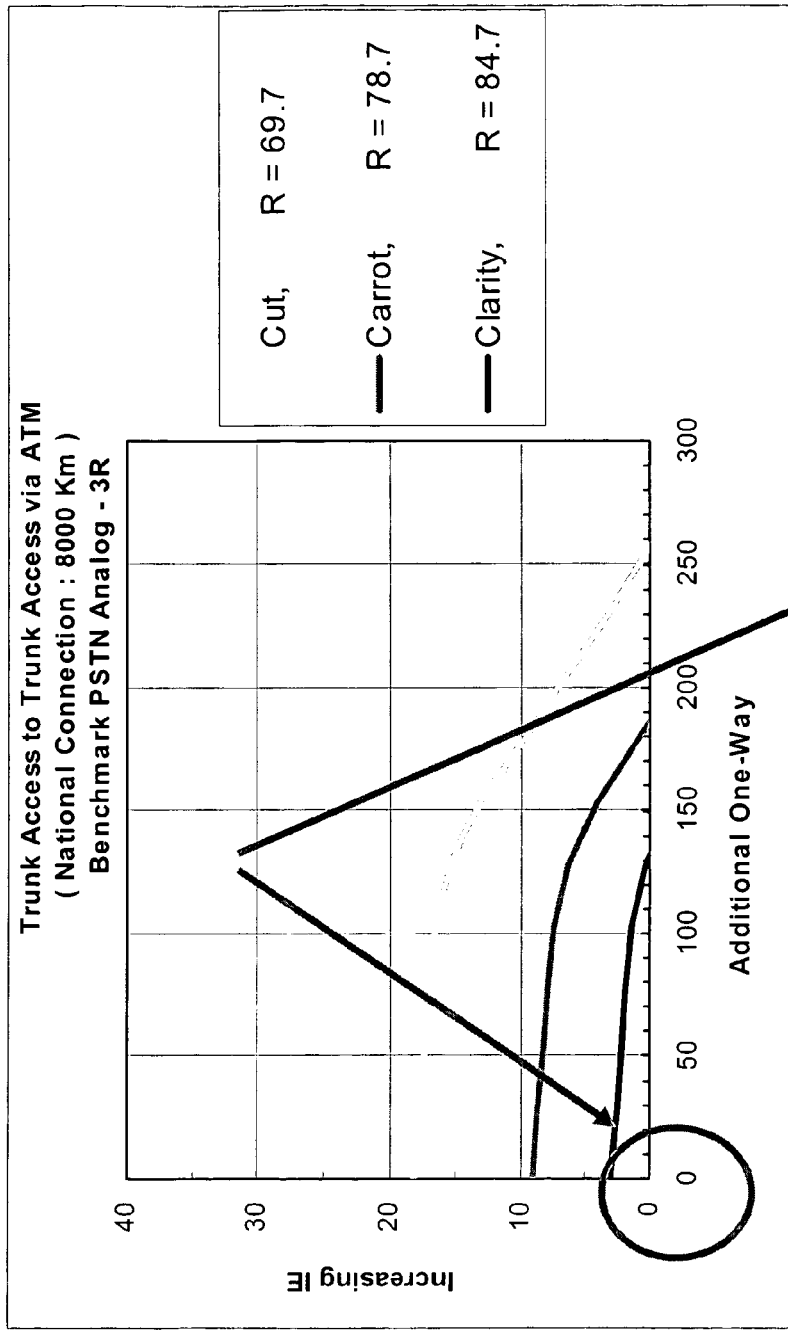
FIG. 54 is a graph showing HRX delay and le budget for national trunk access.
Figure 55:
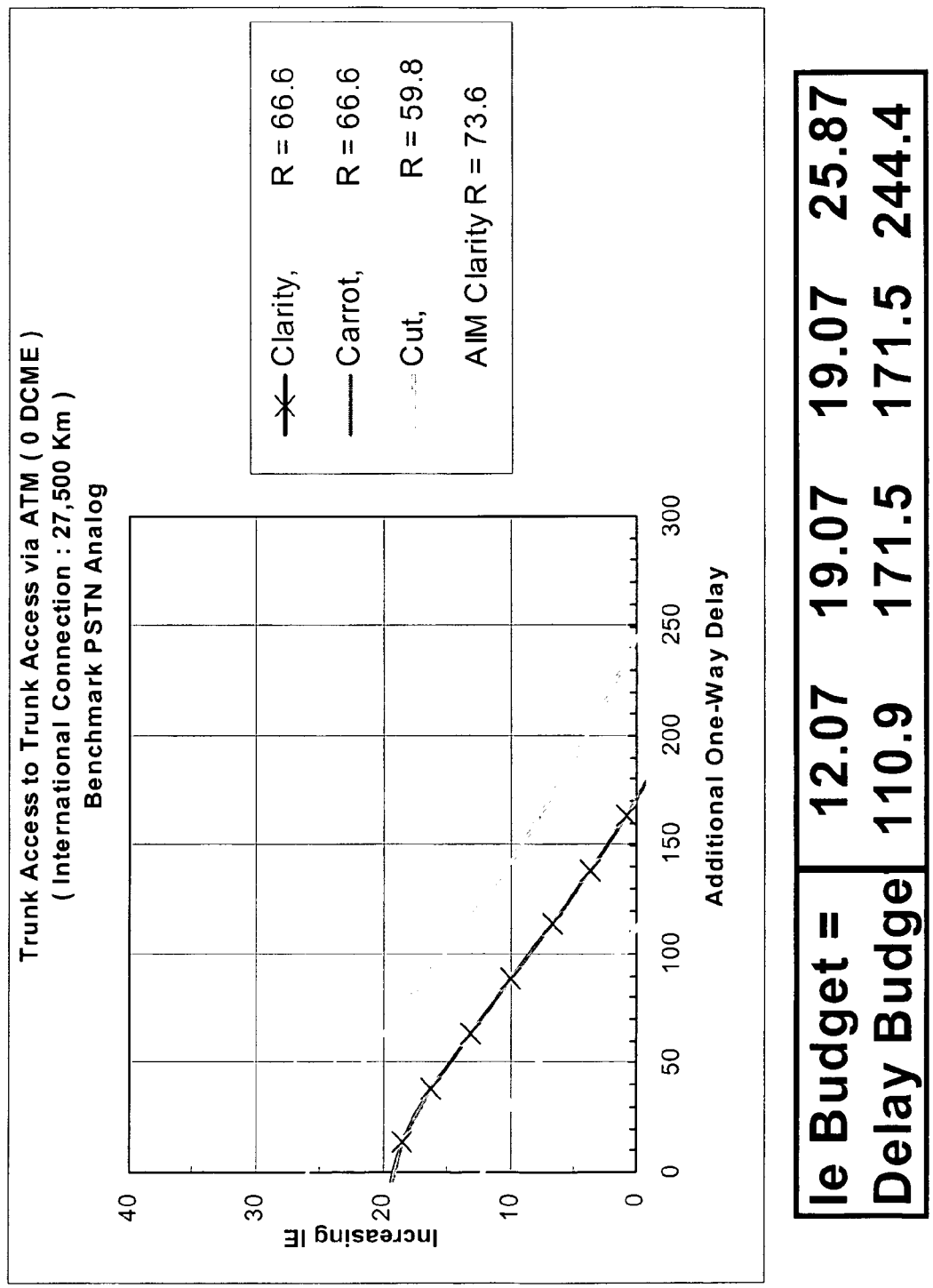
FIG. 55 is a graph showing HRX delay and le budget for international trunk access.
Figure 56:
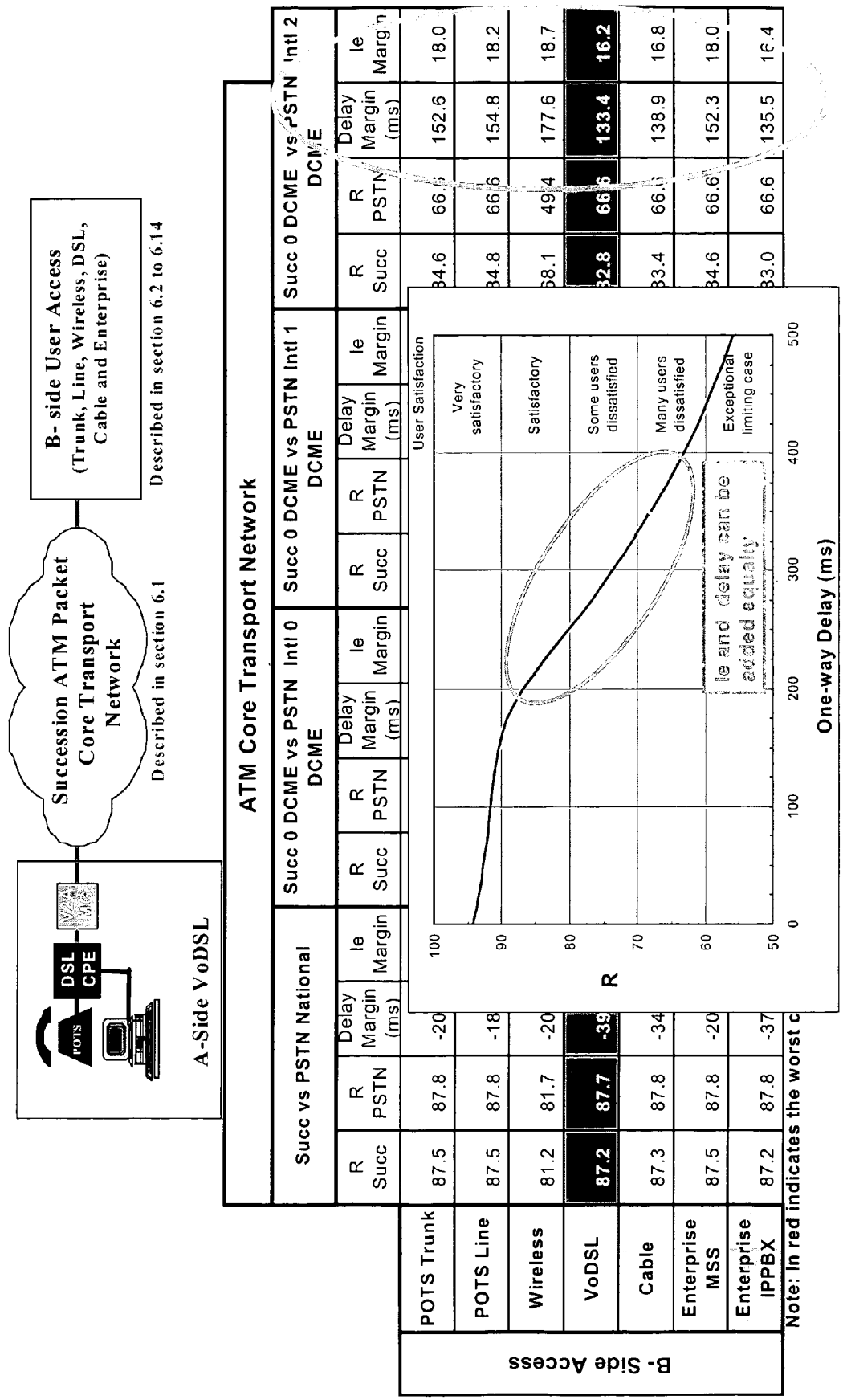
FIG. 56 is a diagram showing HRX delay and le budget for ADSL access.
Figure 57:
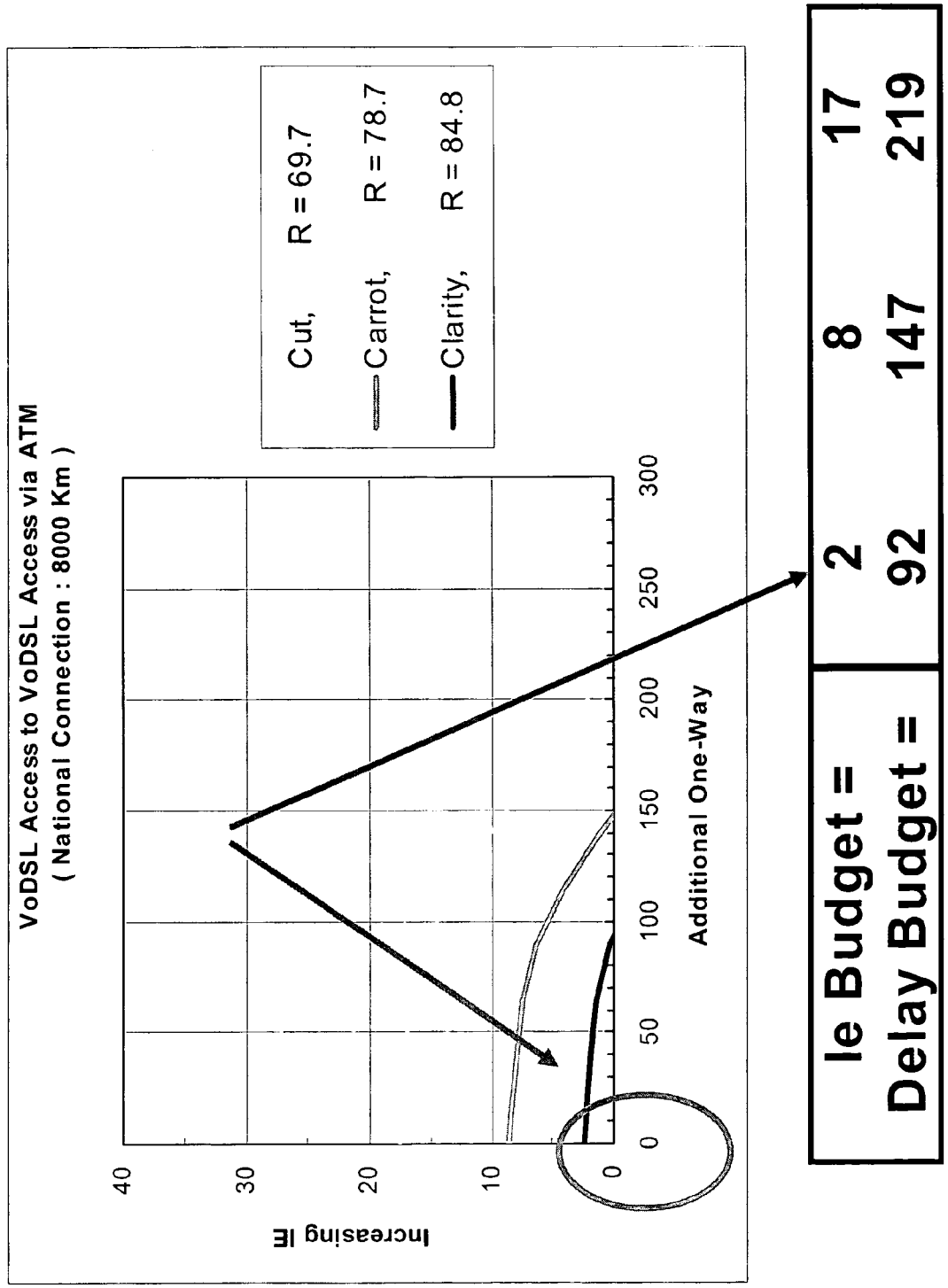
FIG. 57 is a graph showing HRX delay and le budget for national ADSL access.
Figure 58:
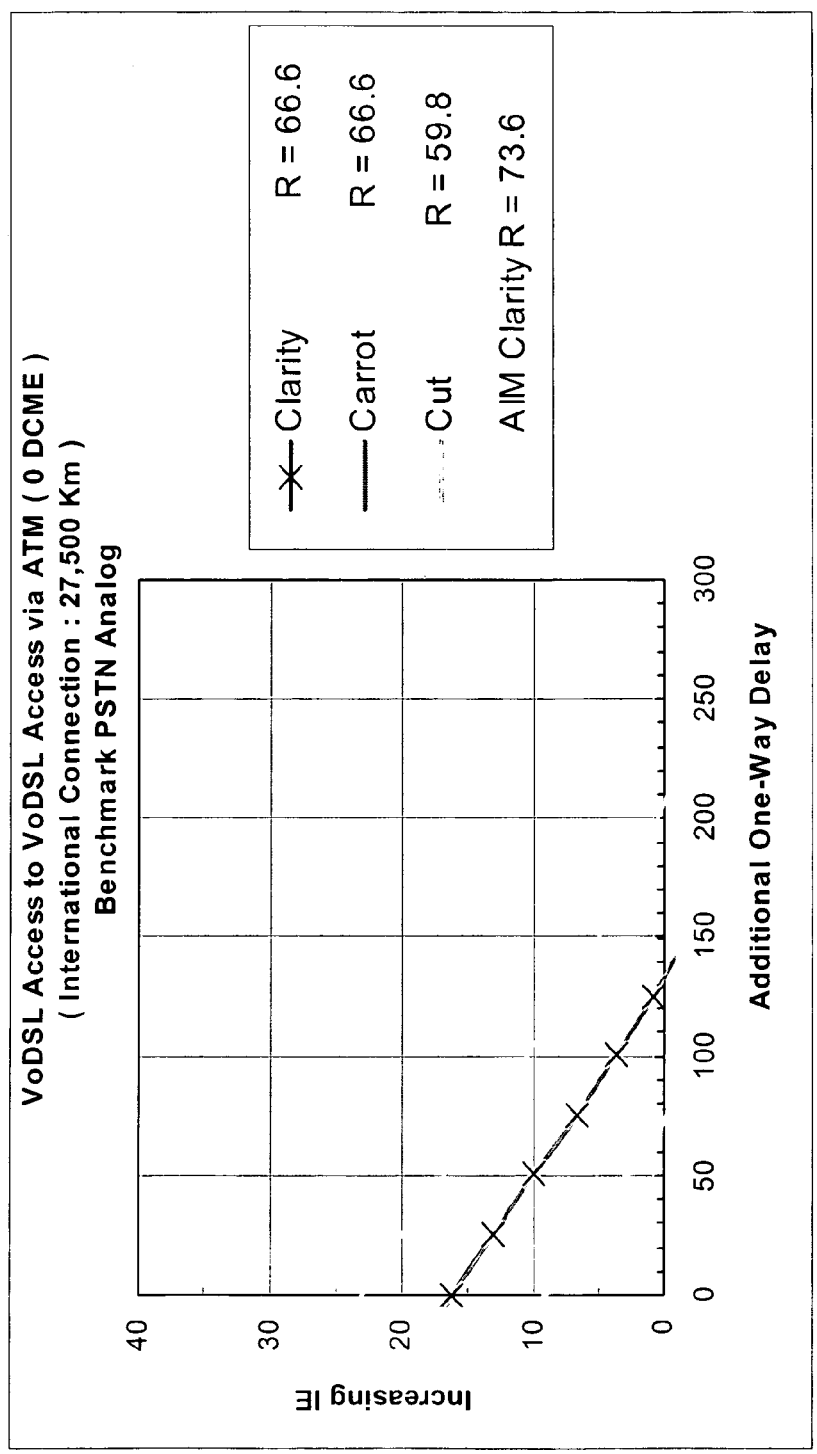
FIG. 58 is a graph showing HRX delay and le budget for international ADSL access.
Figure 60:
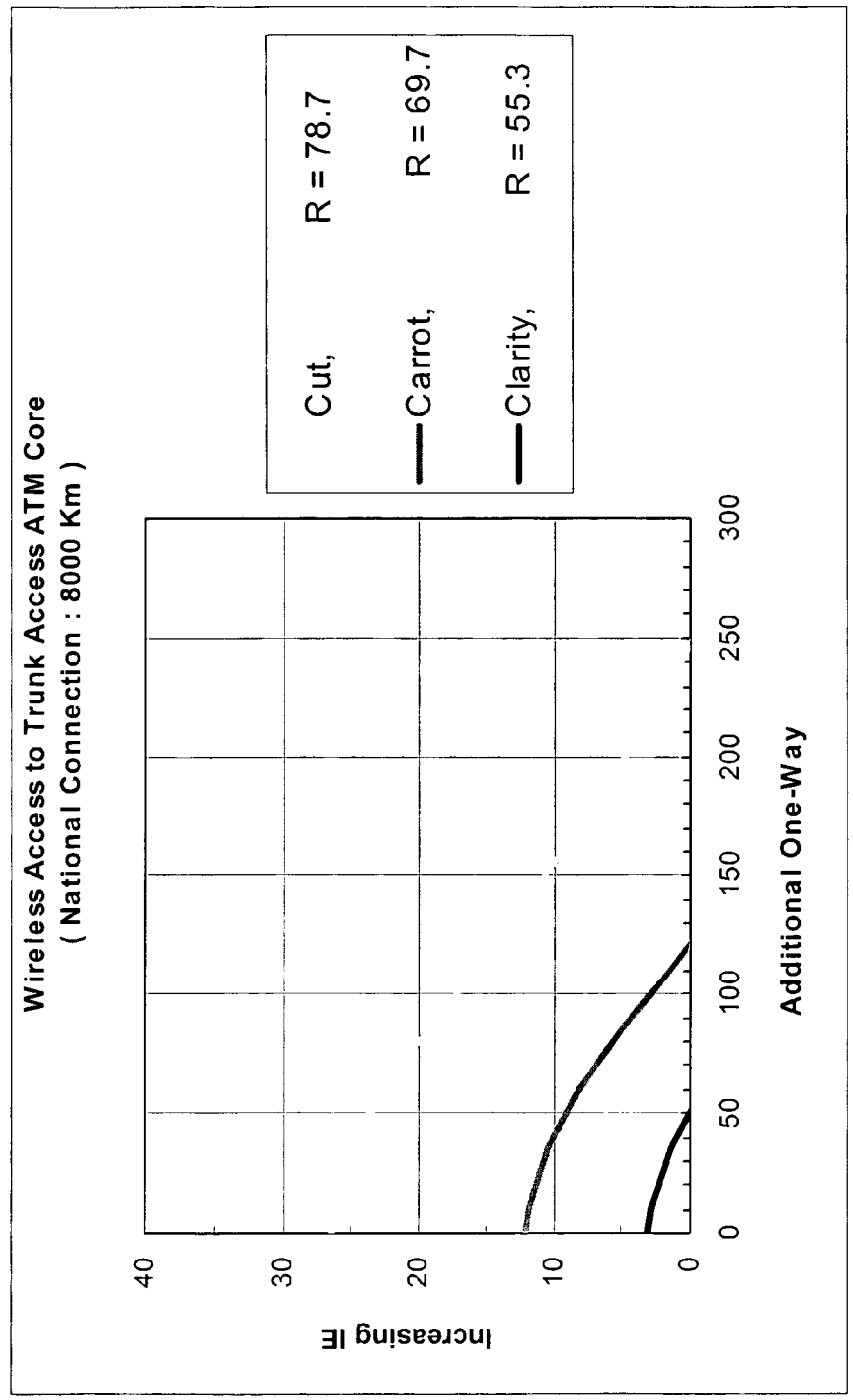
FIG. 60 is a graph showing HRX delay and le budget for a national wireless to trunk access.
Figure 61:
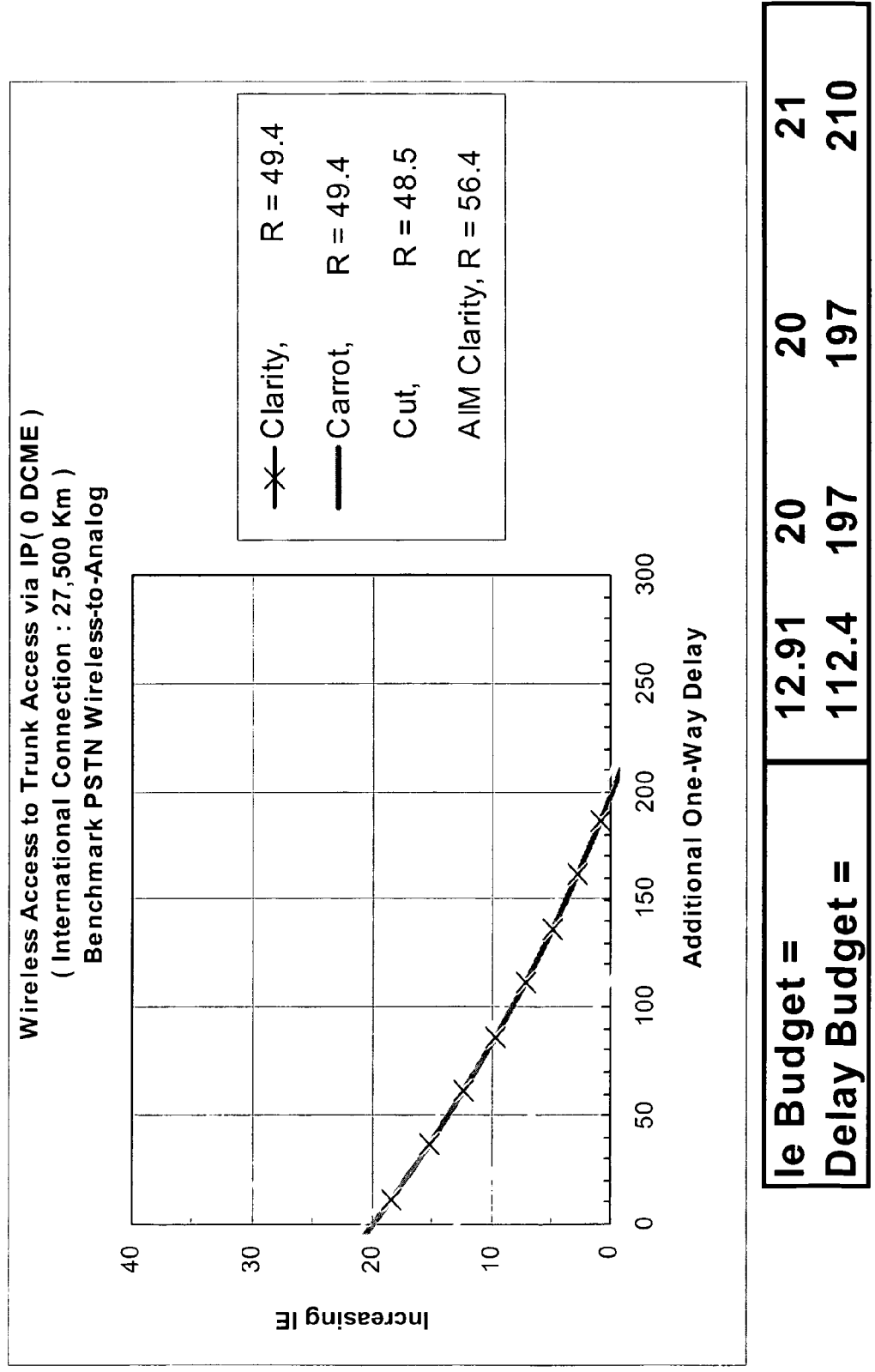
FIG. 61 is a graph showing HRX delay and le budget for an international wireless to trunk access.
Figure 62:
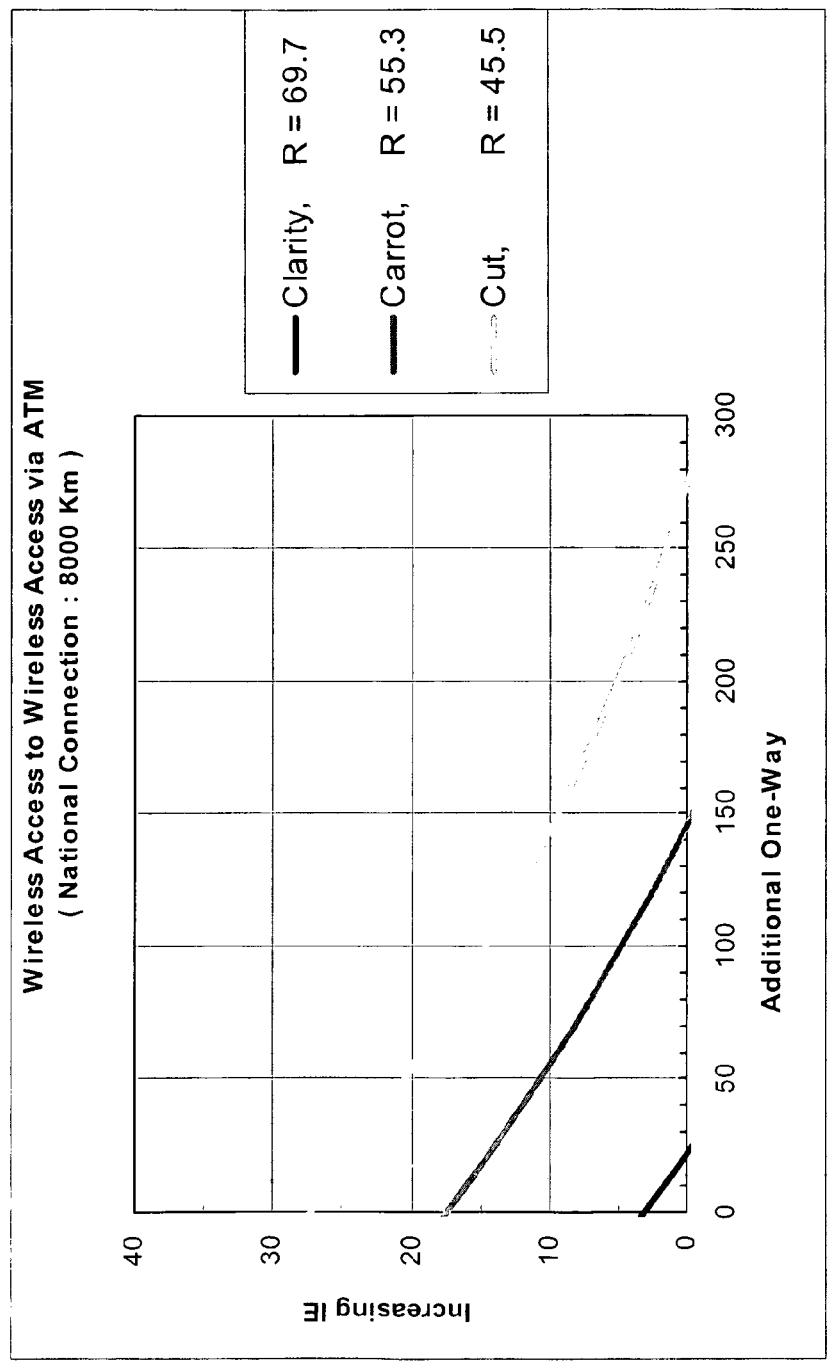
FIG. 62 is a graph showing HRX delay and le budget for a national wireless-to-wireless access.
Figure 63:
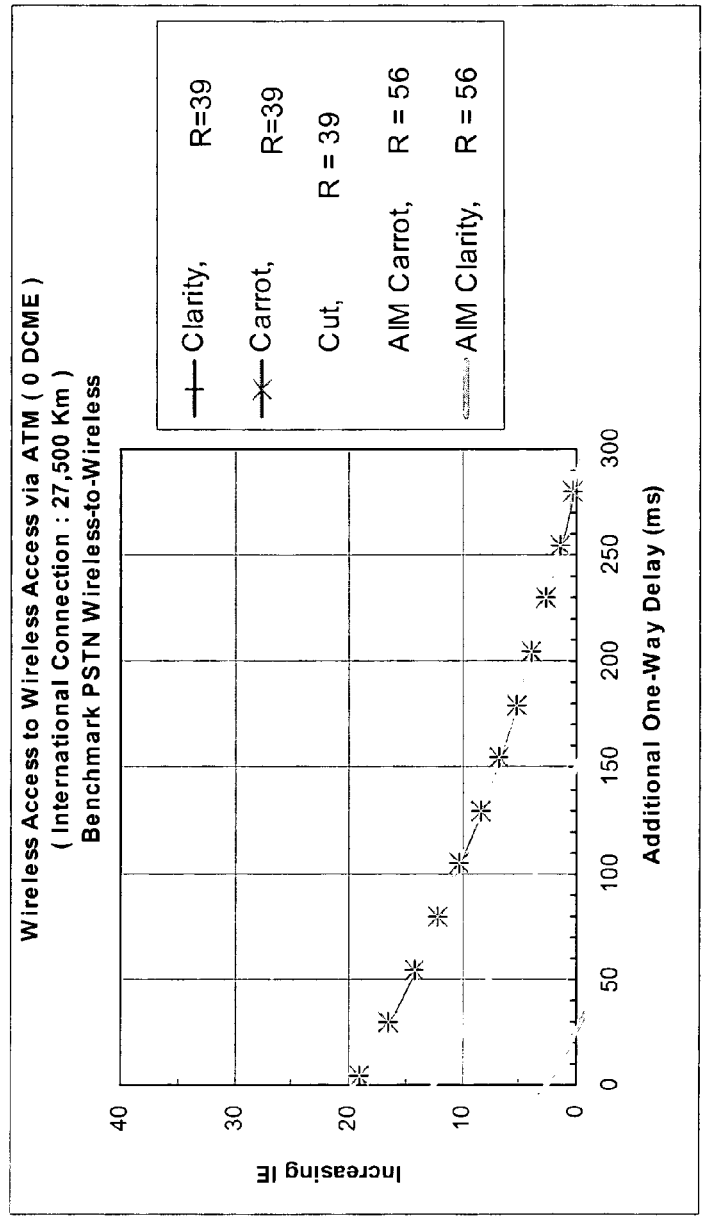
FIG. 63 is a graph showing HRX delay and le budget for an international wireless-to-wireless access.

FIG. 44 shows the HRX access scenario model for trunk access. At this stage, the models include the total intrinsic delay and impairments. The four parameters: packetisation delay, delay jitter, codec and packet loss have been set to zero. Those four parameters will be determined based upon the available margin in the next section.

FIGS. 45, 46, 47 and 48 show the HRX access scenario models for wireless access, cable access and core access.

The HRX E-model analysis has been performed on 7 A-Side access scenarios, 7 B-Side access scenarios, 2-core transport (ATM/IP) and 4-connection length (national, Intl 0,1,2 DCME) for a total of 392 possible HRXs. At this stage, the results include the total intrinsic delay, impairments and R. The four parameters: packetisation delay, delay jitter, codec and packet loss have been set to zero. Those four parameters will be determined based upon the available margin.

The following FIGS. 49, 50, 51 and 52 show the network access scenario results for the model analysis, for trunk access, for ADSL access and wireless access respectively. For each the four parameters: packetisation delay, delay jitter, codec and packet loss have been set to zero. Those four parameters will be determined based upon the available margin. The margin is determined based on the benchmark comparison of an end-to-end Succession network with the closest benchmark representation of existing networks (PSTN only, mobile to PSTN, or mobile to mobile).

HRX E-Model Intrinsic Results

FIGS. 53 to 63 show the comparison of the network to the PSTN reference connections as well as the available margins for the 4 parameters (codec Ie, packetisation, jitter, packet loss) previously set to zero in the models.

For trunk access there is NO margin on national calls (we are on the top section (A) of the E-model R vs. D curve of FIG. 30). However, a difference of 3R is not user discernible. Therefore an extra 3R margin has been allocation the national scenarios, allowing a limited margin for packetisation, jitter and packet loss. For National trunk access there are small le margins and thus no compression codec is possible. For ADSL access there is margin available on international because the network will not use DCME. The margin can be used in improve voice quality over PSTN and/or to use compression codec (we are on the right section (B) of the E-model R vs. D curve of FIG. 30). For ADSL national access there are small le margins thus no compression codec is possible on national calls. For wireless to trunk access nationally there are limited margins which require small packetisation of 20 ms or less. For wireless-to-wireless access nationally there are limited margins, which may require transcoder-free operation. Finally for wireless-to-wireless access internationally there are limited margins, which may require transcoder-free operation for clarity.

FIG. 64 is a table showing rank order of codecs based on voice quality performance. Codecs higher in the list should be chosen over those lower down where voice performance is a priority.

The Codecs are accredited based upon the available margins. The solution is based on limiting cases such as DSL and enterprise, which have higher delays. National and international connections must be supported unless specified.

FIGS. 65, 66 and 67 are tables showing the accredited codecs for Clarity, Carrot and Cut respectively. All wireless codecs are accredited, but AMR codec is preferred for use in the network. Although G.728 has not been modelled, it is expected to behave in the same way as G.726. For Cut G.723.1 may suffice. Voice compression is selected in one or more of the following situations:
- a business-economic decision that has been made (mobile), or will be made again and again by any operator who profits by squeezing more calls out of a given size of pipe. This could be new infrastructure, warranted by capital or lease expenditure, or by ownership or lease of existing infrastructure that requires extra capability to remain competitive but does not warrant replacement.
- a compatibility requirement, where it has been standardised (mobile).
- a necessity—when the pipe is just too small because of physics.

The business economic model also has to consider the user experience, since using voice compression will impact voice quality, often to a significant degree.

There is also extra delay associated with the use of compression, such as coding algorithm look-ahead and coding frame-size to consider, that can mar voice quality further. Therefore, an operator may have to ensure an incentive to users to accept the lower quality, such as cheaper calls or the advantage of convenience, such as mobile or multiple lines. This applies in the core and the access networks for the same or different reasons.

Historically, voice compression has been used on point to point links and in multiple access technologies, such as mobile. In wired networks, voice compression is applied to expensive but direct links, such as submarine cables and leased inter-switch trunks. Here there is an aggregated and predictable community of interest at transit exchanges and international gateways, and compression allows a direct multiplication of the circuits yet still keeping the TDM structure, and directly offsets the need to employ further links. The business-economic decision is therefore straightforward.

In the mobile application the available radio bandwidth is capped, and adding extra bandwidth for the sake of increased user channels can not be readily entertained. Furthermore, network planning has to repeat the same radio spectrum a number of times, and decide the number of masts that can be erected, the size of user community served by each mast, versus the cost and type of compression, as well as the performance of line-of-sight radio transmission. This is a much more complex model than the wireline use of voice compression, and is a combination of physics as much as economics.

However, the mobile access system, while serving multiple users, is still operating on a point to point basis. Since mobile networks have terminated on the 64 kb/s switching infrastructure, as do inter-exchange trunks and submarine cables, voice compression was not passed through end-to-end. (This is only beginning to change the proposals for transcoder-free operation in DCME and mobile.) So far all applications of voice compression have only considered the physics and economics in relative isolated portions of a network.

This situation is changing radically by the widening deployment of packet switching technology. Unlike the fixed bandwidth-per-channel constraint of TDM, packet technologies provide a fine granularity of bandwidth allocation, and the ability to vary that bandwidth considerably during the connection's life. Since packet switches can switch any type of traffic directly, this mechanism is much more amenable to using voice compression. More importantly, packet technologies are going to be deployed end-to-end between users, and this means that for the first time considering applying voice compression is no longer isolated to a point-to-point model.

In effect the historical considerations of applying voice compression have been extended and become more complex. For example, in a TDM network a distributed community of users would have dictated first the aggregation of traffic on to a suitably sized exchange, and the connection of those exchanges by point-to-point links in a mesh or star configuration. In end-to-end packet networks the scale is far greater, the network configurations are more numerous, and moreover one may select voice compression locally to effect a benefit in a remote portion of the network. On the negative side, the added delay and loss associated with packet networks impair voice quality, and reduce the budget available for voice compression. A different strategy must be adopted in order to avoid unnecessary transcoding of voice.

Where voice compression has been deployed in the past and compatibility is sought, it will continue to be used in packet networks, and in fact it use should probably be extended in order to ensure continued voice quality. Where voice compression has not been previously used then its consideration in future will be based on the following criteria:
- size and distribution of community served, i.e. offered traffic—could be point to point or geographically distributed, demanding appropriate consideration of a point to point pipe or a switched network topology, where the network could be a star and/or mesh of pipes.
- size of available pipes—these could be physically sized, virtually sized (by packet technologies, or concatenated lower granularities of size—TDM and packet inverse multiplexing).

cost structure of available pipes—owned or leased infrastructure, and the non-linear but increasing cost with size. The cost is non-linear because the underlying technologies vary (optical/electrical, Ethernet/Sonet, physical/virtual) and the operations cost for different bearer sizes.

revenue per call—this will depend on the routing distance of the calls made, which in turn may be related to the size and distribution of the community served, and also to the competitive position of the operator and the perceived and absolute voice quality.

call blocking probability—any given size of pipe will be able to serve a certain size of community, with a given probability that calls will be blocked, depending on a b/w cost per call and for a point to point link according to an Erlang B formula. For a network, the blocking probability is a more complex calculation, and dependent on the network topology. The call blocking probability is a non-linear relationship to the input data, and moreover has a non-linear bearing on the overall revenue and profit, since a blocked service will disaffect a certain body of the community served.

bandwidth cost per call—this is not only affected by a static compression factor and calculation of protocol overhead, but by dynamic factors such as silence suppression and the ability to change the compression factor. Furthermore, voice-band data traffic such as modems and facsimile will have a b/w cost different to voice, and dependent on the strategy for their transport which could be full demodulation or by dilating the call b/w. The statistical distribution of such voice-band data in the overall community of voice must be determined for the size and type of community served.

Consideration of silence suppression and adaptive compression factor mechanisms must also account for the delay variation impact they can induce. For any given pipe size there is a non-linear relationship between the probability of packet loss and the number of active calls. In general terms, packet loss is less desirable than increased jitter, but both have an impact on overall voice quality. Voice quality will be directly impaired by the delay mechanisms of packet technology, the compression distortion, voice clipping distortion from silence suppression, and packet loss. Whatever mechanisms are employed from a business-economic perspective must be further considered in the terms of voice quality targets and the percentage of disaffected users, which will bear directly on the size of community served. As a rule of thumb, for a given packet delay variation and packet loss target, the smaller the community of interest the lower the gain that is utilised by the deployment of silence suppression (due to the bursty nature of real-time voice sources).

The decision to employ voice compression is not a simple matter of calculating the efficiency of a pipe, given a compression algorithm and link protocol. It is a much more complex consideration of statistical performance and revenue from communities which are much more likely distributed in end-to-end packet networks.

In a network striving for voice quality equivalent to today's PSTN the rules for Clarity may include the following:

1. All hand-off must be packet based, this implies no TDM hand-off between multiple packet domains which would fraction the budget allocation. Each packet domain would require packetisation delay thus most of the jitter is incurred in the first few nodes (by convolution). Alternatively where there is packet hand-off then one operator gets the whole packetisation delay budget, the other the whole jitter budget etc, this implies none of the existing DCME equipment on submarine links.

2. In packet-to-packet media gateways there should be no retiming—i.e. the bearer should not be fully de-jittered—same convolution argument as above.3. Packetisation delay must be limited to 10 ms or less.

4. Congestion must be tightly controlled to ensure that no access or network statistical multiplexer exceeds about 90% loading with voice. Jitter must be kept within bounds of about 10 ms and access links must be DS3 or faster. Packet loss must be negligible.

5. No compression can really be tolerated in national calls (other than wireless which has the codec built-in), and G.726-32 is marginal (le=7, but margin is 3).

6. If compression is required on international submarine links then it should be invoked at the first international gateway alone or at source, and used end-to-end—i.e. no tandeming. G.726-32 with 10 ms is accredited 7. Wireless to wireless international calls should use Transcoder Free Operation wherever possible or interwork between wireless standards directly.

8. If a wider range of VoDSL packetisation delays is required, an operator may be able to reduce the default delays where there is control (20 ms default reduced to 2 ms).

In a network striving for voice quality equivalent to today's PSTN with an extra impairment of about 10 (GSM mobile) the rules for Carrot will include the following.

1. In all cases, the customer will set the target for voice quality. All networks must be E-modelled on a case-by-case basis, and the selection of parameters made to satisfy that target.

2. Ideally all hand-off should be packet based to maximise the budget available for packet network artefacts, which would be otherwise fractioned, and selection of accredited parameters becomes more difficult.

3. In packet-to-packet media gateways retiming can be used—i.e. the bearer fully or partially de-jittered. The same consideration as rule 2 also applies.

4. At most one stage of existing DCME can be used on international submarine links, but tandemed stages must be eliminated. However, this is likely to be in lieu of using compression in an access scenario, and therefore retention is not recommended.

5. Packetisation delay must be limited to 40 ms or less.

6. Congestion must be tightly controlled to ensure that no access or network statistical multiplexer exceeds about 90% loading for voice. Jitter must be kept within bounds of about 10 ms, access links must be DS3 or faster. Or packetisation delay can be traded directly for greater source based jitter for DS1 links. Packet loss must be negligible, or at most 1% with G.711 if packetisation is 20 ms or less.7. If compression is required on submarine links then it should be invoked at the first international gateway alone or at source, and used end-to-end, i.e. no tandeming. G.726-32 with 10 ms is accredited, or one stage existing DCME.

8. Ideally national & international Wireless to wireless calls should use Transcoder Free Operation wherever possible or interwork directly, but rule 7 may apply.

9. One stage of compression can be tolerated in national calls (other than wireless which has the codec built-in) with accredited codecs.

10. Ideally consistency should be assured between national and international scenarios, such that the same bearer profile criteria can serve both national and international call scenarios without adjustment. This simplifies planning and product design.

11. Other than wireless, no other access technology requires compression by default. However, there may be cost or other desirable situations where compression has advantages (leased infrastructure), but then it should be carried end-to-end or transcoded at most once.

In a network striving for voice quality equivalent to today's PSTN with an extra impairment of about 10+ (GSM mobile+delay) the rules for Cut will include.

1. In all cases, the customer will set the target for voice quality. All networks must be E-modelled on a case-by-case basis, and the selection of parameters made to satisfy that target.

2. Ideally all hand-off should be packet based to maximise the budget available for packet network artefacts, which would be otherwise fractioned, and selection of accredited parameters becomes more difficult.

3. In packet-to-packet media gateways retiming can be used—i.e. the bearer fully or partially de-jittered.

4. At most one stage of existing DCME can be used on international submarine links, but tandemed stages must be eliminated. This can be in addition to compression in the access.

5. Packetisation delay must be limited to 40 ms or less.

6. Congestion must be tightly controlled to ensure that no access or network statistical multiplexer exceeds about 90% loading for voice. Jitter must be kept within bounds of about 50 ms, with access links DS3 or faster. Packetisation delay can be traded directly for greater source based jitter for DS1 links.

Packet loss must be negligible, or at most 1% with G.729 if packetisation is 20 ms or less.

7. If compression is required on submarine links then it should be invoked at the first international gateway alone or at source, and used end-to-end, i.e. no tandeming. Several codecs are accredited, or one stage existing DCME.

8. Ideally national and international wireless-to-wireless calls should use Transcoder Free Operation wherever possible or interwork directly, but rule 7 may apply.

9. One stage of compression can be tolerated in national calls with accredited codecs.

10. Ideally consistency should be assured between national and international scenarios, such that the same bearer profile criteria can serve both national and international call scenarios without adjustment. This simplifies planning and product design.

11. Other than wireless, no other access technology requires compression by default. However, there may be cost or other desirable situations where compression has advantages (leased infrastructure), but then it should be carried end-to-end or transcoded at most once.

Figure 68:
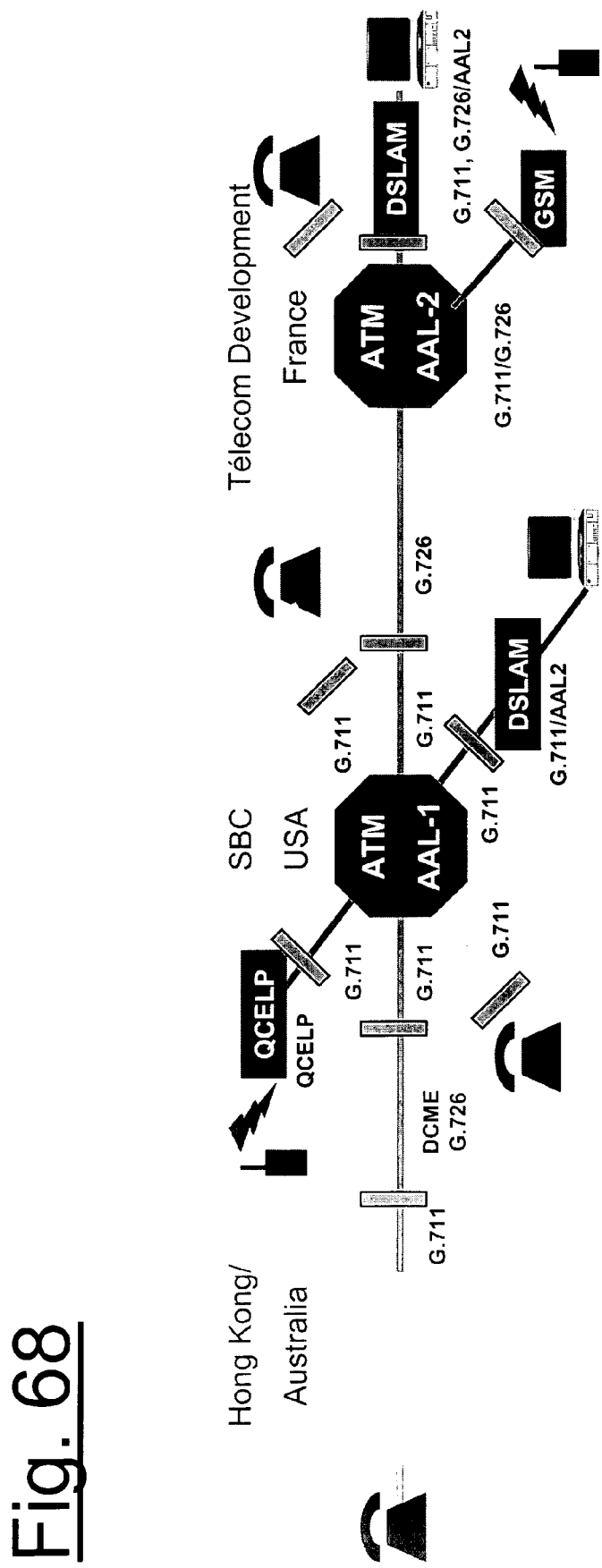
FIG. 68 is a schematic diagram showing a first case study for clarity

FIG. 68 is a schematic diagram showing a first case study for Clarity. National calls in France for example ideally should be G.711, but if compression is required, G.726-32 may suffice for that size of country. If compression is required on submarine links then G.726-32 should be invoked in France's AAL-2 network at source SMG, and eliminate the transatlantic DCME. If compression is not required on submarine links, the transatlantic and transpacific DCME should be eliminated. Ideally national and international Wireless to wireless calls should use Transcoder Free Operation wherever possible or interwork directly, or revert to G.711.

Figure 69:
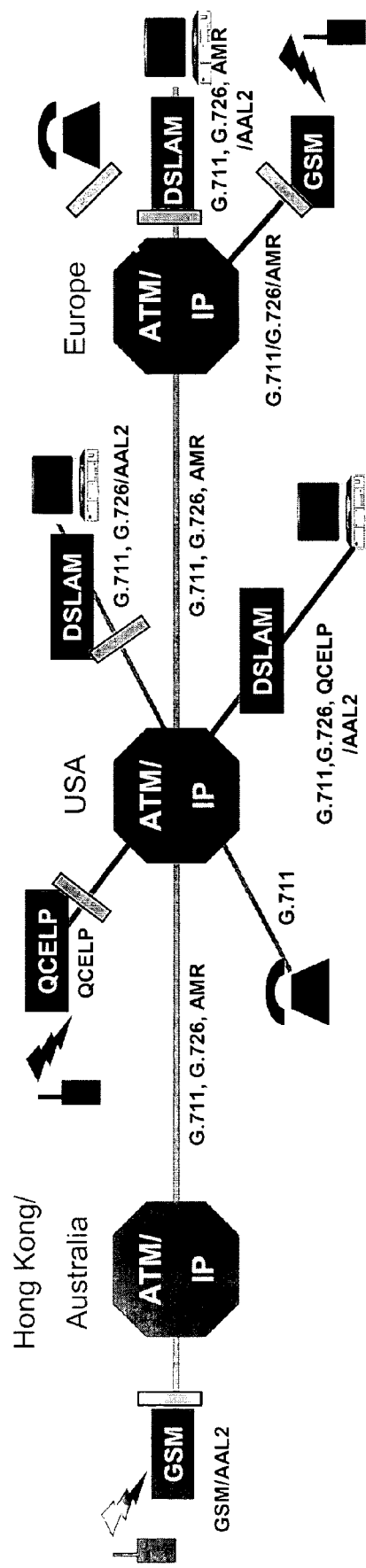
FIG. 69 is a schematic diagram showing a further case study for clarity.

FIG. 69 is a schematic diagram showing a further case study Clarity. National calls ideally should be G.711, but if compression is required, G.726-32 may suffice for some countries. If compression is required on submarine links then G.726-32 should be invoked and eliminate the transatlantic and transpacific DCME. If compression is not required on submarine links, the transatlantic and transpacific DCME should be eliminated. Ideally, national and international Wireless to wireless calls should use Transcoder Free Operation wherever possible or interwork directly, AMR to QCELP.

Figure 70:
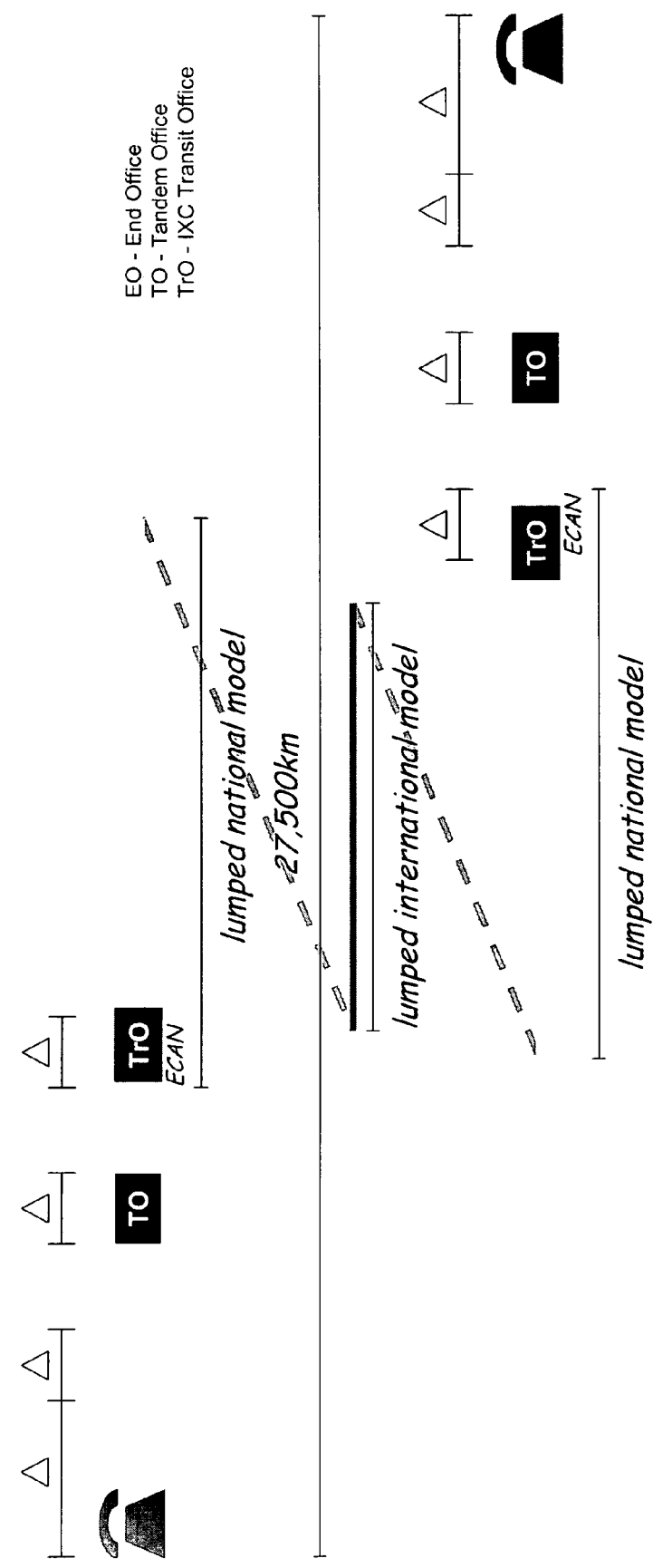
FIG. 70 is a schematic diagram showing PSTN HRX benchmark.

FIG. 70 is a schematic diagram showing PSTN HRX benchmark for lumped models, which include: switching delays for distance related number of switches, transmission distance and equipment delays [G.114] and international ink DCME equipment (2 legs). Access includes: switching delay, access delay, and control of loudness, typical distances.

Figure 71:
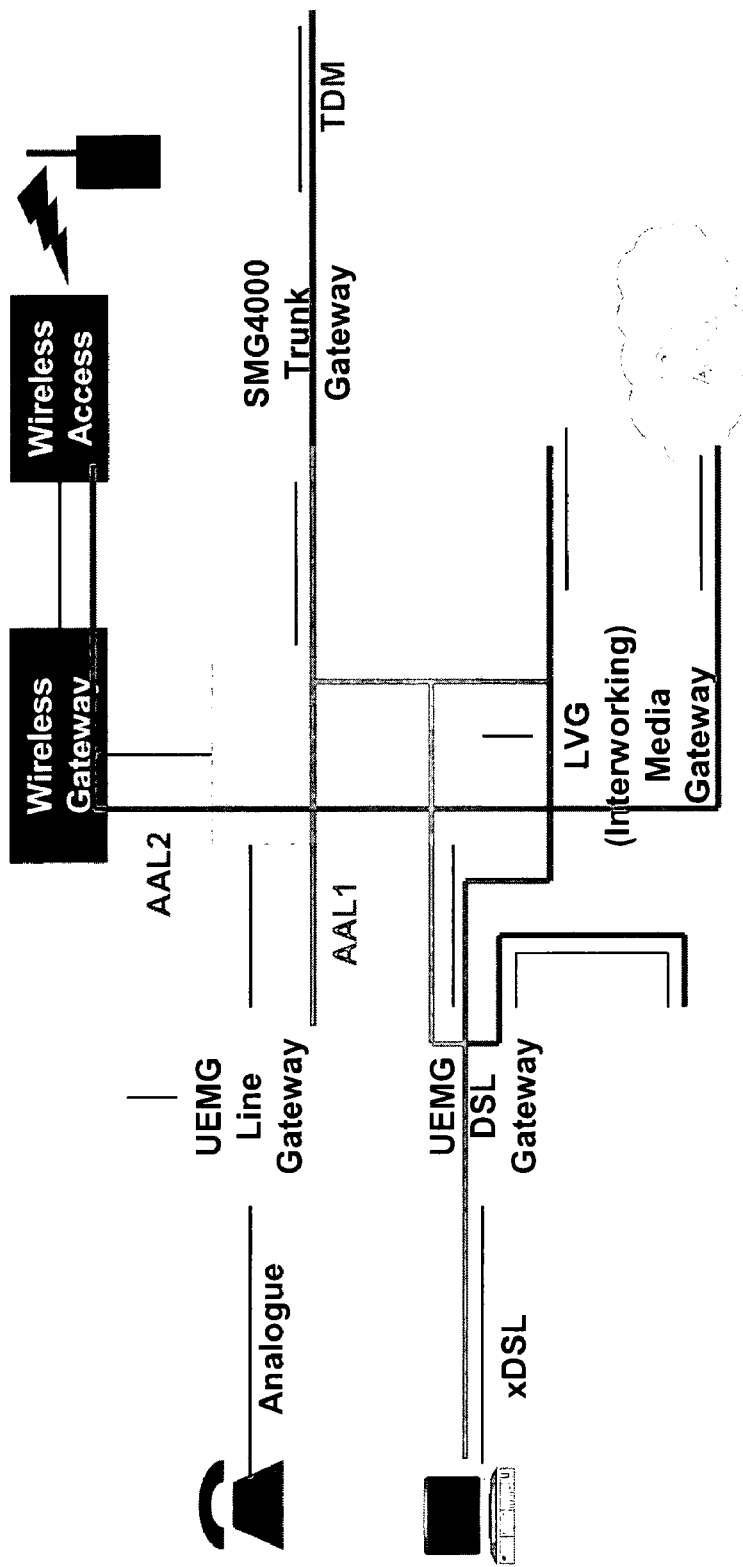
FIG. 71 is a schematic diagram showing interworking of a network.

FIG. 71 is a schematic diagram showing interworking of a network. Adaptation conversion/transcoding options include:

AAL-2/AAL-2 on LVG, UEMG and wireless gateway to implement transparency/consolidation/concentration;

AAL-2/AAL-1 on LVG for concentration of UEMGs (unpredictable traffic mix); on UEMG where cost of LVG is prohibitive and there are a reasonable number of users on UEMG;

AAL-2/TDM on UEMG/PVG for interface to core PSTN (ILEC);

TDM/AAL-1 on UEMG for lowest cost interface to Network architecture; or

TDMIAAL-2 on LVG for increased revenue from leased backhaul (OLOs), on UEMG if economic (but does not serve CLECs leasing unbundled copper).

Figure 72:
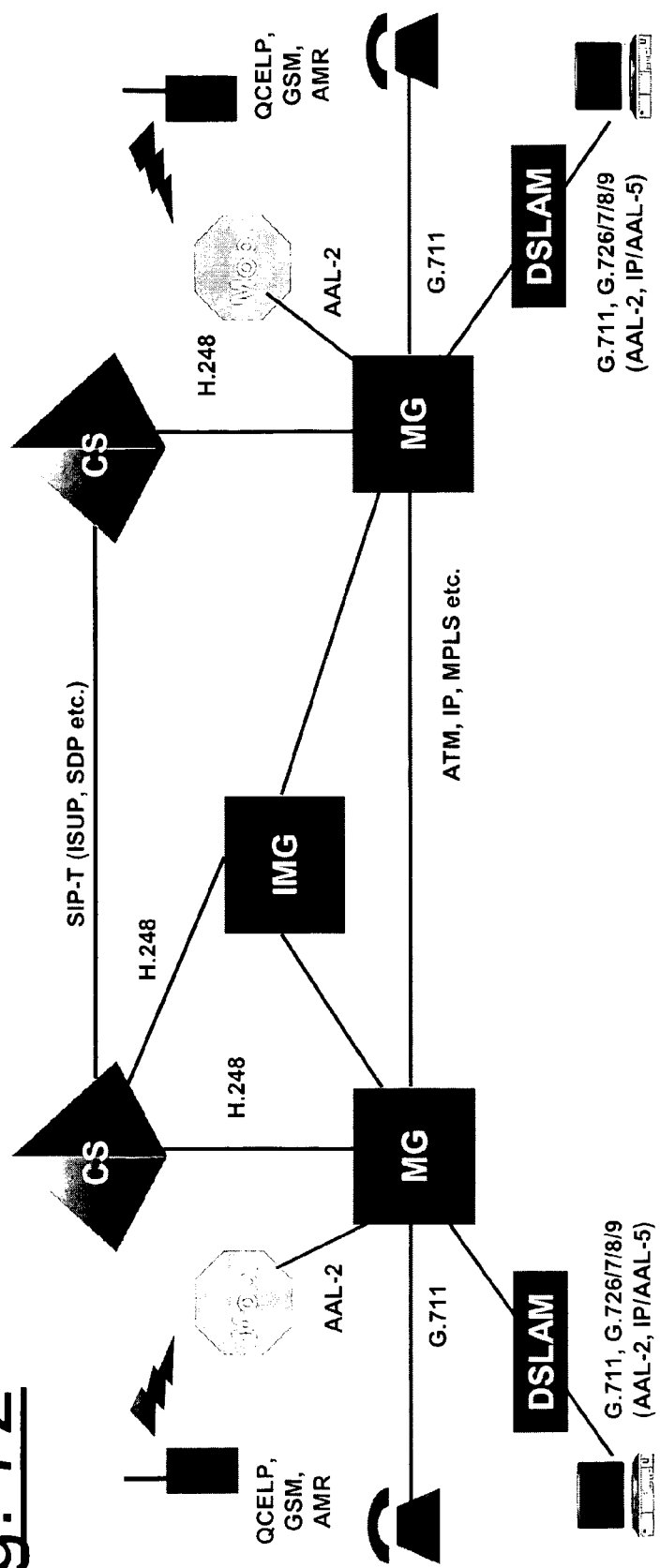
FIG. 72 is a schematic diagram showing the transparency control of a network.

FIG. 72 is a schematic diagram showing the transparency control of a network. This requires a network control architecture to control bearer adaptation, thus limiting transcoding stages by suitable choice of N/W transcoding point (MG/IMG) and optimally include Interworking MG (similar to CALEA CR node requirements?) for compatibility in packet format, adaptation layer, and codec.

Where standards dictate AAL-2 in the access, AAL-2 in the core obviates the need for specialized DCME equipment and its delay budget. MGs require an AAL-2 relay function for consolidation (aggregation) and transparency. N/Ws require an AAL-2 relay function to form a concentration point for scaling purposes. This is most conveniently physically sited in an IMG platform.

Figure 73:
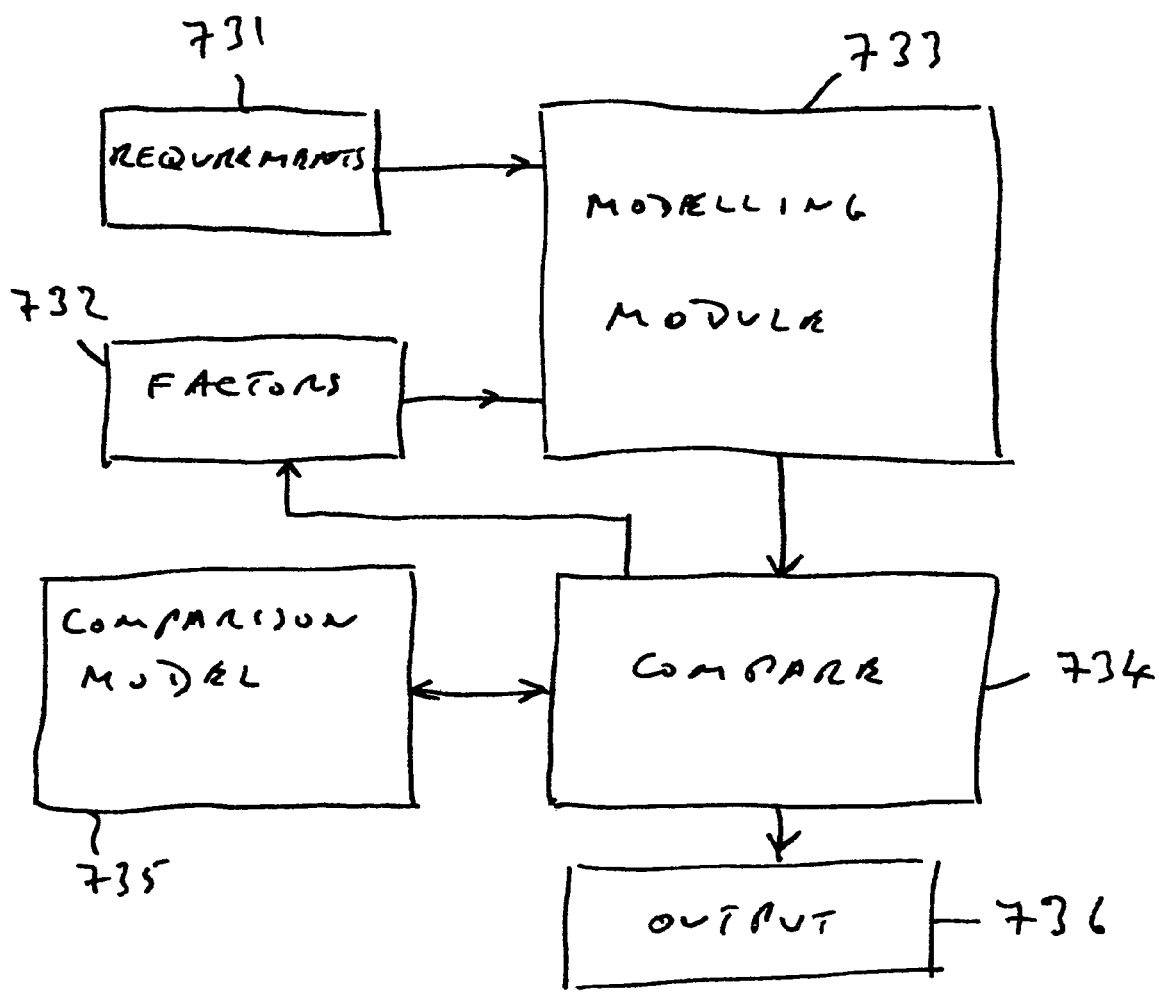
FIG. 73 is a schematic diagram of a network planning tool.

FIG. 73 shows in schematic form the construction of network planning tool for planning a network which is capable of passing packet based data therethrough. The tool has a first input 731 for inputting the requirement of the network; and a second input 732 for determining the factors which effect the passage of packet based data through the network. A modelling module 733 models the performance of the network based on the requirements and factors. A comparer 734 compares the performance of the network model with an objective comparison model 735. A feedback mechanism between the comparer 734 and the factor input provides for iterative adjustment of the factors to improve the performance and maintain the network requirements. When the iterative adjustment has been completed, a plan of the network is generated at output 736.

It will be understood that the above description of preferred embodiments is given by way of example only and that various modifications may be made by those skilled in the art without departing from the spirit and scope of the invention.

The invention claimed is:

1. A method of planning a telecommunications data network which is capable of passing packet based data traffic therethrough, the method of planning comprising: determining a plurality of requirements comprising a specification for the data network; determining factors which effect the passage of packet based data traffic through the specified network; modelling the performance of the specified network based on said requirements and said factors; comparing the modelled performance of the specified network with an objective comparison model comprising a model derived from objective measures calibrated by subjective tests; responsive to said step of comparing the performance of the specified network with the objective comparison model, iteratively adjusting said factors to improve the performance and maintain the network requirements of the specified network; and outputting a plan of the specified network.

2. A method as claimed in claim 1, wherein said network requirements are selected from the group comprising quality, incentive, cut-price and combinations thereof.

3. A method as claimed in claim 1, and embodied as software in machine readable form on a storage medium.

4. A method as claimed claim 1 or claim 2 or claim 3, wherein the method of planning comprises: specifying a bearer profile for the network; defining a protocol stack supporting said bearer profile; and determining a target voice quality for the network; wherein said target voice quality determination is effected as a trade-off between a set of voice quality benchmarks.

5. A method as claimed in claim 4, wherein said voice quality benchmarks comprise clarity, incentive and cut-price.

6. A method as claimed i claim 5, wherein said clarity benchmark is determined as voice quality as a primary factor.

7. A method as claimed in claim 6, wherein said incentive benchmark is determined as any combination of quality, convenience, compatibility, portability, mobility and low cost.

8. A method as claimed in claim 7, wherein said cut-price benchmark comprises a minimum price with a minimum acceptable quality.

9. A method as claimed in claim 8, wherein a transmission rating factor is calculated for the network.

10. A method as claimed in claim 9, wherein said transmission rating factor (R) Is determined as $R = R_O - I_s - I_d - I_9 + A$ where $R_0$ is a signal to noise ratio, $I_s$ is the sum of real time voice transmission impairments, $I_d$ is the sum of delayed impairments relative to the voice signal, $I_e$ is an equipment impairment factor, and A is an advantage factor.

11. A method as claimed in claim 10, wherein a budget allocation is determined from a combination of the transmission factor rating, the equipment impairment factor and a delay margin.

12. A network plan prepared by a method as claimed in claim 4.

13. A network plan as claimed in claim 12, and embodied in a digital signal.

14. A method as claimed in claim 1, wherein said objective comparison model comprises an E-model.

15. A method as claimed in claim 1, wherein said network plan is output as a software product.

16. A network planning tool for planning a telecommunications data network which is capable of passing packet based data therethrough, the tool comprising: an input for inputting requirements of a specification for the network; an input for inputting factors determined to effect the passage of said packet based data through the specified network; a modelling module for modelling the performance of the specified network based on said requirements and said factors; a comparer for comparing the performance of the specified network with an objective comparison model comprising a model derived from objective measures calibrated by subjective tests; means responsive to an output of the comparer for iteratively adjusting said factors to improve the performance and maintain the specified network requirements; and an output for outputting a plan of the network.

17. A network planning tool as claimed in claim 16, wherein said network requirements are selected from the group comprising quality, incentive, cut-price and combinations thereof.

18. A network planning tool as claimed in claim 17, wherein said network requirements include voice quality benchmarks comprising clarity, incentive and cut-price.

19. A network planning tool as claimed in claim 18, wherein said clarity benchmark is determined as voice quality as a primary factor.

20. A network planning tool as claimed in claim 19, wherein said incentive benchmark is determined as a combination of quality and low cost.

21. A network planning tool as claimed in claim 20, wherein said cut-price benchmark comprises a minimum price with a minimum acceptable quality.

22. A network planning tool as claimed in claim 16, and embodied as software in machine readable form on a storage medium.

23. A network planning tool as claimed in claim 16, wherein said objective comparison model comprises an E-model.

* * * * *